United States Patent
Akita

(10) Patent No.: US 7,759,893 B2
(45) Date of Patent: Jul. 20, 2010

(54) MOTOR CONTROL APPARATUS AND MOTOR CONTROL METHOD

(75) Inventor: Tadashi Akita, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 12/201,647

(22) Filed: Aug. 29, 2008

(65) Prior Publication Data

US 2008/0315810 A1 Dec. 25, 2008

Related U.S. Application Data

(63) Continuation of application No. PCT/JP2006/303916, filed on Mar. 1, 2006.

(51) Int. Cl.
G05B 19/10 (2006.01)
(52) U.S. Cl. .................... 318/567; 318/568.1
(58) Field of Classification Search ............... 318/567, 318/568.1, 568.15, 568.16, 568.22
See application file for complete search history.

(56) References Cited

U.S. PATENT DOCUMENTS

| | | | |
|---|---|---|---|
| 4,600,869 A * | 7/1986 | Sekine et al. | 318/568.13 |
| 5,032,936 A * | 7/1991 | Fujioka et al. | 360/71 |
| 5,571,971 A * | 11/1996 | Chastel et al. | 73/761 |
| 6,320,344 B1 * | 11/2001 | Sakamoto et al. | 318/567 |

FOREIGN PATENT DOCUMENTS

| | | |
|---|---|---|
| JP | 3-178590 A | 8/1991 |
| JP | 2001-37287 A | 2/2001 |
| JP | 3234177 B2 | 9/2001 |
| JP | 2005-288589 A | 10/2005 |

* cited by examiner

Primary Examiner—Rina I Duda
(74) Attorney, Agent, or Firm—Westerman, Hattori, Daniels & Adrian, LLP

(57) ABSTRACT

The motor control apparatus includes a memory that stores a correction data group for suppressing a fluctuation of an output of a motor, and a calculating unit that generates, by using a correction value calculated on the basis of a first output command value input thereto and the correction data group, a second output command value for controlling the output of the motor, the correction value being in accordance with operation position information of the motor. The memory stores plural correction data groups corresponding to predetermined output command values for different torque levels. The calculating unit calculates the correction value in accordance with the first output command value and the operation position information of the motor by interpolation processing using correction data included in at least two correction data groups among the plural correction data groups. The apparatus suppresses the output fluctuation of the motor.

9 Claims, 26 Drawing Sheets

DRIVER 1, DRIVER 2

| SYNCHRO-NIZATION POINT NUMBER | SYNCHRO-NIZATION WAITING TIME-OUT [msec] | SYNCHRONI-ZATION PROCESSING CONTINUANCE/ TERMINATION | WAIT TIMER VALUE [msec] | MOTOR VOLTAGE TARGET VALUE [V] | MOTOR VOLTAGE CHANGE RATE [V/msec] | HOLD TIMER VALUE [msec] | PRESENCE/ABSENCE OF HOLD ESCAPE BY DETECTING SEATING |
|---|---|---|---|---|---|---|---|
| 1 | 100 | CONTINUANCE | 0 | 1 | 0.2 | 2000 | PRESENCE |
| 2 | 3000 | CONTINUANCE | 0 | 3 | 0.1 | 0 | ABSENCE |
| 3 | 500 | CONTINUANCE | 0 | 6 | 0.1 | 0 | ABSENCE |
| 4 | 500 | CONTINUANCE | 0 | 8 | 0.1 | 0 | ABSENCE |
| 5 | 500 | CONTINUANCE | 0 | 10 | 0.1 | 200 | ABSENCE |
| 6 | 500 | CONTINUANCE | 0 | 0 | -0.5 | 0 | ABSENCE |
| 7 | 500 | TERMINATION | - | - | - | - | - |

DRIVER 3, DRIVER 4

| SYNCHRO-NIZATION POINT NUMBER | SYNCHRO-NIZATION WAITING TIME-OUT [msec] | SYNCHRONI-ZATION PROCESSING CONTINUANCE/ TERMINATION | WAIT TIMER VALUE [msec] | MOTOR VOLTAGE TARGET VALUE [V] | MOTOR VOLTAGE CHANGE RATE [V/msec] | HOLD TIMER VALUE [msec] | PRESENCE/ABSENCE OF HOLD ESCAPE BY DETECTING SEATING |
|---|---|---|---|---|---|---|---|
| 1 | 100 | CONTINUANCE | 50 | 1 | 0.2 | 2000 | PRESENCE |
| 2 | 3000 | CONTINUANCE | 50 | 3 | 0.1 | 0 | ABSENCE |
| 3 | 500 | CONTINUANCE | 50 | 6 | 0.1 | 0 | ABSENCE |
| 4 | 500 | CONTINUANCE | 50 | 8 | 0.1 | 0 | ABSENCE |
| 5 | 500 | CONTINUANCE | 50 | 10 | 0.1 | 200 | ABSENCE |
| 6 | 500 | CONTINUANCE | 50 | 0 | -0.5 | 0 | ABSENCE |
| 7 | 500 | TERMINATION | - | - | - | - | - |

DRIVER 5, DRIVER 6

| SYNCHRO-NIZATION POINT NUMBER | SYNCHRO-NIZATION WAITING TIME-OUT [msec] | SYNCHRONI-ZATION PROCESSING CONTINUANCE/ TERMINATION | WAIT TIMER VALUE [msec] | MOTOR VOLTAGE TARGET VALUE [V] | MOTOR VOLTAGE CHANGE RATE [V/msec] | HOLD TIMER VALUE [msec] | PRESENCE/ABSENCE OF HOLD ESCAPE BY DETECTING SEATING |
|---|---|---|---|---|---|---|---|
| 1 | 100 | CONTINUANCE | 100 | 1 | 0.2 | 2000 | PRESENCE |
| 2 | 3000 | CONTINUANCE | 100 | 3 | 0.1 | 0 | ABSENCE |
| 3 | 500 | CONTINUANCE | 100 | 6 | 0.1 | 0 | ABSENCE |
| 4 | 500 | CONTINUANCE | 100 | 8 | 0.1 | 0 | ABSENCE |
| 5 | 500 | CONTINUANCE | 100 | 10 | 0.1 | 200 | ABSENCE |
| 6 | 500 | CONTINUANCE | 100 | 0 | -0.5 | 0 | ABSENCE |
| 7 | 500 | TERMINATION | - | - | - | - | - |

FIG. 6

DETAILS OF BRUSH

MOTOR CONTROL APPARATUS AND MOTOR CONTROL METHOD

This application is a continuation based on International Patent Application No. PCT/JP2006/0303916, filed on Mar. 1, 2006, which is hereby incorporated by reference herein in its entirety as if fully set forth herein.

BACKGROUND OF THE INVENTION

The present invention relates to a motor control technique for suppressing a fluctuation of an output of a motor, and in particular, to a technique for controlling a motor having a characteristic in which a magnitude of the output fluctuation changes in accordance with a level of the output of the motor. Moreover, the present invention relates to a technique for suppressing vibration generated in a motor by suppressing an output fluctuation of the motor.

For tightening of fine screws used for assembling products such as precision apparatus, a motor-driven type screw tightening apparatus is used which is capable of accurately controlling an output torque thereof.

However, a motor has a cogging torque, which impedes accurate torque control. Namely, when there is unevenness in a lamination state (i.e., permeability) of the core of the motor, the cogging torque is generated in accordance with a rotational angle of the motor even in a state in which a voltage or an electric current applied to the motor is zero. Due to the effect of the cogging torque, an output torque fluctuates at a frequency corresponding to a rotational speed of the motor× the number of poles in the motor.

Moreover, there is a factor impeding the torque control of the motor except for the cogging torque described above. For example, when there is unevenness in a coil winding of the motor, a torque fluctuation is brought about in accordance with a rotation of the motor. This torque fluctuation increases substantially in proportion to a level of a motor applied current. Then, since a torque fluctuation component due to the unevenness in the coil winding is superimposed on a torque fluctuation component due to the effect of the cogging torque, the fluctuation in the output torque is increasingly made greater. In addition thereto, there is a torque fluctuation due to dimension errors or fabrication errors of parts constituting the motor.

The unevenness in the core's permeability and the coil winding generates a sinusoidal waveform torque fluctuation basically during one rotation of the motor. However, a torque fluctuation is generated so as to draw a complex curve due to variations of individual motors in some cases. Moreover, when a voltage or an electric current applied to the motor (i.e., the output torques) is changed, a manner of generating the torque fluctuation in accordance with the rotational angle of the motor is changed in some cases.

Moreover, there is a problem that vibration is generated in the motor due to a cyclic increase and decrease of the cogging torque in driving the motor.

Therefore, in some cases, a method is employed in which correction for suppressing an output fluctuation and vibration of the motor is performed onto a command value which is input, and energization of the motor corresponding to the corrected command value is performed (refer to Japanese Patent Laid-Open No. 2005-288589 and Japanese Patent Laid-Open No. 2001-37287).

Japanese Patent Laid-Open No. 2005-288589 discloses a motor having a memory in which correction data for suppressing an output fluctuation are stored. In accordance with this technique, the correction data as well are automatically switched according to a replacement of the motor.

Further, Japanese Patent Laid-Open No. 2001-37287 discloses a motor control apparatus having a memory in which correction data for a rotational speed command to suppress the vibration due to the cogging torque or the like are stored.

However, in the screw tightening apparatus disclosed in Japanese Patent Laid-Open No. 2005-288589, one correction data group determined on the basis of a torque fluctuation coefficient when a voltage or an electric current of a predetermined value is applied to the motor is merely stored in the memory. Namely, as described above, in Japanese Patent Laid-Open No. 2005-288589, it is unconsidered that, when the output torque of the motor is changed, a magnitude and a generating manner of the torque fluctuation in accordance with the rotational angle of the motor.

Further, in Japanese Patent Laid-Open No. 2001-37287, in a case where a rotational speed command of the motor is corrected in order to suppress vibration of the motor, plural correction data groups in accordance with plural rotational speeds are stored in the memory. Then, Japanese Patent Laid-Open No. 2001-37287 discloses that a correction value for an input rotational speed command is found by linear interpolation from the plural correction data groups. However, in the same way as in Japanese Patent Laid-Open No. 2005-288589, it is unconsidered that a magnitude and a generating manner of the torque fluctuation are changed in accordance with the output torque of the motor.

BRIEF SUMMARY OF THE INVENTION

The present invention provides a motor control apparatus and a motor control method capable of suppressing a fluctuation of an output of a motor in which a magnitude of the output fluctuation or the like changes in accordance with a level of the output thereof.

A motor control apparatus according to one aspect of the present invention includes a memory that stores a correction data group for suppressing a fluctuation of an output of a motor, and a calculating unit that generates, by using a correction value calculated on the basis of a first output command value input thereto and the correction data group, a second output command value for controlling the output of the motor, the correction value being in accordance with operation position information of the motor. The memory stores plural correction data groups corresponding to predetermined output command values for different torque levels. The calculating unit calculates the correction value in accordance with the first output command value and the operation position information of the motor by interpolation processing using correction data included in at least two correction data groups among the plural correction data groups.

Further, a motor control apparatus according to another aspect of the present invention includes a first step of storing a correction data group for suppressing a fluctuation of an output of a motor in a memory, and a second step of generating, by using a correction value calculated on the basis of a first output command value input thereto and the correction data group, a second output command value for controlling the output of the motor, the correction value being in accordance with operation position information of the motor. At the first step, plural correction data groups corresponding to predetermined output command values for different torque levels are stored in the memory. At the second step, the correction value in accordance with the first output command value and the operation position information of the motor is calculated by interpolation processing using correction data included in at least two correction data groups among the plural correction data groups.

With these steps, the fluctuation of the output of the motor can be suppressed regardless of the first output command value and the operation position of the motor (rotational angle in a case of a rotary motor, and a rectilinear moving position in a case of a linear motor). Thereby, a motor output corresponding to the first output command value can be stably obtained.

Where, three or more correction data groups may be stored in the memory. In this case, the calculating unit is preferably made to perform interpolation processing by using two correction data groups corresponding to two predetermined output command values between which the first output command value is present. With this processing, a correction value more appropriate to the first output command value can be calculated.

The interpolation processing may be performed by using any of an interpolation method and an extrapolation method.

Further, the respective correction data groups may be preferably data groups which are obtained by approximating the measurement results of the outputs of the motor for the respective predetermined output command values by a least-square method, or obtained by averaging the measurement results obtained by plural times of measurements. With those correction data groups, an influence of noise components (for example, a frictional fluctuation component of gears when a gear speed reduction mechanism is used) other than output fluctuation components unique to the motor can be eliminated.

Moreover, when the first output command value is changed, the correction value may be calculated by using the changed first output command value and the operation position information of the motor. With this operation, an appropriate correction value corresponding to the changed first output command value can be obtained. Accordingly, even when the first output command value is changed, a motor output corresponding to the changed first output command value can be stably obtained.

A screw tightening system according to still another aspect of the present invention includes the motor control apparatus, and a screw tightening apparatus driven by a motor.

A system according to further another aspect of the present invention includes the motor control apparatus, and a motor-driven apparatus that is operated by a motor serving as a driving source.

Other aspects of the present invention will become apparent from the following description and the attached drawings.

BRIEF DESCRIPTION OF THE DRAWINGS

FIG. 6 is a table showing the examples of settings of a wait timer and the like in the screw tightening system of Embodiment 1.

DETAILED DESCRIPTION OF THE INVENTION

Exemplary embodiments of the present invention will hereinafter be described with reference to the accompanying drawings.

Embodiment 1

Figure 1:
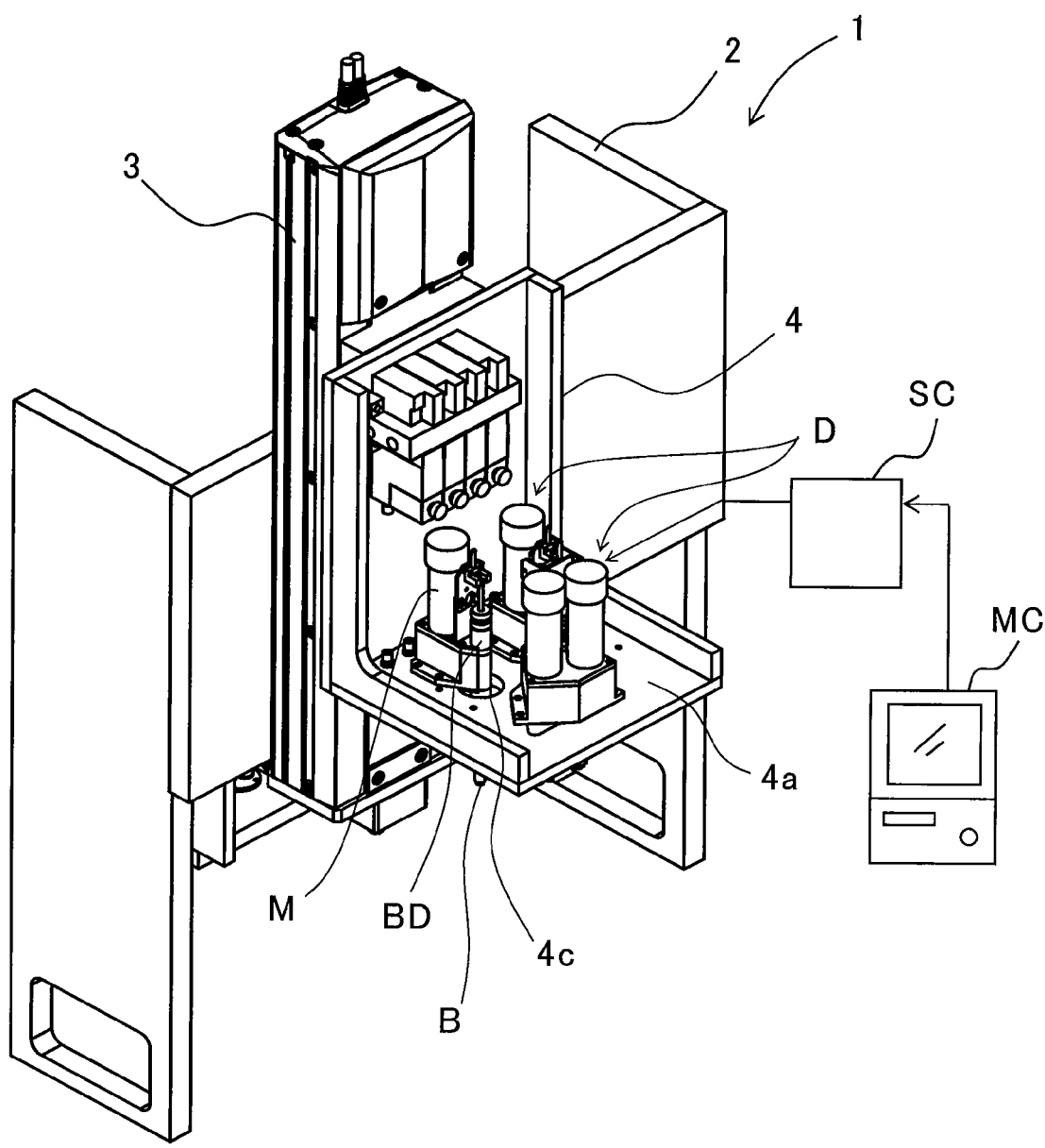
FIG. 1 is an external view of a screw tightening system that is a first embodiment (Embodiment 1) of the present invention.

FIG. 1 illustrates the schematic configuration of a screw tightening system that is Embodiment 1 of the present invention. Reference numeral 1 denotes the entire screw tightening system of this embodiment. Reference numeral 2 denotes a main body of the screw tightening system 1 (hereinafter referred to as an apparatus main body). Reference numeral 3 denotes a lifting mechanism attached to the apparatus main body 2, the lifting mechanism moving a support table 4 up and down.

Plural (four in FIG. 1) screw tightening drivers (screw tightening apparatuses) D are attached on a horizontal plate 4a of the support table 4. Each of these screw tightening drivers D rotates a screw tightening bit B extending downward from the horizontal plate 4a through a through-hole 4c formed in the horizontal plate 4a. These screw tightening drivers D perform screw tightening operations with respect to a workpiece (an object for screw tightening) (not shown) which is disposed beneath the horizontal plate 4a.

FIG. 1 illustrates the four screw tightening drivers D. However, this number of the screw tightening drivers is an example, three or less, or five or more screw tightening drivers may be provided.

Reference symbol MC denotes a main controller which transmits an operation start command and the like to a servo controller SC provided to each of the drivers D. The main controller MC is constituted by a computer.

Figure 2:
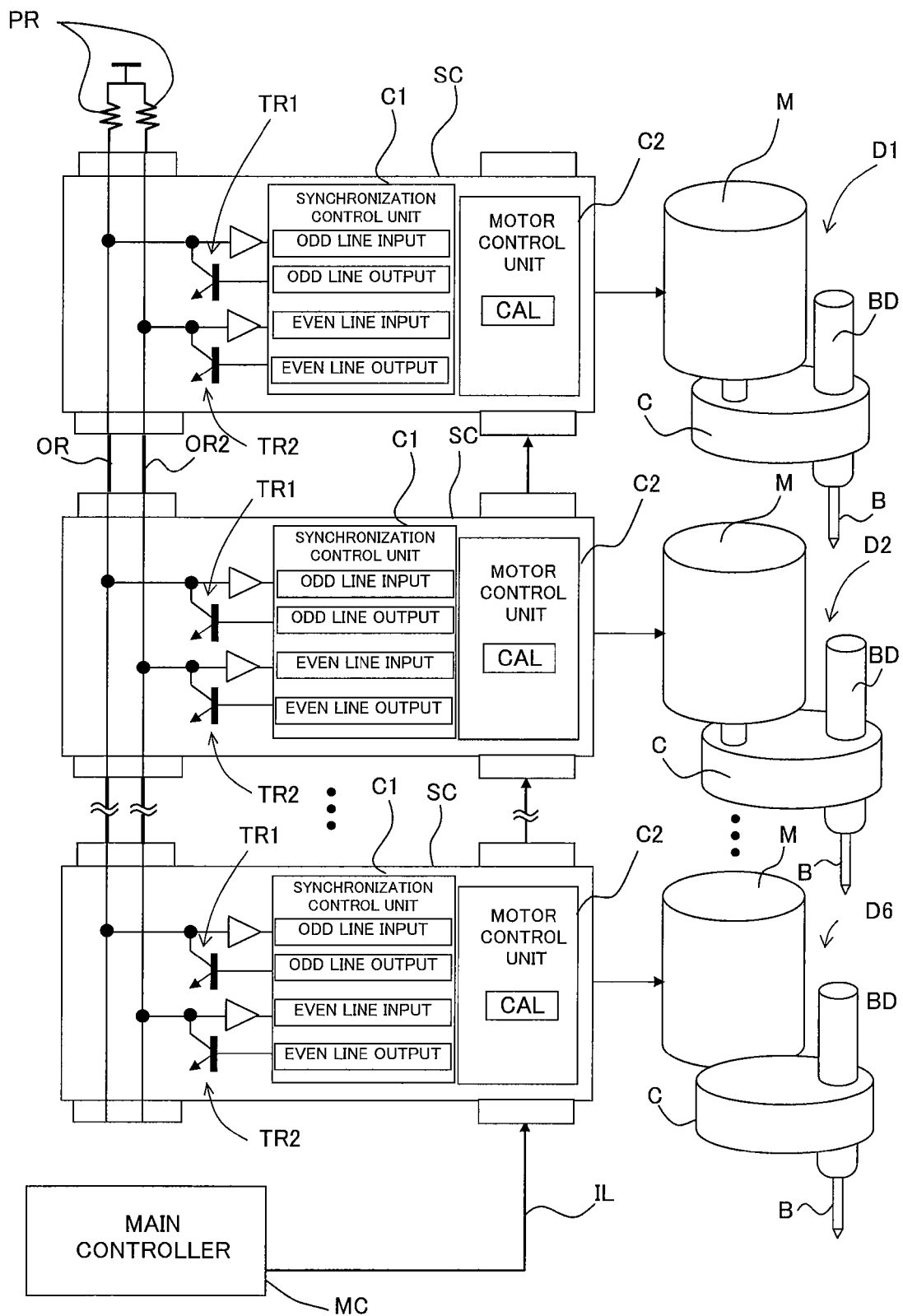
FIG. 2 is a block diagram illustrating a control system of the screw tightening system of Embodiment 1.

FIG. 2 illustrates the schematic configuration of a control system of the screw tightening system. Description herein will be made of a case in which six screw tightening drivers (first to sixth screw tightening drivers) D1 to D6 are controlled. However, FIG. 2 illustrates only the first, second, and sixth screw tightening drivers D1, D2, and D6.

Each screw tightening driver includes a motor M serving as a driving source, the screw tightening bit B whose lower end (tip end) engages with a recess formed on a screw head, and a bit driving unit BD that drives the bit B by a driving force transmitted from the motor M. Although not shown in the drawing, an output shaft to which the bit B is detachably connected is disposed in the bit driving unit BD.

In the drawing, a casing C holding the motor M and the bit driving unit BD contains a train of reduction gears that transmits a driving force to a driving gear rotating integrally with the output shaft from an input gear attached to the output shaft of the motor M. A brush motor or a brushless motor may be used as the motor M.

Reference symbol SC denotes the servo controller that directly controls the driving of each of the screw tightening drivers shown also in FIG. 1, the servo controller SC being provided to each of the screw tightening drivers.

Reference symbol MC denotes the main controller shown also in FIG. 1 which transmits various types of operation commands to the six servo controllers SC via a communication line IL.

The servo controller SC includes a synchronization control unit C1 connected to first and second wired OR lines OR1 and OR2, a motor control unit C2 that controls a voltage or an electric current to be applied to the motor M. The motor control unit C2 includes a calculating unit CAL constituted by a CPU or the like. Moreover, the servo controller SC includes first and second transistors TR1 and TR2 constituting an input and output circuit between the synchronization control unit C1 and the first and second wired OR lines OR1 and OR2. The first and second transistors TR1 and TR2 include open collectors that respectively perform output to the first and second wired OR lines OR1 and OR2.

In this embodiment, a wired OR circuit (a circuit serving as an OR gate in a negative logic by directly leading an output of a TTL logic thereto) is formed by using the open collector output of the transistor. However, the wired OR circuit may be formed by using an open drain output of a CMOS in place of the transistor.

Further, as shown in FIG. 2, a pull-up resister PR is connected to one ends of the first and second wired OR lines OR1 and OR2.

The synchronization control unit C1 includes an odd line input circuit and an odd line output circuit which are connected to the first wired OR line OR1, and an even line input circuit and an even line output circuit which are connected to the second wired OR line OR2. The term "odd line output circuit" and "even line output circuit" are circuits that output signals indicating the odd numberth and even numberth synchronization waiting states in the screw tightening drivers D1 to D6, and the term "odd line input circuit" and "even line input circuit" are circuits to detect the states of the first wired OR line OR1 and the second wired OR line OR2.

Figure 3A:
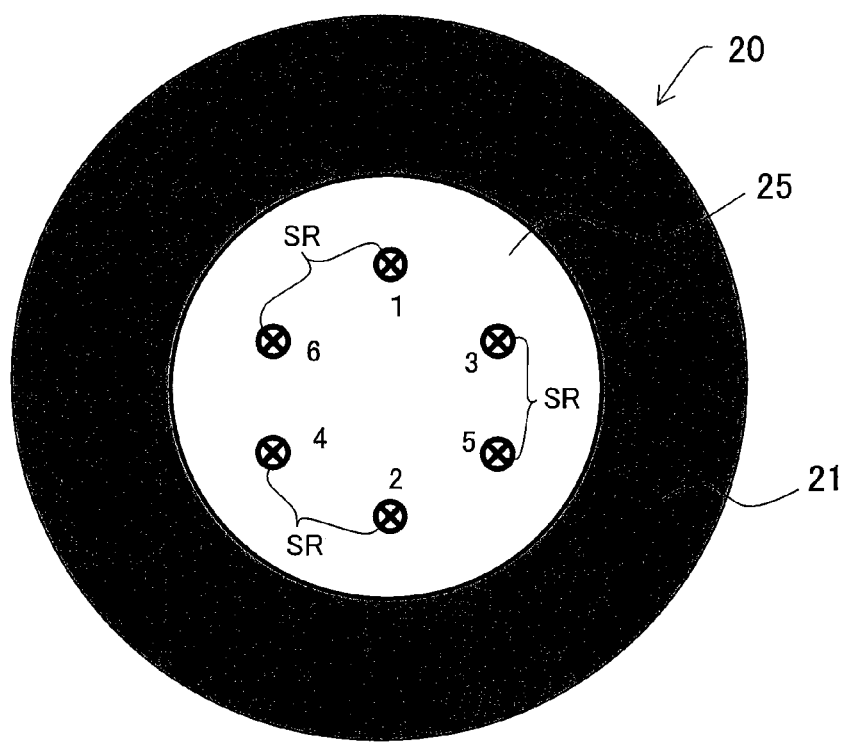
FIG. 3A is a plan view of a hard disk drive onto which screw tightening is performed by the screw tightening system of Embodiment 1.
Figure 3B:
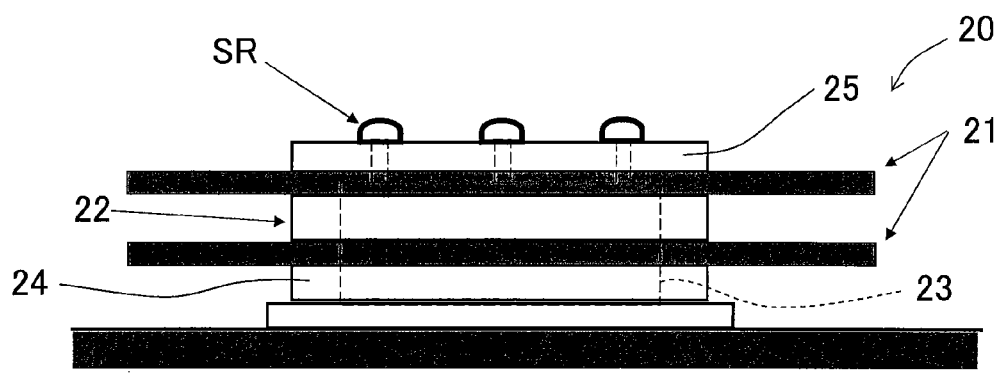
FIG. 3B is a side view of the hard disk drive shown in FIG. 3A.

The screw tightening system formed in this way is used for a clamp screw tightening process for a magnetic disk serving as a workpiece shown in, for example, FIGS. 3A and 3B, in a hard disk drive. FIG. 3A is a plan view of a magnetic disk part 20 in the hard disk drive, and FIG. 3B is a side view thereof.

The magnetic disk part 20 includes two magnetic disks 21 overlapped above and below so as to sandwich a spacer 22, and a spindle motor 23 that rotates the magnetic disks 21. A bearing 24, the magnetic disks 21, and the spacer 22 are disposed to be laminated concentrically around the outer circumference of the spindle motor 23, and a clamp plate 25 is disposed on the upper magnetic disk 21. As shown in FIG. 3A, the clamp plate 25 is connected to a rotation output part of the spindle motor 23 with six screws SR respectively disposed at apex positions of a regular hexagon. With this arrangement, the magnetic disks 21 rotate along with the rotation of the spindle motor 23, and data are written on the magnetic disks 21 or the written data are read by a magnetic read and write means (not shown). In this embodiment, the six screws SR are all right-handed screws. However, all the screws SR may be left-handed screws.

In this embodiment, when the screw tightening for the clamp plate 25 is performed, first, each screw is tightened until the screw head comes into contact with (seats on) the clamp plate 25, and thereafter, the tightening torque of each screw is increased step by step up to the final tightening torque. At this time, the six screws SR are divided into three pairs such that two screws in a diagonal position relationship in FIG. 3A are made into a pair. That is, among the first to sixth screws SR denoted with the numbers 1 to 6 in FIG. 3A, the first and second screws SR are made into a pair, and the third and fourth screws SR are made into a pair. Moreover, the fifth and sixth screws SR are made into a pair. Then, the tightening of the two screws in the same pair to the seating on the clamp plate 25 (hereinafter referred to simply as the seating) and the step-by-step increase of the tightening torque thereafter are simultaneously performed. On the other hand, among these pairs, the start of the screw tightening to the seating and the start of the increase of the tightening torque at each step are made to have a time difference. The tightenings of the first to sixth screws SR are respectively performed by the first to sixth screw tightening drivers D1 to D6. Namely, the drivers D1 and D2 as one pair, the drivers D3 and D4 as another pair, and the drivers D5 and D6 as still another pair are respectively controlled synchronously.

However, a screw tightening method for the clamp plate 25 is not limited thereto. For example, the first to sixth screws SR may be made to seat on the clamp plate 25 in this order (in a star-shaped order) first, and thereafter the tightening torques thereof may be increased step by step in the same order. Further, the six screws SR may be divided into two groups including three screws SR which are not adjacent to one another (for example, the first, fourth, and fifth screws SR, and the second, third, and sixth screws SR), and the tightening of the three screws in the same group to the seating and the step-by-step increase of the tightening torque thereafter may be simultaneously performed, and on the other hand, between these groups, the start of the screw tightening to the seating and the start of the increase of the tightening torque at each step may be made to have a time difference.

Further, in this embodiment, description is made of a case in which the clamp tightening is performed with the six screws SR. However, in the present invention, the number of screws may be an odd number or an even number other than six.

Figure 4:
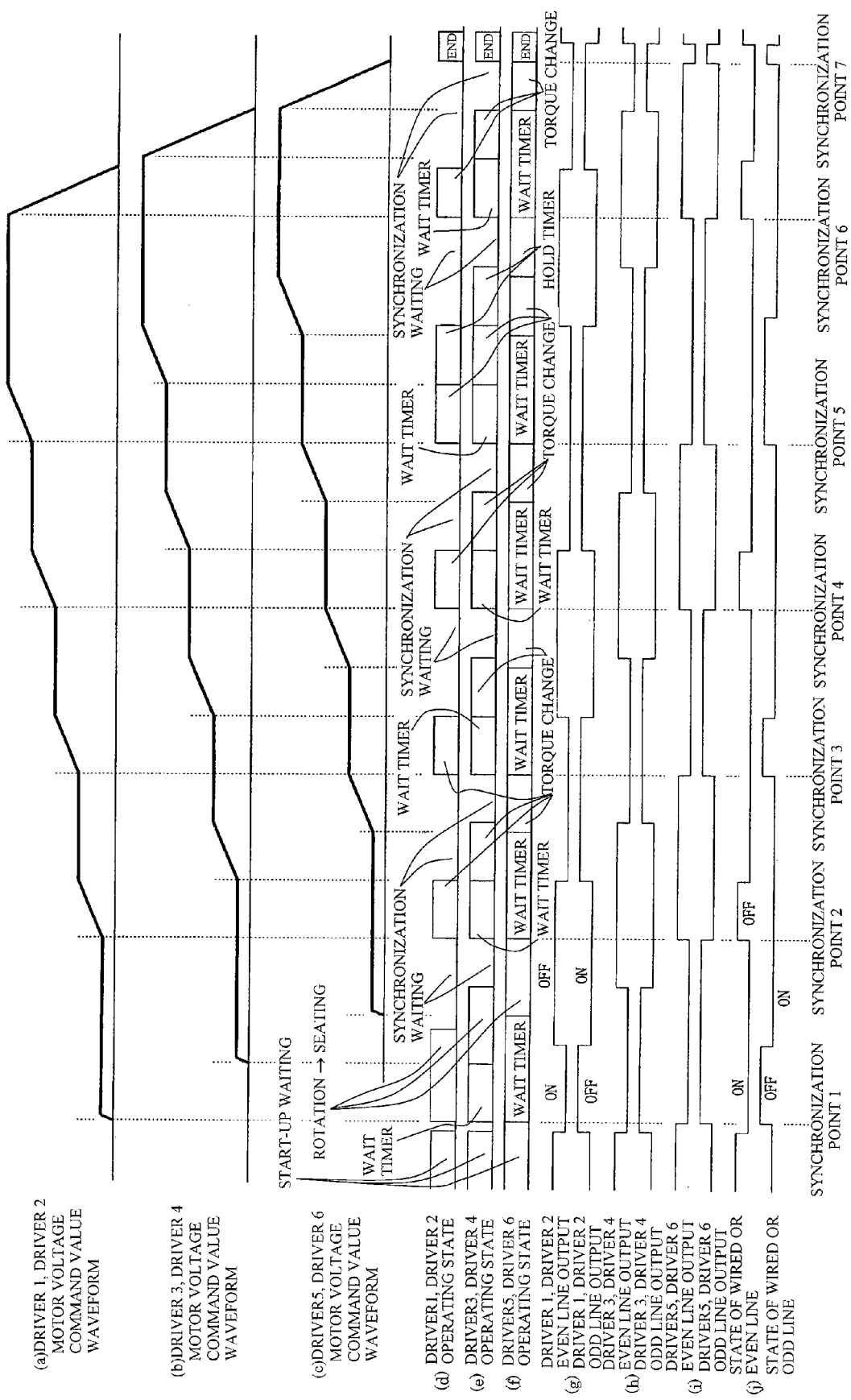
FIG. 4 is a timing chart showing the operations of the screw tightening system of Embodiment 1.

FIG. 4 shows a control procedure and operation timings of a seating operation and a tightening torque increase operation in the clamp tightening synchronization control when the above-described two drivers are made into a pair.

In FIG. 4, (a) to (c) show the changes in motor voltage command values in the seating operations and the tightening torque increase operations (hereinafter simply referred to as the torque increase operations) by the screw tightening drivers in the respective pairs. The motor voltage command value may be considered to be proportional to an output torque of the screw tightening driver. Further. In FIG. 4, (d) to (f) show the operating states of the screw tightening drivers in the respective pairs.

In FIG. 4, (a) to (i) inscribe the first and second screw tightening drivers D1 and D2 that tighten the first and second screws SR and the servo controller SC that controls the first and second screw tightening drivers D1 and D2 as "DRIVER 1, DRIVER 2", the third and fourth screw tightening drivers D3 and D4 that tighten the third and fourth screws SR and the servo controller SC that controls the third and fourth screw tightening drivers D3 and D4 as "DRIVER 3, DRIVER 4", and the fifth and sixth screw tightening drivers D5 and D6 that tighten the fifth and sixth screws SR and the servo controller SC that controls the fifth and sixth screw tightening drivers D5 and D6 as "DRIVER 5, DRIVER 6". The names will be used in the following description.

Further, in FIG. 4, (g) to (i) show the outputting states of the even and odd lines in the servo controllers SC provided to the drivers in the respective pairs. Moreover, (j) shows the states of the second wired OR line (hereinafter referred to as the even wired OR line) OR2 and the first wired OR line (hereinafter referred to as the odd wired OR line) OR1.

In (g) to (i), since the negative logic is used in this embodiment, a higher signal level corresponds to an off-state (inactive or H level), and a lower signal level corresponds to an on-state (active or L level).

When a start-up waiting signal from the main controller MC is transmitted to the respective servo controllers SC, each servo controller SC performs a start-up waiting operation including a start-up operation of the motor control unit C2, an operation for confirming an initialization state of the synchronization control unit C1 and the like. Further, the main controller MC transmits command data describing operations at respective synchronization points which will be described later to each driver (servo controller SC) through the communication line IL. Each driver stores the command data in a memory such as a flash memory or an EEPROM. After setting (judging or detecting) the respective synchronization points, each driver operates in accordance with the command data stored in the memory.

In the start-up waiting operation, due to the initialization operation which will be described later, the even line outputs of the drivers 1 to 6 in all the pairs are in an off-state, and the odd line outputs thereof are in an on-state. Further, in accordance therewith, the even wired OR line OR2 is in an off-state, and the odd wired OR line OR1 is in an on-state.

Further, the motor control unit C2 (calculating unit CAL) has a counter function of counting the number of times of synchronization waiting states, which will be described later. This synchronization waiting counter is set to 0 by the initialization operation which will be described later. The main controller MC may have a synchronization waiting counter function, and may receive information on a count value of the synchronization waiting counter via communication from each driver.

Moreover, in this start-up waiting operation, the settings of the screws SR for the respective drivers and screw holes formed in the magnetic disk unit 20 are performed.

When each driver receives a start-up signal from the main controller MC, the driver increments the synchronization waiting counter by one from 0. Then, the driver switches the even line output into an on-state, and switches the odd line output into an off-state. FIG. 4 shows a case in which the start-up operation of the drivers 5 and 6 takes a time longer than those of the other drivers due to a transmission time difference of the start-up signal from the main controller MC, variations in operation characteristics of the respective drivers and the like.

When the start-up waiting operation of any one of the drivers 1 to 6 is completed, and thus the even line output of the driver comes into the on-state, the odd wired OR line OR1 is still in the on-state, and on the other hand, the even wired OR line OR2 is switched from the off-state into an on-state.

When the start-up waiting operations of all the drivers 1 to 6 are completed, the even wired OR line OR2 is still in the on-state, and the odd wired OR line OR1 is switched from the on-state into the off-state.

Each driver sets a point in time when the odd wired OR line OR1 is switched from the on-state into the off-state, to an odd numberth synchronization point (where this is a synchronization point 1).

Then, immediately after setting the synchronization point 1, the drivers 1 and 2 rotate the motor M to tighten the first and second screws SR until they seat on the clamp plate 25 (hereinafter this operation is referred to as the seating operation).

Figure 5:
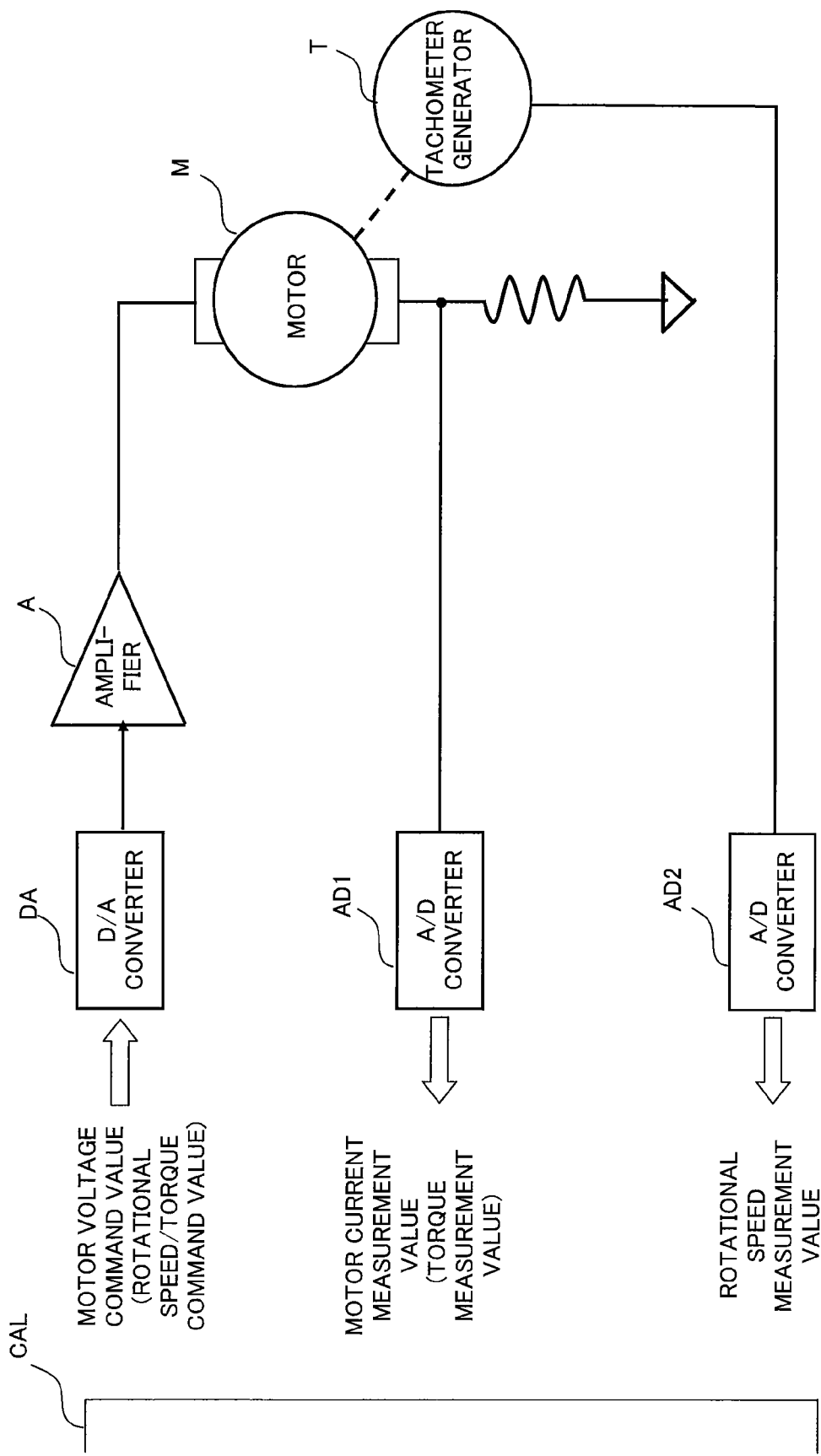
FIG. 5 is a block diagram showing the configuration of a motor control unit of the screw tightening system of Embodiment 1.

FIG. 5 illustrates part of the circuit configuration in the motor control unit C2 in each driver. In FIG. 5, reference symbol M denotes a motor, and reference symbol T denotes a tachometer generator provided for detecting a rotational speed of the motor M. An analog signal output from the tachometer generator T is converted into a digital signal indicating the rotational speed by an A/D converter AD2, to be input to the calculating unit (CPU or the like) CAL in the motor control unit C2.

Further, reference symbol DA denotes a D/A converter that converts a motor voltage command value input as a digital signal via the calculating unit CAL from the memory into an analog signal. An output signal from the D/A converter DA is amplified to a predetermined level by an amplifier A to be applied to the motor M. With this signal, the motor M rotates at a speed corresponding to the motor voltage command value or in a torque output state. An A/D converter AD1 that converts an analog value of electric current (motor current) flowing in the motor M into a digital value is connected to the motor M. An output from the A/D converter AD1 is input to the calculating unit CAL.

In accordance with the configuration of FIG. 5, the driver rotates with a small current corresponding to a frictional torque acting between the screw SR and the screw hole of the clamp plate 25 until the screw SR seats on the clamp plate 25. At this time, since speed feedback is automatically applied to the motor M by a counter-electromotive force generated in the motor M, the motor voltage command value and the motor rotational speed are approximately proportion to each other (where a proportional constant is a counter-electromotive force constant).

Since the rotation of the driver is suddenly stopped after the screw SR seats on the clamp plate 25, the counter-electromotive force in the motor M reduces to approximately zero. Therefore, the motor voltage command value and the motor rotational speed come to be approximately proportional to one another.

Accordingly, during the rotation until the screw SR seats on the clamp plate 25, the motor voltage command value is a command value of the motor rotational speed, and after the screw SR seats on the clamp plate 25, the motor voltage command value becomes a command value of motor current, i.e., an output torque. Where the proportional constant is a sum of all resistance components, such as a motor wire wound resistance and a resistance for current measurement, which are connected to the motor M in series.

When more precise rotational speed control and torque control are required independently of the counter-electromotive force constant and the resistance value, the signal from the tachometer generator T may be fed back or the current measurement value by the A/D converter AD1 may be fed back. The detection of the rotational speed may be performed on the basis of an inverse number of a time interval measurement value of an output pulse signal from a rotary encoder, which is used in place of the tachometer generator.

Even when the motor M is a brushless motor, performing electrical commutation control using a signal from a hall element, a rotary encoder or the like in place of a mechanical brush enables control of a rotational speed and a torque as is the case with a brush motor.

The seating of the screw SR can be determined by detecting that the rotational speed measurement value by the tachometer generator T, the rotary encoder or the like reduces to be equal to or lower than a specified value. Further, it may be determined by detecting that the electric current applied to the motor (motor current) rapidly increases in the measurement thereof, i.e., the torque increases.

During the period of "rotation →→→ seating" shown in FIG. 4, the motor M is caused to rotate by providing a motor voltage command value for obtaining a desired rotational speed of the motor as a target value, and the voltage is raised up to the target value at a specified voltage change rate. Then, during counting of a specified hold time (i.e., during a hold period), that voltage is kept to continue the rotation.

A time required for the seating of the screws plus some extra time a may be set to the hold time, and completion of the counting-up of the hold time may be regarded as completion of the seating. However, the start of the torque increase after the seating is delayed by the extra time a serving as a margin time. In such a case, programming so as to escape from the hold period by the above-described seating determination method based on the rotational speed or the motor current enables immediate start of the torque increase after seating.

When the seating is not detected even after the hold time has been elapsed, an error may be determined to stop the screw tightening.

Again in FIG. 4, when the seating of the first and second screws SR is detected, the drivers 1 and 2 enter a waiting state for the following even numberth synchronization point 2. At this time, the calculating units CAL of the drivers 1 and 2 cause the synchronization waiting counter to increment by one from 1 to 2. Further, the drivers 1 and 2 switch the even line outputs from the on-state into the off-state, and switch the odd line outputs from the off-state into the on-state. With this switching, the even wired OR line OR2 is still in the on-state, and on the other hand, the odd wired OR line OR1 is switched from the off-state into the on-state. In this synchronization waiting state, the drivers 1 and 2 maintain the output torque at the point in time when the seating operations are completed.

Further, the drivers 3 and 4 and the drivers 5 and 6 start counting predetermined wait times from the synchronization point 1. The wait time in the drivers 5 and 6 is set to a time longer than that of the wait time in the drivers 3 and 4.

When the wait time has elapsed, the drivers 3 and 4 start the seating operations in the same way as the drivers 1 and 2.

FIG. 4 shows the case in which the seating operations of the drivers 3 and 4 are started slightly before the completion of the seating operations of the drivers 1 and 2. When the seating operations of the drivers 3 and 4 are completed (the seating of the third and fourth screws SR is detected), the drivers 3 and 4 enter a waiting state for the following synchronization point 2. At this time, the calculating units CAL of the drivers 3 and 4 cause the synchronization waiting counter to increment by one from 1 to 2. Further, the drivers 3 and 4 switch the even line outputs from the on-state into the off-state, and switch the odd line outputs from the off-state into the on-state. At this point in time, the even wired OR line OR2 is still in the on-state, and the odd wired OR line OR1 as well is still in the on-state. In this synchronization waiting state, the drivers 3 and 4 also maintain the output torque at the point in time when the seating operations are completed.

Further, when the wait time has elapsed, the drivers 5 and 6 start the seating operations. FIG. 4 shows the case in which the seating operations of the drivers 5 and 6 are started slightly before the completion of the seating operations of the drivers 3 and 4 (however, after the completion of the seating operations of the drivers 1 and 2). When the seating operations are completed (the seating of the fifth and sixth screws SR is detected), the drivers 5 and 6 enter a waiting state for the following synchronization point 2. At this time, the calculating units CAL of the drivers 5 and 6 cause the synchronization waiting counter to increment by one from 1 to 2. Further, the drivers 5 and 6 switch the even line outputs from the on-state into the off-state, and switch the odd line outputs from the off-state into the on-state. With this switching, the even wired OR line OR2 is switched from the on-state into the off-state. On the other hand, the odd wired OR line OR1 is still in the on-state. Thereafter, the drivers 5 and 6 also maintain the output torque at the point in time when the seating operations are completed.

Each driver sets the synchronization point 2 in accordance with the switching of the even wired OR line OR2 from the on-state into the off-state.

The drivers 1 and 2 start increasing the motor voltage command values (torque increase operations) up to a value corresponding to the first target torque immediately after setting the synchronization point 2. With this operation, the output torques of the drivers 1 and 2 and the tightening torques of the first and second screws SR begin to gradually increase. Further, the drivers 3 and 4 and the drivers 5 and 6 start counting the wait times from the synchronization point 2. The wait time of the drivers 5 and 6 is set to a time longer than that of the wait time of the drivers 3 and 4. This is the same as at the respective steps in the following torque increase.

When the output torque increases up to the first target torque, i.e., when the motor voltage command value increases up to the first target torque, the drivers 1 and 2 enter a waiting state for the following odd numberth synchronization point 3. At this time, the calculating units CAL of the drivers 1 and 2 cause the synchronization waiting counter to increment by one from 2 to 3. Further, the drivers 1 and 2 switch the even line outputs from the off-state into the on-state, and switch the odd line outputs from the on-state into the off-state. With this switching, the even wired OR line OR2 is switched from the off-state into the on-state. On the other hand, the odd wired OR line OR1 is still in the on-state.

In this synchronization waiting state, the drivers 1 and 2 maintain the increased output torque (the first target torque). This time for maintaining the torque is resulted by providing the wait times to the drivers in the other pairs. The torque can be sufficiently stabilized during this time. This is the same as the drivers in the other pairs.

When the wait time has elapsed, the drivers 3 and 4 start the torque increase operations up to the first target torque in the same way as the drivers 1 and 2. FIG. 4 shows the case in which the torque increase operations of the drivers 3 and 4 are started nearly simultaneously with the completion of the torque increase operations of the drivers 1 and 2. When the torque increase operations are completed, the drivers 3 and 4 enter a waiting state for the following synchronization point 3. At this time, the calculating units CAL of the drivers 3 and 4 cause the synchronization waiting counter to increment by one from 2 to 3. Further, the drivers 3 and 4 switch the even line outputs from the off-state into the on-state, and switch the odd line outputs from the on-state into the off-state. At this point in time, the even wired OR line OR2 is still in the on-state, and the odd wired OR line OR1 as well is still in the on-state. In this synchronization waiting state, the drivers 3 and 4 as well maintain the output torque (the first target torque) at the point in time when the torque increase operations are completed.

Moreover, when the wait time has elapsed, the drivers 5 and 6 start the torque increase operations up to the first target torque. FIG. 4 shows the case in which the torque increase operations of the drivers 5 and 6 are started slightly before the completion of the torque increase operations of the drivers 3 and 4 (however, after the completion of the torque increase operations of the drivers 1 and 2). When the torque increase operations are completed, the drivers 5 and 6 enter a waiting state for the following synchronization point 3. At this time, the calculating units CAL of the drivers 5 and 6 cause the synchronization waiting counter to increment by one from 2 to 3. Further, the drivers 5 and 6 switch the even line outputs from the off-state into the on-state, and switch the odd line outputs from the on-state into the off-state. With this switching, the even wired OR line OR2 is still in the on-state, and on the other hand, the odd wired OR line OR1 is switched from the on-state into the off-state. Thereafter, the drivers 5 and 6 as well maintain the output torque (the first target torque) at the point in time when the torque increase operations are completed.

FIG. 4 shows the state in which the torque increase operations of the drivers in the respective pairs are simultaneously completed. However, in reality, a time required for the torque increase operation for each driver differs due to a variation in the operation characteristics of the servo controller SC and the motor M in many cases. In this case, even in the drivers in the same pair, the switching of the even line output and the odd line output in one driver in which the torque increase operation is earlier completed is performed earlier than that in the other driver in which the torque increase operation is not completed. However, since the state of the wired OR line to be switched is switched at a point in time when the last driver completes the torque increase operation, the synchronization point is set after the completion of the torque increase operations of all the drivers.

Each driver sets the synchronization point 3 in accordance with the switching of the odd wired OR line OR1 from the on-state into the off-state.

The drivers 1 and 2 start the torque increase operations up to a second target torque immediately after setting the synchronization point 3. Further, the drivers 3 and 4 and the drivers 5 and 6 start counting the wait times from the synchronization point 3.

In the drivers 1 and 2, when the output torque increases up to the second target torque, i.e., when the motor voltage command value increases up to a value corresponding to the second target torque, the drivers 1 and 2 enter a waiting state for the following even numberth synchronization point 4. At this time, the calculating units CAL of the drivers 1 and 2 cause the synchronization waiting counter to increment by one from 3 to 4. Further, the drivers 1 and 2 switches the even line outputs from the on-state into the off-state, and switches the odd line outputs from the off-state into the on-state. With this switching, the even wired OR line OR2 is still in the on-state, and on the other hand, the odd wired OR line OR1 is switched from the off-state into the on-state. In this synchronization waiting state, the drivers 1 and 2 maintain the increased output torque (the second target torque).

When the wait time has elapsed, the drivers 3 and 4 start the torque increase operations up to the second target torque. When the torque increase operations are completed, the drivers 3 and 4 enter a waiting state for the following synchronization point 4. At this time, the calculating units CAL of the drivers 3 and 4 cause the synchronization waiting counter to increment by one from 3 to 4. The drivers 3 and 4 switches the even line outputs from the on-state into the off-state, and switches the odd line outputs from the off-state into the on-state. At this point in time, the even wired OR line OR2 is still in the on-state, and the odd wired OR line OR1 as well is still in the on-state. In this synchronization waiting state, the drivers 3 and 4 as well maintain the increased output torque (the second target torque).

Moreover, when the wait time has elapsed, the drivers 5 and 6 start the torque increase operations up to the second target torque. When the torque increase operations are completed, the drivers 5 and 6 enter a waiting state for the following synchronization point 4. At this time, the calculating units CAL of the drivers 5 and 6 cause the synchronization waiting counter to increment by one from 3 to 4. The drivers 5 and 6 switches the even line outputs from the on-state into the off-state, and switches the odd line outputs from the off-state into the on-state. With this switching, the even wired OR line OR2 is switched from the on-state into the off-state. On the other hand, the odd wired OR line OR1 is still in the on-state. Thereafter, the drivers 5 and 6 as well maintain the output torque (the second target torque) at the point in time when the torque increase operations are completed.

Each driver sets the synchronization point 4 in accordance with the switching of the even wired OR line OR2 from the on-state into the off-state.

The drivers 1 and 2 start the torque increase operations up to a third target torque immediately after setting the synchronization point 4. Further, the drivers 3 and 4 and the drivers 5 and 6 start the torque increase operations up to the third target torque after the respective wait time has elapsed. In accordance with the completion of the torque increase operation, each driver enters a waiting state for the following synchronization point 5, and the synchronization waiting counters is set to 5. Further, each driver switches the even line output from the off-state into the on-state, and switches the odd line output from the on-state into the off-state. Due to the switching of the even line output in one of the drivers from the off-state into the on-state, the even wired OR line OR2 is switched from the off-state into the on-state.

Then, in accordance with the completion of the torque increase operations of the drivers 5 and 6, the even wired OR line OR2 is still in the on-state, and on the other hand, the odd wired OR line OR1 is switched from the on-state into the off-state. Each driver maintains the output torque (the third target torque) at the point in time when the torque increase operations are completed.

Each driver sets the synchronization point 5 in accordance with the switching of the odd wired OR line OR1 from the on-state into the off-state.

The drivers 1 and 2 start the torque increase operations up to the final target torque immediately after setting the synchronization point 5. Further, the drivers 3 and 4 and the drivers 5 and 6 start torque increase operations up to the final target torque after the respective wait time has elapsed.

At the torque increase step up to the final target torque, in order to stabilize the tightening states of the screws SR by the final target torque after the output torque reaches the final target torque, each driver enters a waiting state for the following synchronization point 6 after the counting of the predetermined hold time is completed, and sets the synchronization waiting counter to 6. Moreover, each driver switches the even line output from the on-state into the off-state, and switches the odd line output from the off-state into the on-state. Due to the switching of the odd line output in one of the drivers from the off-state into the on-state, the odd wired OR line OR1 is switched from the off-state into the on-state.

Then, in accordance with the completion of the torque increase operations of the drivers 5 and 6 and the counting-up of the hold time, the even wired OR line OR2 is switched from the on-state into the off-state. On the other hand, the odd wired OR line OR1 is still in the on-state.

Each driver sets the synchronization point 6 in accordance with the switching of the even wired OR line OR2 from the on-state into the off-state. The drivers 1 and 2 start torque reduction operations by reducing the motor command value immediately after setting the synchronization point 6. Further, the drivers 3 and 4 and the drivers 5 and 6 start the torque reduction operations after the respective wait time has elapsed.

In accordance with the completion of the torque reduction operation, each driver enters a waiting state for the following synchronization point 7, and sets the synchronization waiting counter to 7. Moreover, each driver switches the even line output from the off-state into the on-state, and switches the odd line output from the on-state into the off-state. Due to the switching of the even line output in one of the drivers from the off-state into the on-state, the even wired OR line OR2 is switched from the off-state into the on-state.

Then, in accordance with the completion of the torque reduction operations of the drivers 5 and 6, the even wired OR line OR2 is still in the on-state, and on the other hand, the odd wired OR line OR1 is switched from the on-state into the off-state.

Each driver sets the synchronization point 7 in accordance with the switching of the odd wired OR line OR1 from the on-state into the off-state. Each driver resets the count value of the synchronization waiting counter to 0 in accordance with the setting of the synchronization point 7. Moreover, each driver switches the even line output from the on-state into the off-state, and switches the odd line output from the off-state into the on-state. With this switching, the even wired OR line OR2 is switched from the on-state into the off-state, and the odd wired OR line OR1 is switched from the off-state into the on-state. This operation is the aforementioned initialization operation. Thus, a series of the screw tightening operations are completed.

In this embodiment, the initialization operation is performed when the screw tightening operation is completed. However, an initialization operation may be performed during the start-up waiting operation.

Tables in FIG. 6 show the examples of settings of the wait times (wait timer values), the motor voltage command target values (target torques), and the hold times (hold timer values) from the respective synchronization points of the drivers 1 and 2, the drivers 3 and 4, and the drivers 5 and 6. Further, the tables show time-out times for cancelling the synchronization waiting states, distinctions between continuance and termination of the synchronization processing in a series of the screw tightening operations, change rates of the motor voltage command values in the torque increase/reduction operation, and the presence or absence of escaping from the hold state based on a detection of seating as well as examples.

In FIG. 6, the wait timer values at the respective steps in the drivers 3 and 4 and the drivers 5 and 6 are set to be the same. However, these values may be set to be different from one another.

Figure 7A:
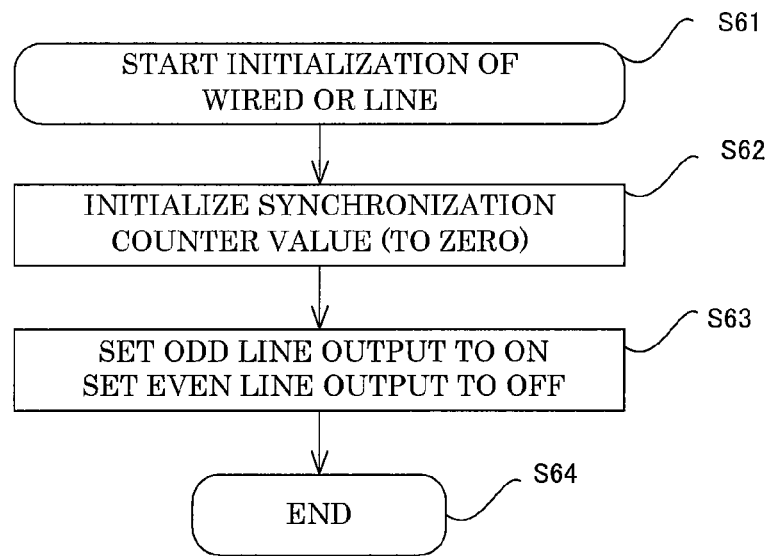
FIG. 7A is a flowchart showing the operations of the control system of the screw tightening system of Embodiment 1.
Figure 7B:
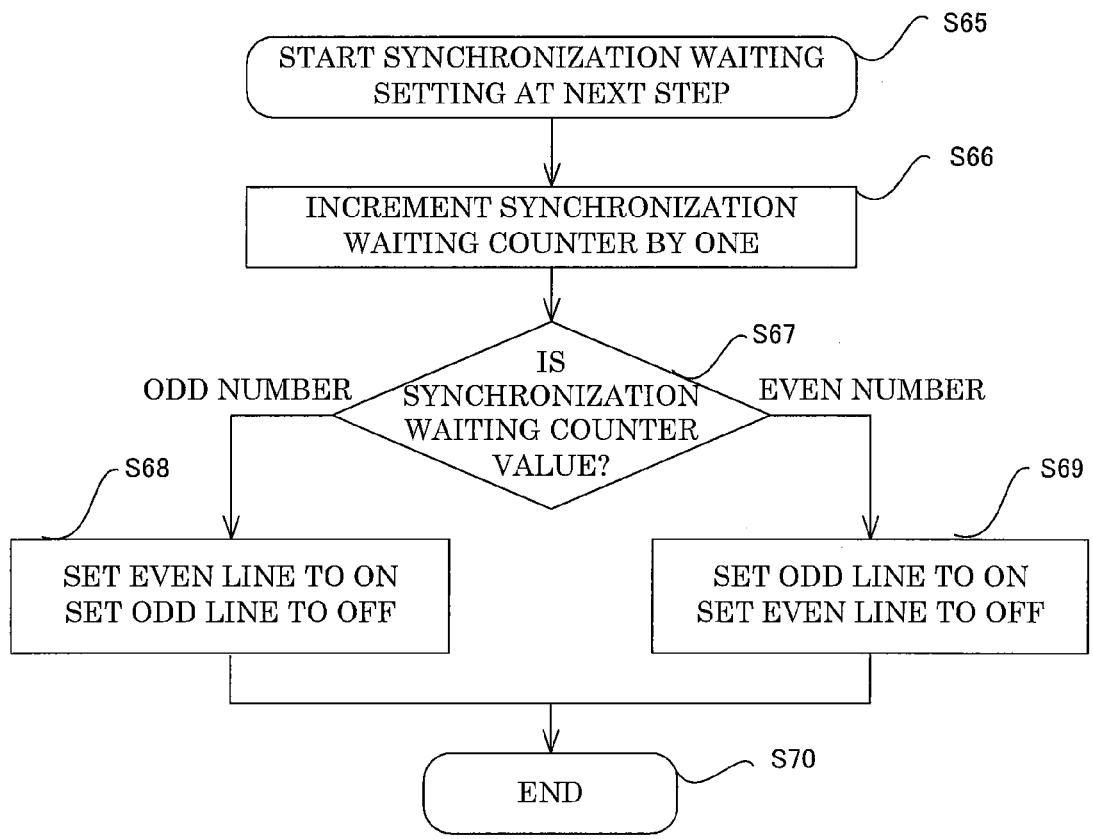
FIG. 7B is a flowchart showing the operations of the control system of the screw tightening system of Embodiment 1.
Figure 7C:
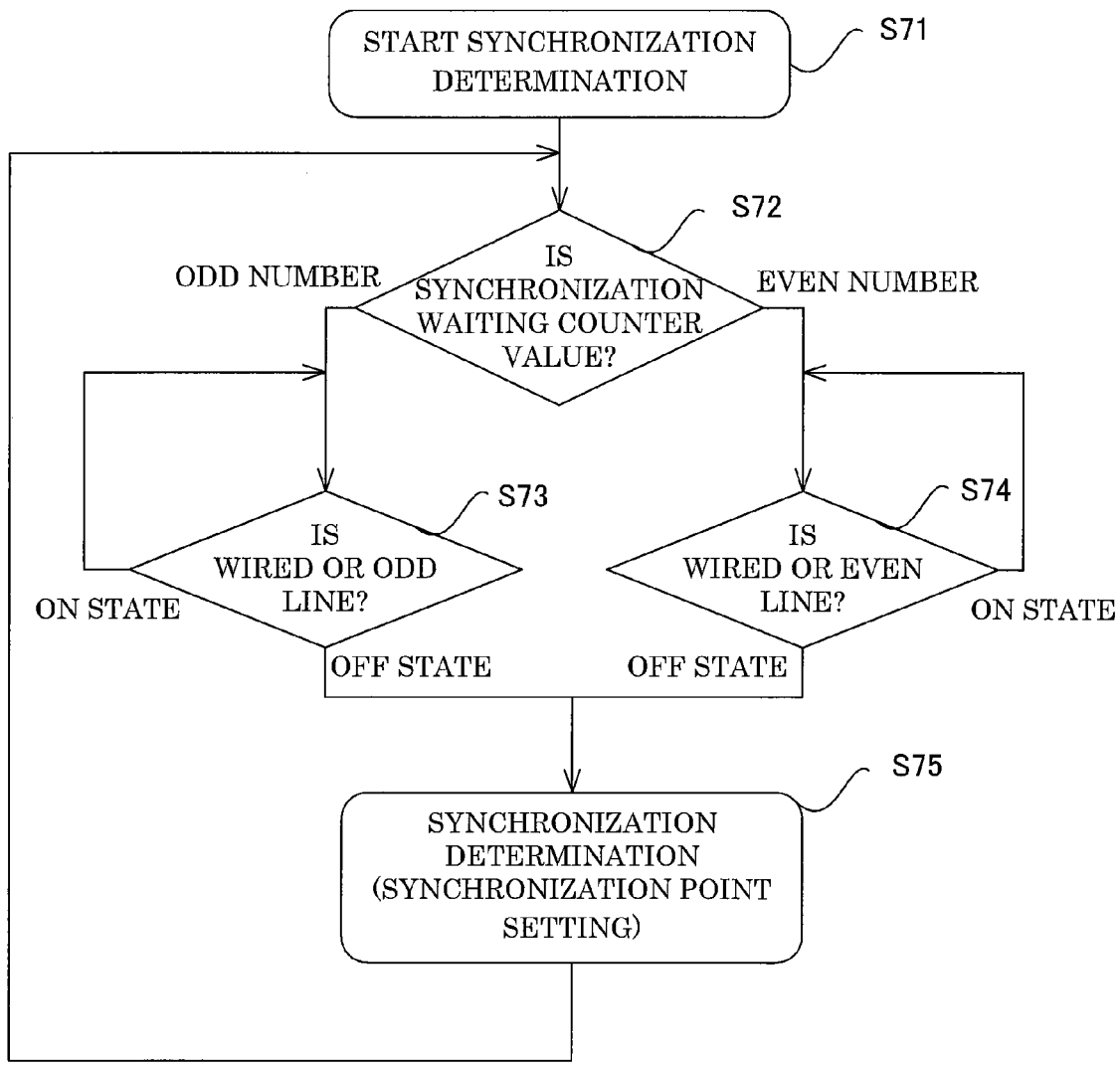
FIG. 7C is a flowchart showing the operations of the control system of the screw tightening system of Embodiment 1.

FIGS. 7A to 7C show programs for controlling the operations relating to synchronization, which are computer programs executed by the servo controller SC (or the calculating unit CAL) in each driver.

FIG. 7A is a flowchart showing the control of the initialization operation in each driver performed at the time of terminating the series of the screw tightening operations in this embodiment. First, at step (which is abbreviated as S in the figure) 61, the servo controller SC starts the initialization operation by setting the synchronization point 7. At step 62, the servo controller SC (calculating unit CAL) resets the count value of the synchronization waiting counter to 0.

Next, at step 63, the servo controller SC sets the even line output to the off-state, and sets the odd line output to the on-state. In this setting, the even wired OR line OR2 is set to the off-state, and the odd wired OR line OR1 is set to the on-state. Then, this initialization operation is completed at step 64.

FIG. 7B is a flowchart relating to the settings for the states of the even and odd line outputs, which are executed immediately after the completion of the seating operation and the completion of the torque increase/reduction operations in each driver. First, when the completion of the seating operation and the completion of the torque increase/reduction operations are detected at step 65, the routine proceeds to step 66.

At step 66, the servo controller SC (calculating unit CAL) increments the count value of the synchronization waiting counter by one. Next, at step 67, the servo controller SC determines whether the count value of the synchronization waiting counter is an odd number or an even number. When the count value is an odd number, the routine proceeds to step 68 where the servo controller SC sets the even line output to the on-state, and sets the odd line output to the off-state. When all the drivers come into this state, the even wired OR line OR2 is in the on-state, and on the other hand, the odd wired OR line OR1 is switched from the on-state into the off-state.

On the other hand, when the count value of the synchronization waiting counter is an even number, the routine proceeds to step 69 where the servo controller SC sets the even line output to the off-state, and sets the odd line output to the on-state. When all the drivers come into this state, the odd wired OR line OR1 is in the on-state, and on the other hand, the even wired OR line OR2 is switched from the on-state into the off-state.

FIG. 7C shows a flowchart for a synchronization determination operation. The synchronization determination operation is started at step 71, and next at step 72, the servo controller SC determines whether the count value of the synchronization waiting counter is an odd number or an even number. When the count value is an odd number, the routine proceeds to step 73. At step 73, the servo controller SC determines whether the odd wired OR line OR1 is in the on-state or the off-state. When the odd wired OR line OR1 is in the on-state, step 73 is repeated. Further, when the odd wired OR line OR1 is in the off-state, the routine proceeds to step 75 only in a case where the odd wired OR line OR1 was determined as in the on-state in the previous routine. At step 75, the servo controller SC determines that the current state is a state to be synchronized, and sets a synchronization point of a number which is the same as the count value of the synchronization waiting counter. Then, the routine returns to step 72.

On the other hand, when the servo controller SC determined that the count value of the synchronization waiting counter is an even number at step 72, the routine proceeds to step 74. At step 74, the servo controller SC determines whether the even wired OR line OR2 is in the on-state or the off-state. When the even wired OR line OR2 is in the on-state, step 74 is repeated. Further, when the even wired OR line OR2 is in the off-state, the routine proceeds to step 75 only in a case where the even wired OR line OR2 was determined as in the on-state in the previous routine. At step 75, the servo controller SC determines that the current state is a state to be synchronized, and sets a synchronization point of a number which is the same as the count value of the synchronization waiting counter. Then, the routine returns to step 72.

As described above, according to this embodiment, although the drivers whose number is the same as that of the screws are prepared, the step-by-step screw tightening operations (torque increase operations) can be performed in a short time while preventing inclinations of the clamp plate 25 and the magnetic disks 21, because the start timings of the seating operations and the torque increase operations after the synchronizations of the drivers in the respective pairs (or the respective drivers) have differences.

Further, the torque increase operations are not performed simultaneously for all the screws SR, a turning force acting on the clamp plate 25 and the magnetic disks 21 is reduced, and therefore the screw tightening is possible only with the right-handed screws (or the left-handed screws).

Moreover, the setting of the wait time at each torque increase step enables not only provision of a hold time after reaching the final target torque, but also provision of a hold time even during torque increase. Therefore, after the increased torque is sufficiently stabilized at each torque increase step, the following torque increase step can be performed. With this operation, the clamp plate 25 and the like can be more certainly prevented from being inclined.

Further, as shown by (a) to (c) in FIG. 4, since the torque increase command values (motor voltage command values) are set to be straight lines with limited inclinations, the clamp plate 25 and the like can be more certainly prevented from being inclined.

Further, in this embodiment, a synchronization circuit can be formed by only connecting each driver to the two wired OR lines, i.e., without providing a controller superior to the servo controller SC for the synchronization control, and thus any number of drivers can be selected. Moreover, only providing the two wired OR lines enables synchronization of many drivers by inverting the respective states of the two wired OR lines at a timing when entering the synchronization waiting state and switching a wired OR line used for the synchronization determination between the two wired OR lines at the odd numberth synchronization point and the even numberth synchronization point.

Accordingly, the synchronization circuit can be easily formed at low cost. Additionally, since a complex determination process is not required for the synchronization control, the synchronization determination process can be performed at high speed.

Embodiment 2

Figure 8:
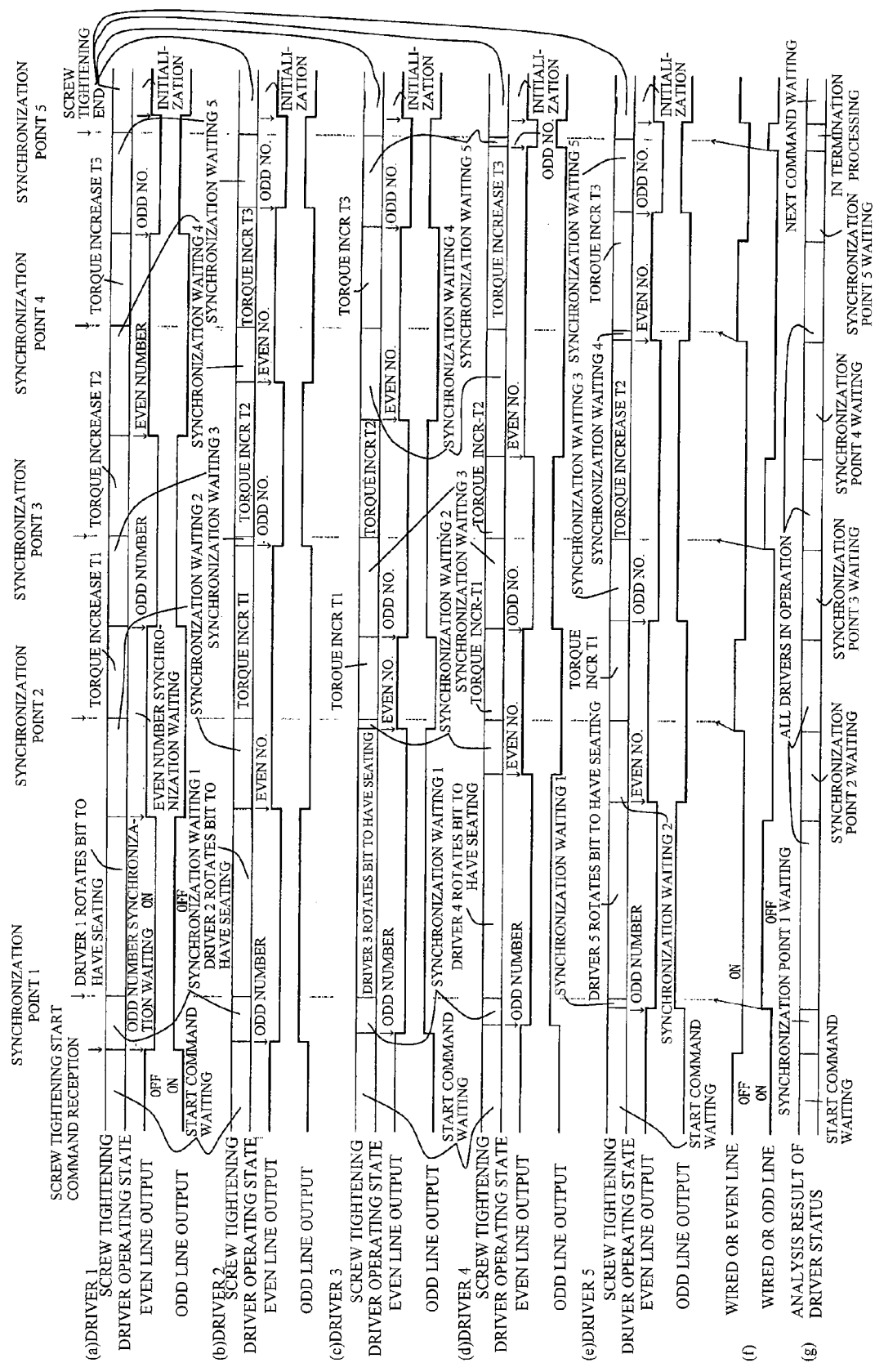
FIG. 8 is a block diagram showing the configuration of a control system of a screw tightening system that is a second embodiment (Embodiment 2) of the present invention.

FIG. 8 shows a control procedure and operation timings of the screw tightening operations by a screw tightening system that is Embodiment 2 of the present invention. This embodiment shows an example of the case in which five screws are tightened with respect to a workpiece such as the clamp plate 25 or the like by the first to fifth drivers D1 to D5 (hereinafter called the drivers 1 to 5) among all the drivers D1 to D6 described in Embodiment 1. Constituent components in this embodiment identical to those in Embodiment 1 are denoted by the same reference numerals as those in Embodiment 1.

Embodiment 1 described the case in which the start timings of the seating operations and the torque increase operations of the respective drivers after the synchronization had differences. However, this embodiment will describe a case where the seating operations and the torque increase operations of all the drivers after synchronization are simultaneously started.

In FIG. 8, (a) to (e) show the operating states of the respective drivers and the output states of the even and odd lines in the servo controllers SC provided to the respective drivers. Moreover, in FIG. 8, (f) shows the states of the even wired OR line OR2 and the odd wired OR line OR1, and (g) shows the state of all the drivers.

Since the negative logic is used in this embodiment as well, a higher signal level corresponds to an off-state (an inactive or H level), and a lower signal level corresponds to an on-state (an active or L level).

When a start-up waiting signal from the main controller MC is transmitted to each driver (servo controller SC), each driver enter a waiting state for a screw tightening start command from the main controller MC. In this screw tightening start command waiting state, due to the initialization operations which will be described later, the even line outputs of all the drivers 1 to 5 are in the off-state and the odd line outputs thereof are in the on-state. With this setting, the even wired OR line OR2 is in the off-state, and the odd wired OR line OR1 is in the on-state.

Further, each driver (the calculating unit CAL provided to the servo controller SC) has a counter function of counting the number of times of synchronization waiting states. The synchronization waiting counter is set to 0 by an initialization operation which will be described later. The main controller MC may have a synchronization waiting counter function, and may receive information on a count value of the synchronization waiting counter through communication from each driver.

Before waiting for the start command or during waiting for the start command, the settings of the screws SR for each driver and the screw holes formed in the workpiece are performed.

When the start command is transmitted from the main controller MC to each driver, and each driver receives the command, each driver causes the synchronization waiting counter to increment by one from 0. Further, each driver switches the even line output from the off-state into the on-state, and switches the odd line output from the on-state into the off-state. FIG. 8 shows a situation in which time differences in transmission of the start command from the main controller MC, variations in the operation characteristics of the respective drivers and the like result in time differences in the terminations of the start command waiting states of the respective drivers.

When one of the drivers 1 to 5 terminates the start command waiting state, and the even line output of the driver comes into the on-state, the odd wired OR line OR1 is still in the on-state, and on the other hand, the even wired OR line OR2 is switched from the off-state into the on-state.

When the start command waiting states of all the drivers 1 to 5 are completed, the even wired OR lines OR2 are still in the on-state, and the odd wired OR lines OR1 are switched from the on-state into the off-state.

Each driver sets a point in time when the odd wired OR line OR1 is switched from the on-state into the off-state to an even numberth synchronization point (where this is a synchronization point 1).

Then, immediately after setting the synchronization point 1, each driver rotates the motor M to tighten the screw until it seats on the clamp plate 25 (i.e., the each driver performs the seating operation).

A driver which has detected the seating of the screws by a method which is the same as that described in Embodiment 1 enters a waiting state for the following even numberth synchronization point 2. At this time, the driver causes the synchronization waiting counter to increment by one from 1 to 2. Further, the driver switches the even line output from the on-state into the off-state, and switches the odd line output from the off-state into the on-state.

In accordance with a seating detection of one of the drivers (i.e., the switching of the even line output from the on-state into the off-state and the switching of the odd line output from the off-state into the on-state), the even wired OR line OR2 is still in the on-state, and on the other hand, the odd wired OR line OR1 is switched from the off-state into the on-state. In this synchronization waiting state, each driver maintains its output torque at the point in time when the seating operation is completed.

When all the drivers detect seating, the odd wired OR line OR1 is still in the on-state, and on the other hand, the even wired OR line OR2 is switched from the on-state into the off-state.

Each driver sets the synchronization point 2 in accordance with the switching of the even wired OR line OR2 from the on-state into the off-state.

Each driver which has set the synchronization point 2 immediately starts the torque increase operation. A driver whose output torque reaches the first target torque (T1) enters a waiting state for the following odd numberth synchronization point 3. At this time, that driver causes the synchronization waiting counter to increment by one from 2 to 3. Further, the driver switches the even line output from the off-state into the on-state, and switches the odd line output from the on-state into the off-state.

In accordance with the completion of the torque increase operation up to the first target torque in one of the drivers (i.e., the switching of the even line output from the off-state into the on-state and the switching of the odd line output from the on-state into the off-state), the even wired OR line OR2 is switched from the off-state into the on-state. On the other hand, the odd wired OR line OR1 is still in the on-state. In this synchronization waiting state, the driver maintains the increased output torque (the first target torque).

In accordance with the completion of the torque increase operations up to the first target torque in all the drivers, the even wired OR line OR2 is still in the on-state, and on the other hand, the odd wired OR line OR1 is switched from the on-state into the off-state.

Each driver sets the synchronization point 3 in accordance with the switching of the odd wired OR line OR1 from the on-state into the off-state.

Each driver which has set the synchronization point 3 immediately starts a torque increase operation up to the second target torque (T2).

A driver whose output torque reaches the second target torque enters a waiting state for the following even numberth synchronization point 4. At this time, that driver causes the synchronization waiting counter to increment by one from 3 to 4. Further, the driver switches the even line output from the on-state into the off-state, and switches the odd line output from the off-state into the on-state.

In accordance with the completion of the torque increase operation in one of the drivers (i.e., the switching of the even line output from the on-state into the off-state and the switching of the odd line output from the off-state into the on-state), the even wired OR line OR2 is still in the on-state, and on the other hand, the odd wired OR line OR1 is switched from the off-state into the on-state. In this synchronization waiting state, the driver maintains the increased output torque (the second target torque).

In accordance with the completion of the torque increase operations up to the second target torque in all the drivers, the odd wired OR line OR1 is still in the on-state, and on the other hand, the even wired OR line OR2 is switched from the on-state into the off-state.

Each driver sets the synchronization point 4 in accordance with the switching of the even wired OR line OR2 from the on-state into the off-state.

Each driver which has set the synchronization point 4 immediately starts the torque increase operation. A driver whose output torque reaches the final target torque enters a waiting state for the following odd numberth synchronization point 5. At this time, that driver causes the synchronization waiting counter to increment by one from 4 to 5. Further, the driver switches the even line output from the off-state into the on-state, and switches the odd line output from the on-state into the off-state.

In accordance with the completion of the torque increase operation up to the final target torque in one of the drivers (i.e., the switching of the even line output from the off-state into the on-state and the switching of the odd line output from the on-state into the off-state), the even wired OR line OR2 is switched from the off-state into the on-state. On the other hand, the odd wired OR line OR1 is still in the on-state. In this synchronization waiting state, the driver maintains the increased output torque (the final target torque).

In accordance with the completion of the torque increase operations up to the final target torque in all the drivers, the even wired OR line OR2 is still in the on-state, and on the other hand, the odd wired OR line OR1 is switched from the on-state into the off-state.

Each driver sets the synchronization point 5 in accordance with the switching of the odd wired OR line OR1 from the on-state into the off-state.

Each driver which has set the synchronization point 5 resets the count value of the synchronization waiting counters to 0. Moreover, each driver switches the even line output from the off-state into the on-state, and switches the odd line output from the on-state into the off-state. With this switching, the even wired OR line OR2 is switched from the on-state into the off-state, and the odd wired OR line OR1 is switched from the off-state into the on-state. This operation is the aforementioned initialization operation. Thus, a series of the screw tightening operations are completed.

In this embodiment, the initialization operation is performed in accordance with the screw tightening operation is completed. However, the initialization operation may be performed during the start command waiting state.

Further, computer programs for controlling the operations relating to the synchronization in this embodiment are the same as those described by using FIGS. 7A to 7C in Embodiment 1.

According to this embodiment, a synchronization circuit can be formed by only connecting each driver to the two wired OR lines, and thus any number of drivers can be selected. Moreover, only providing the two wired OR lines enables synchronization of many drivers by inverting the respective states of the two wired OR lines at a timing when entering the synchronization waiting state and switching a wired OR line used for the synchronization determination between the two wired OR lines at the odd numberth synchronization point and the even numberth synchronization point. Accordingly, the synchronization circuit can be easily formed at low cost. Additionally, since a complex determination process is not required for the synchronization control, the synchronization determination process can be performed at high speed.

Embodiments 1 and 2 described the case where the odd and even wired OR lines are singularly provided. However, at least one of the odd and even wired OR lines may be plurally provided. In this case, the plural wired OR lines may be alternately used one by one in accordance with that the synchronization point is what odd or even numberth synchronization point.

Further, a wired OR line other than the odd and even wired OR lines may be added in order to inform all the drivers of a detection of problem in one of the drivers.

Moreover, Embodiments 1 and 2 described the case where seven or five synchronization points are set. However, the number of synchronization points is not limited thereto in the present invention.

Embodiment 3

Embodiments 1 and 2 described the case where the synchronization control for the screw tightening drivers is performed by using the odd and even wired OR lines. However, the same synchronization control can be applied to a motor-driven apparatus other than the screw tightening drivers.

Figure 9:
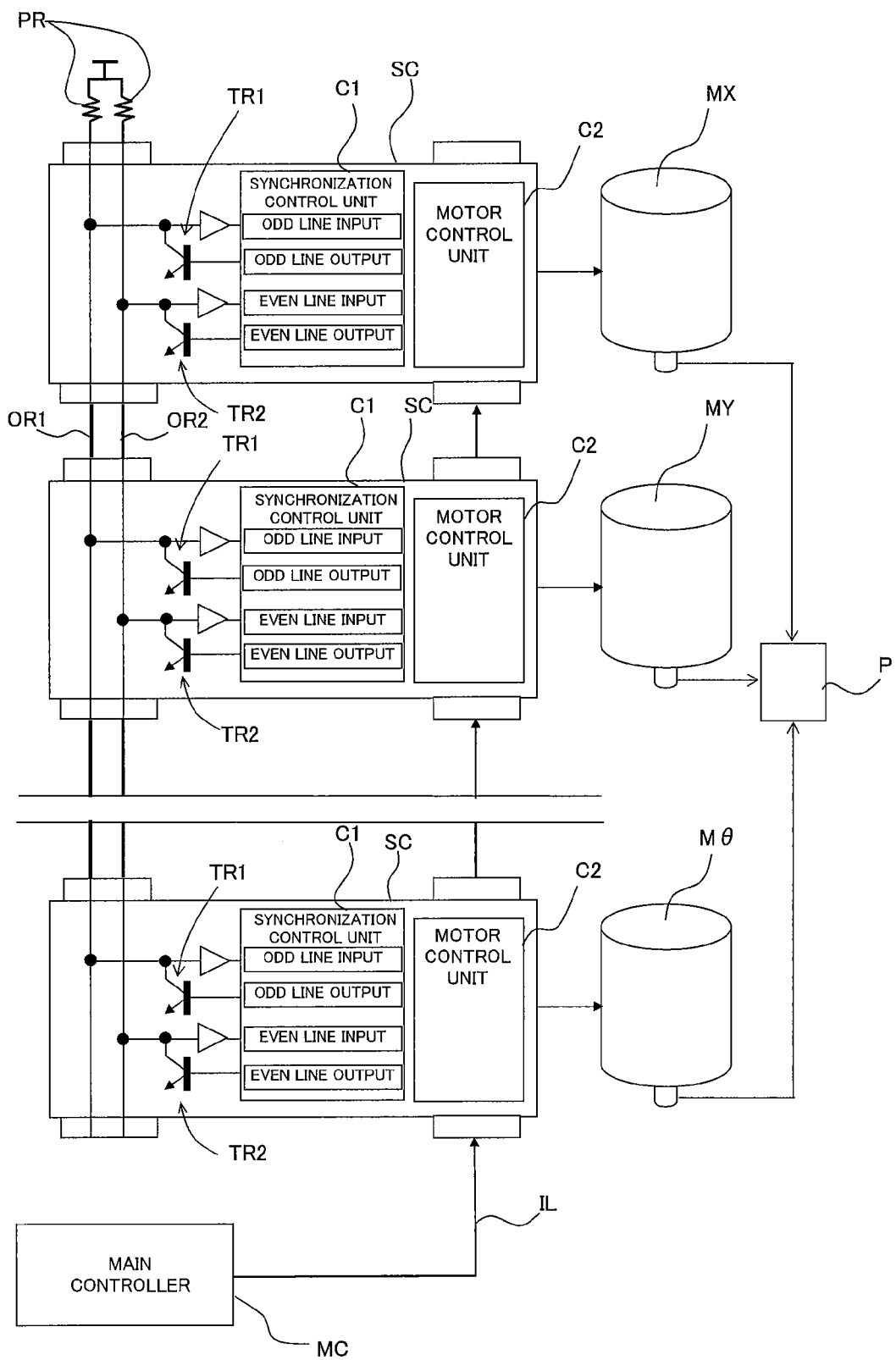
FIG. 9 is a block diagram showing the configuration of a control system of a positioning system that is a third embodiment (Embodiment 3) of the present invention.

FIG. 9 illustrates a synchronization control system for performing position control of an object (a robot arm, a positioning table or the like) P in directions of four axes (X-, Y-, Z-, and θ-axes) which is Embodiment 3 of the present invention. Constituent components in this embodiment shown in FIG. 9 identical to those in Embodiment 1 are denoted by the same reference numerals as those in Embodiment 1. In this embodiment, synchronization control of motors MX, MY, MZ, and Mθ for drive in the directions of the X, Y, Z, and θ-axes in place of the screw tightening drivers in Embodiment 1 is performed.

Figure 10:
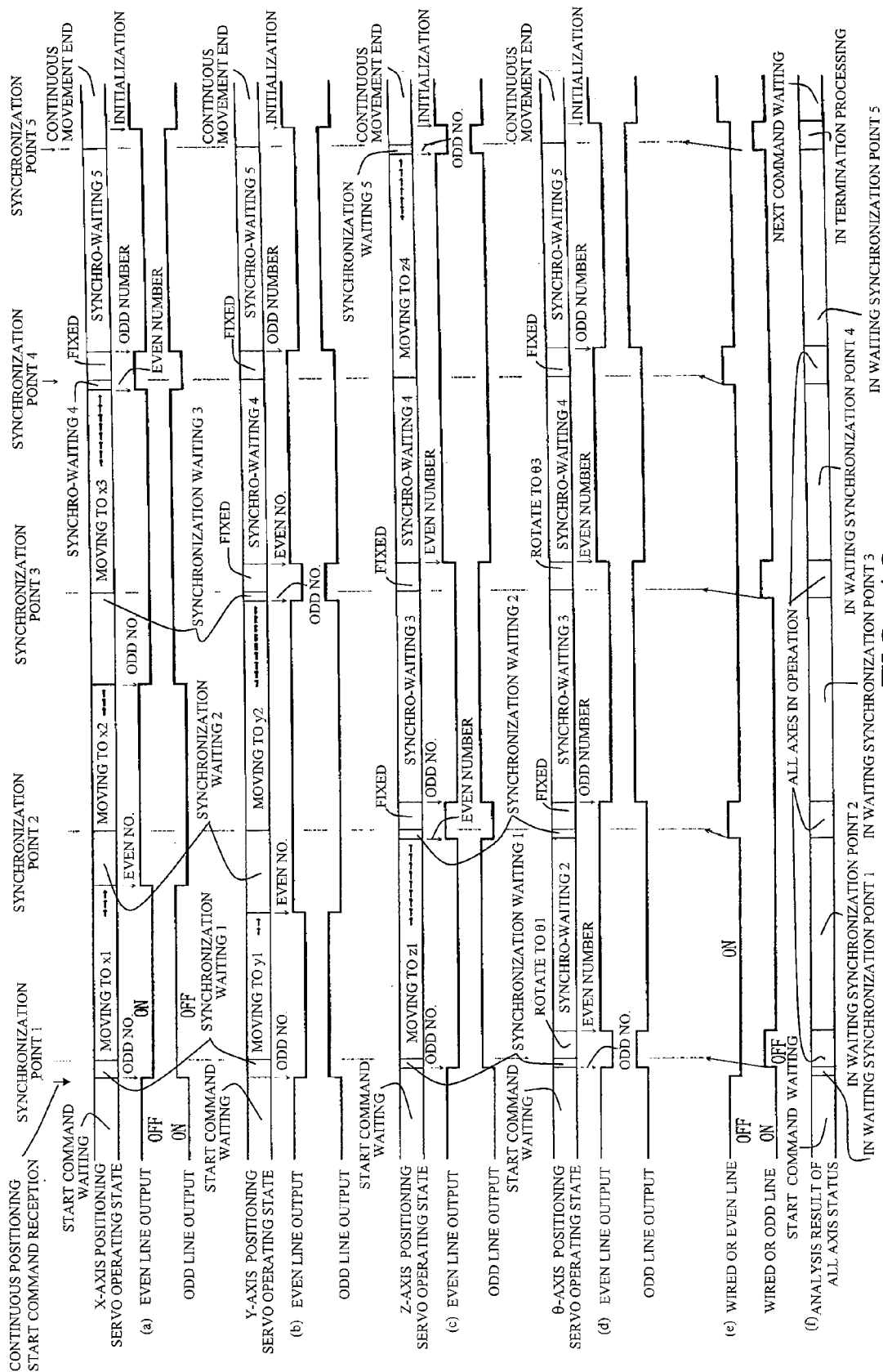
FIG. 10 is a timing chart showing the synchronization control operations of Embodiment 3.

FIG. 10 shows a control procedure and operation timings of this embodiment. This embodiment will describe, in the same way as in Embodiment 2, a case where operations of all the motors after synchronization are simultaneously started.

In FIG. 10, (a) to (d) show the operating states of the motors for the respective axes and the output states of the even and odd lines in servo controllers SC provided for the respective motors. In the following description, the servo controller SC and the motor for each axis are inclusively called the servo controller SC.

Moreover, in FIG. 10, (e) shows the states of the even wired OR line OR2 and the odd wired OR line OR1. Further, in FIG. 10, (f) shows the state of all the servo controllers SC.

Since the negative logic is used in this embodiment as well, a higher signal level corresponds to an off-state (an inactive or H level), and a lower signal level corresponds to an on-state (an active or L level).

When a start-up waiting signal from the main controller MC is transmitted to each servo controller SC, each servo controller SC enters a waiting state for a start command for a continuous positioning operation from the main controller MC. In this start command waiting state, due to an initialization operation which will be described later, the even line outputs of all the servo controllers SC are in the off-state and the odd line outputs thereof are in the on-state. With this setting, the even wired OR line OR2 is in the off-state, and the odd wired OR line OR1 is in the on-state.

Further, each servo controller SC has a counter function of counting the number of times of synchronization waiting states. The synchronization waiting counter is set to 0 by the initialization operation which will be described later. The main controller MC may have a synchronization waiting counter function, and may receive information on a count value of the synchronization waiting counter through communication from each servo controller SC.

When the start command is transmitted from the main controller MC to each servo controller SC, and each servo controller SC receives the command, each servo controller SC causes the synchronization waiting counter to increment by one from 0. Further, each servo controller SC switches the even line output into the on-state, and switches the odd line output into the off-state. FIG. 10 shows a situation in which time differences in transmission of the start command from the main controller MC, variations in the operation characteristics of the respective servo controllers SC and the like result in time differences in the terminations of the start command waiting states of the respective servo controllers SC.

When one of the servo controllers SC terminates the start command waiting state, and the even line output of the servo controller SC comes into the on-state, the odd wired OR line OR1 is still in the on-state, and on the other hand, the even wired OR line OR2 is switched from the off-state into the on-state.

When the start command waiting states of all the servo controllers SC are completed, the even wired OR line OR2 is still in the on-state, and the odd wired OR line OR1 is switched from the on-state into the off-state.

Each servo controller SC sets a point in time when the odd wired OR line OR1 is switched from the on-state into the off-state to an even numberth synchronization point (where this is a synchronization point 1).

Then, immediately after setting the synchronization point 1, each servo controller SC rotates the motor to start driving the object P to a first coordinate position (x1, y1, z1, and θ). FIG. 10 shows that differences in the driving amounts of the respective axes result in the time differences up to the driving termination.

The servo controller SC which has completed the driving of the object P to the first coordinate position enters a waiting state for the following even numberth synchronization point 2. At this time, that servo controller SC causes the synchronization waiting counter to increment by one from 1 to 2. Moreover, the servo controller SC switches the even line output from the on-state into the off-state, and switches the odd line output from the off-state into the on-state.

In accordance with the termination of the driving by one of the servo controllers SC, the even wired OR line OR2 is still in the on-state, and on the other hand, the odd wired OR line OR1 is switched from the off-state into the on-state.

When the driving of the object P to the first coordinate position is completed in all the servo controllers SC, the odd wired OR line OR1 is still in the on-state, and on the other hand, the even wired OR line OR2 is switched from the on-state into the off-state.

Each servo controller SC sets the synchronization point 2 in accordance with the switching of the even wired OR line OR2 from the on-state into the off-state. Then, each servo controller SC starts driving the object P to a second coordinate position (x2, y2, z1, and θ1). Here, a case is shown in which the object P is driven only in the directions of the X-axis and the Y-axis, and is fixed in the directions of the Z-axis and the θ-axis.

The servo controller SC which has completed the driving of the object P to the second coordinate position enters a waiting state for the following odd number synchronization point 3. The servo controllers SC for the directions of the Z-axis and the θ-axis in which the object P is fixed enter a waiting state for the synchronization point 3 after a predetermined time has elapsed from the synchronization point 2. The servo controller SC in the state waiting for the synchronization point 3 causes the synchronization waiting counter to increment by one from 2 to 3. Further, the servo controller SC switches the even line output from the off-state into the on-state, and switches the odd line output from the on-state into the off-state.

When any one of the servo controllers SC comes into the synchronization waiting state, the even wired OR line OR2 is switched from the off-state into the on-state. On the other hand, the odd wired OR line OR1 is still in the on-state.

When all the servo controllers SC come into the synchronization waiting state, the even wired OR line OR2 is still in the on-state, and on the other hand, the odd wired OR line OR1 is switched from the on-state into the off-state.

Each servo controller SC sets the synchronization point 3 in accordance with the switching of the odd wired OR line OR1 from the on-state into the off-state. Then, each servo controller SC starts driving the object P to a third coordinate position (x3, y2, z1, and θ3). Here, a case is shown in which the object P is driven only in the directions of the X-axis and the θ-axis, and is fixed in the directions of the Y-axis and the Z-axis.

The servo controller SC which has completed the driving of the object P to the third coordinate position enters a waiting state for the following even numberth synchronization point 4. The servo controllers SC for the directions of the Y-axis and the Z-axis in which the object P is fixed enter a waiting state for the synchronization point 4 after a predetermined time has elapsed from the synchronization point 3. The servo controller SC in the state waiting for the synchronization point 4 causes the synchronization waiting counter to increment by one from 3 to 4. Moreover, the servo controller SC switches the even line output from the on-state into the off-state, and switches the odd line output from the off-state into the on-state.

When any one of the servo controllers SC comes into the synchronization waiting state, the even wired OR line OR2 is still in the on-state, and on the other hand, the odd wired OR line OR1 is switched from the off-state into the on-state. When all the servo controllers SC come into the synchronization waiting state, the odd wired OR line OR1 is still in the on-state, and on the other hand, the even wired OR line OR2 is switched from the on-state into the off-state.

Each servo controller SC sets the synchronization point 4 in accordance with the switching of the even wired OR line OR2 from the on-state into the off-state. Then, each servo controller SC starts driving the object P to a final coordinate position (x3, y3, z4, and θ3). Here, a case is shown in which the object P is driven only in the direction of the Z-axis, and is fixed in the directions of the X-axis, the Y-axis, and the θ-axis.

The servo controller SC which has completed the driving of the object P to the final coordinate position enters a waiting state for the following odd numberth synchronization point 5. The servo controllers SC for the directions of the X-axis, the Y-axis, and the θ-axis in which the object P is fixed enter a waiting state for the synchronization point 5 after a predetermined time has elapsed from the synchronization point 4. The servo controller SC in the state waiting for the synchronization point 5 causes the synchronization waiting counter to increment by one from 4 to 5. Further, the servo controller SC switches the even line output from the off-state into the on-state, and switches the odd line output from the on-state into the off-state.

When any one of the servo controllers SC comes into the synchronization waiting state, the even wired OR line OR2 is switched from the off-state into the on-state. On the other hand, the odd wired OR line OR1 is still in the on-state.

When all the servo controllers SC come into the synchronization waiting state, the even wired OR line OR2 is still in the on-state, and on the other hand, the odd wired OR line OR1 switched from the on-state into the off-state.

Each servo controller SC sets the synchronization point 5 in accordance with the switching of the odd wired OR line OR1 from the on-state into the off-state. The main controller MC which has detected the setting of the synchronization point 5 transmits a continuous movement termination command to each servo controller SC.

Each servo controller SC received the termination command resets the count value of the synchronization waiting counter to 0. Further, each servo controller SC switches the even line output from the on-state into the off-state, and switches the odd line output from the off-state into the on-state. With this switching, the even wired OR line OR2 is switched from the on-state into the off-state, and the odd wired OR line OR1 is switched from the off-state into the on-state. This operation is the aforementioned initialization operation. In this way, a series of continuous positioning operations are completed.

In this embodiment, the initialization operation is performed in accordance with the completion of the continuous positioning operation. However, the initialization operation may be performed during the start command waiting state.

Further, computer programs for controlling the operations relating to the synchronization in this embodiment are the same as those described by using FIGS. 7A to 7C in Embodiment 1.

According to this embodiment, a synchronization circuit can be formed by only connecting each servo controller SC to the two wired OR lines, and thus any number of driving axes can be selected. Moreover, only providing the two wired OR lines enables synchronization of many servo controllers SC by inverting the respective states of the two wired OR lines at a timing when entering the synchronization waiting state and switching a wired OR line used for the synchronization determination between the two wired OR lines at the odd numberth synchronization point and the even numberth synchronization point. Accordingly, the synchronization circuit can be easily formed at low cost. Additionally, since a complex determination process is not required for the synchronization control, the synchronization determination process can be performed at high speed.

This embodiment described the case where the odd and even wired OR lines are singularly provided. However, at least one of the odd and even wired OR lines may be plurally provided. In this case, the plural wired OR lines may be alternately used one by one in accordance with that the synchronization point is what odd or even numberth synchronization point.

Further, a wired OR line other than the odd and even wired OR lines may be added in order to inform all the servo controllers SC (driving axes) of a detection of problem in one of the servo controllers SC.

Moreover, this embodiment described the case where the five synchronization points are set. However, the number of synchronization points is not limited thereto in the present invention.

Embodiment 4

In order to prevent the inclination of the workpiece by the step-by-step tightening torque increase control as described in Embodiments 1 and 2, each of actual screw tightening drivers must precisely generate an output torque (tightening torque) corresponding to a motor voltage or motor current command value (torque command value) regardless of its rotational angle.

However, cogging torque of a motor serving as a driving source of the screw tightening driver (torque fluctuations due to unevenness of permeability of a core of the motor or due to dimension errors and fabrication errors of parts constituting the motor) appears as a tightening torque fluctuation of the screw tightening driver in many cases. Additionally, in some cases, the magnitude of the torque fluctuation in the motor M varies in accordance with the level of the torque command value (a motor applied voltage or a motor applied current) due to winding unevenness of a motor winding or the like.

Therefore, it is necessary to measure actual tightening torque of the screw tightening driver for the torque command value at every rotational angle, and to correct the torque command value provided to the driver so as to suppress a fluctuation in tightening torque according to the rotational angle.

This embodiment will describe a torque measurement apparatus capable of automatically measuring the output torque of the screw tightening driver at every predetermined rotational angle.

Figure 11:
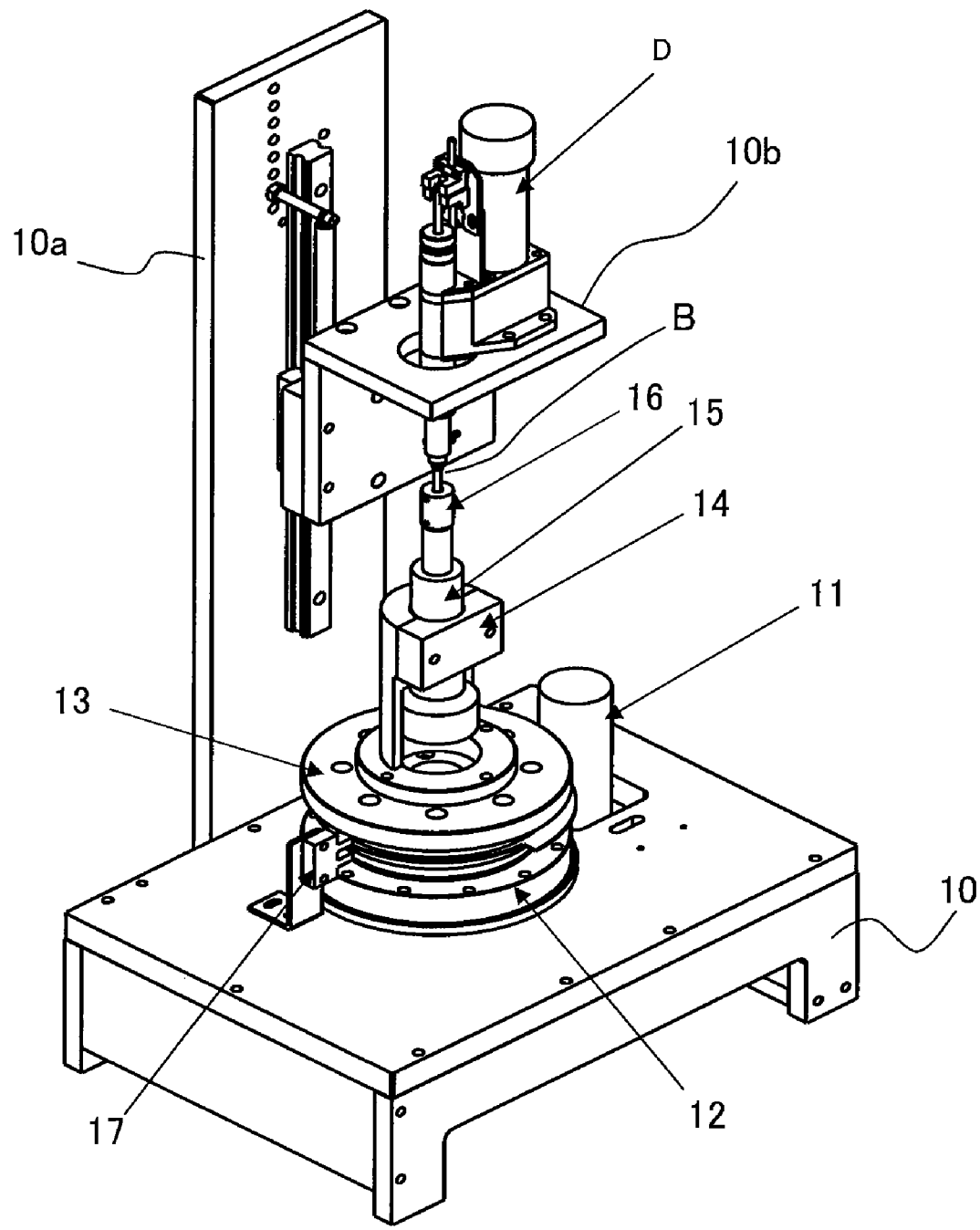
FIG. 11 is an external view of a torque measurement apparatus that is a fourth embodiment (Embodiment 4) of the present invention.
Figure 12:
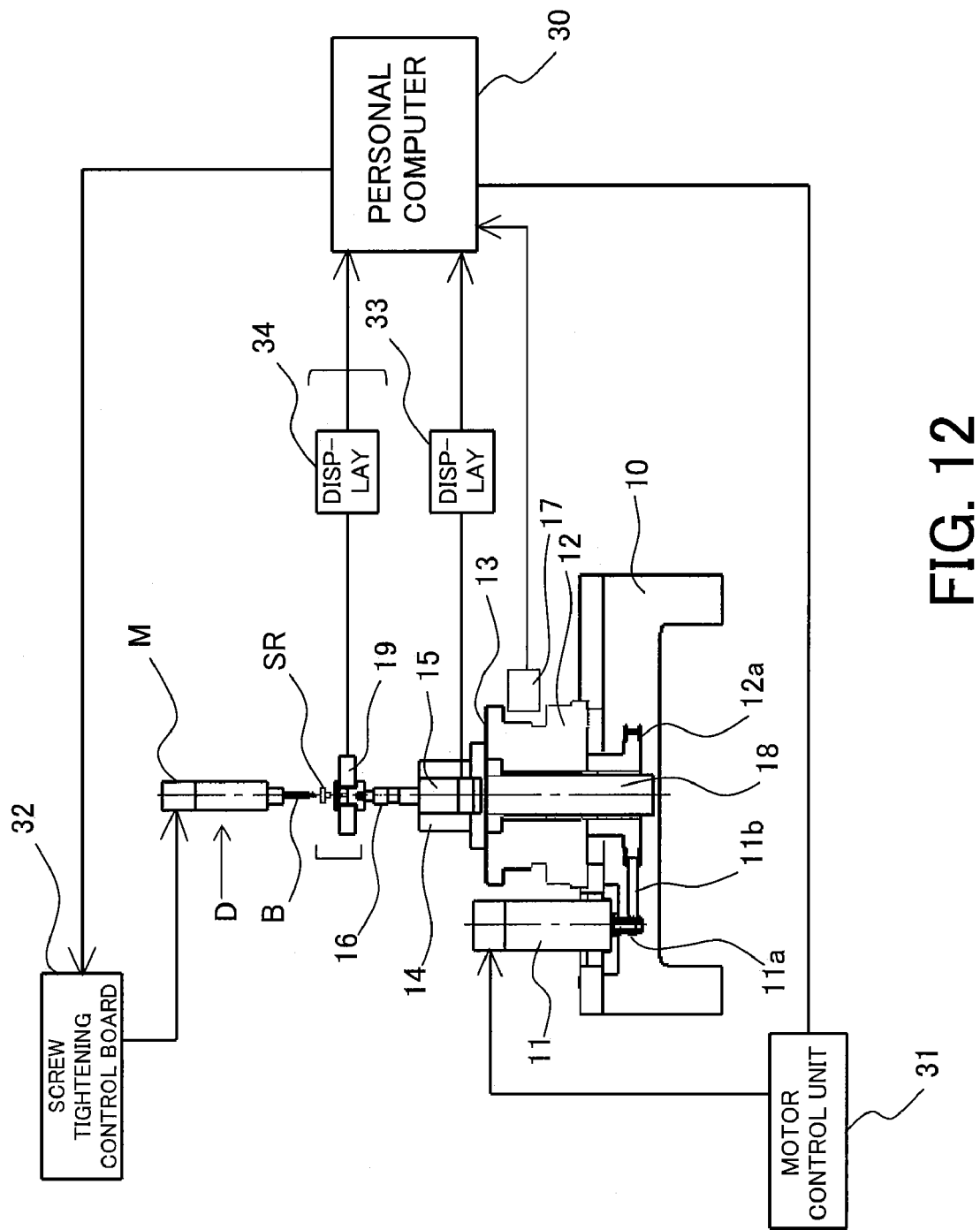
FIG. 12 is a block diagram showing the configuration of the torque measurement apparatus of Embodiment 4.

FIGS. 11 and 12 respectively show an external view and a block diagram of the torque measurement apparatus of this embodiment. In these drawings, reference numeral 10 denotes a base. A stepping motor 11 and a rotation mechanism 12 driven by the motor 11 are attached to the base 10.

The rotation mechanism 12 includes at its upper end a rotary table 13 supported by a shaft 18 shown in FIG. 12. The rotation mechanism 12 includes at its lower end a pulley 12a to input rotation, and a harmonic drive (Registered Trademark) (not shown) that reduces the speed of the rotation input through the pulley 12a to transmit the rotation to the rotary table 13.

A belt 11b is wound over between the pulley 12a and a pulley 11a attached to the output shaft of the motor 11. Therefore, when the motor 11 rotates, the rotary table 13 is rotated around the shaft 18 through a speed reduction by the belt 11b and the pulleys 11a and 11b serving as a first speed reduction mechanism and a speed reduction by the harmonic drive serving as a second speed reduction mechanism. A speed reduction function greater than the pulley belt mechanism of the harmonic drive can provide finer rotational angle resolution of the rotary table 13 than a step angle after the speed reduction by the pulley belt mechanism. As the first speed reduction mechanism, a gearing system or a roller mechanism other than the pulley belt mechanism described above may be used. However, a mechanism with extremely-little backlash or slippage should be selected as the first speed reduction mechanism.

Reference numeral 17 denotes a rotational angle sensor fixed to the base 10, which detects a rotational angle of the rotary table 13. A ring-shaped pulse plate is attached so as to face the upper surface of the rotational angle sensor 17 on the lower surface of the rotary table 13. The rotational angle sensor 17 irradiates light onto the pulse plate and receives light in a pulsed form reflected on the pulse plate to output a pulse signal. As the rotational angle sensor 17, a sensor in a detection method other than such an optical detection method sensor may be used. The output signal from the rotational angle sensor 17 is input to a personal computer 30 which will be described later.

Reference symbol D denotes a screw tightening driver serving as a measuring object, which is fixed to a lifting table 10b of an lifting mechanism 10a provided to the base 10.

A torque sensor 15 is fixed to the rotary table 13 via a holding member 14. A bit B of the screw tightening driver D is connected to the torque sensor 15 via a coupling 16. The torque sensor 15 outputs an electrical signal corresponding to the torque received from the bit B. There are a wide variety of torque sensors of a strain gauge method, a magnetostrictive effect method, a phase difference detection method, a mechanical reactive force method, a contact type, a noncontact type and the like. However, a type of the torque sensor used in this embodiment and the present invention may be any one of them.

Although not shown in FIG. 11, as shown in the parentheses in FIG. 12, a load cell 19 serving as an axial force sensor may be provided above the torque sensor 15 via the coupling 16. The load cell 19 detects an axial force (screw axial force) generated in a screw SR tightened by the driver D. With respect to the load cell 19 as well, any type thereof may be used as is the case with the torque sensor 15.

Reference numerals 33 and 34 denote indicators which respectively transfer detection signals from the torque sensor 15 and the load cell 19 to the personal computer 30, and convert the detection signals into numeric signals to indicate a torque value and an axial force value as numeric values thereon.

As shown in FIG. 12, the measurement apparatus and the screw tightening driver D are driven by a controller including the personal computer 30, a motor control unit 31, and a screw tightening control board 32, to perform a measurement operation.

The motor control unit 31 controls the rotation of the motor 11 in accordance with a command from the personal computer 30.

Further, the screw tightening control board 32 is identical to that used in the motor control unit C2 of the servo controller SC described in Embodiments 1 and 2.

As in embodiments which will be described later, a function of correcting the torque command value on the basis of the torque characteristic (torque fluctuation) measured by the measurement apparatus of this embodiment is added to the motor control unit C2 actually used in the screw tightening system. However, in a case in which a torque correction effect obtained by the function is confirmed, the screw tightening control board 32 to which the function is added is used.

Figure 13:
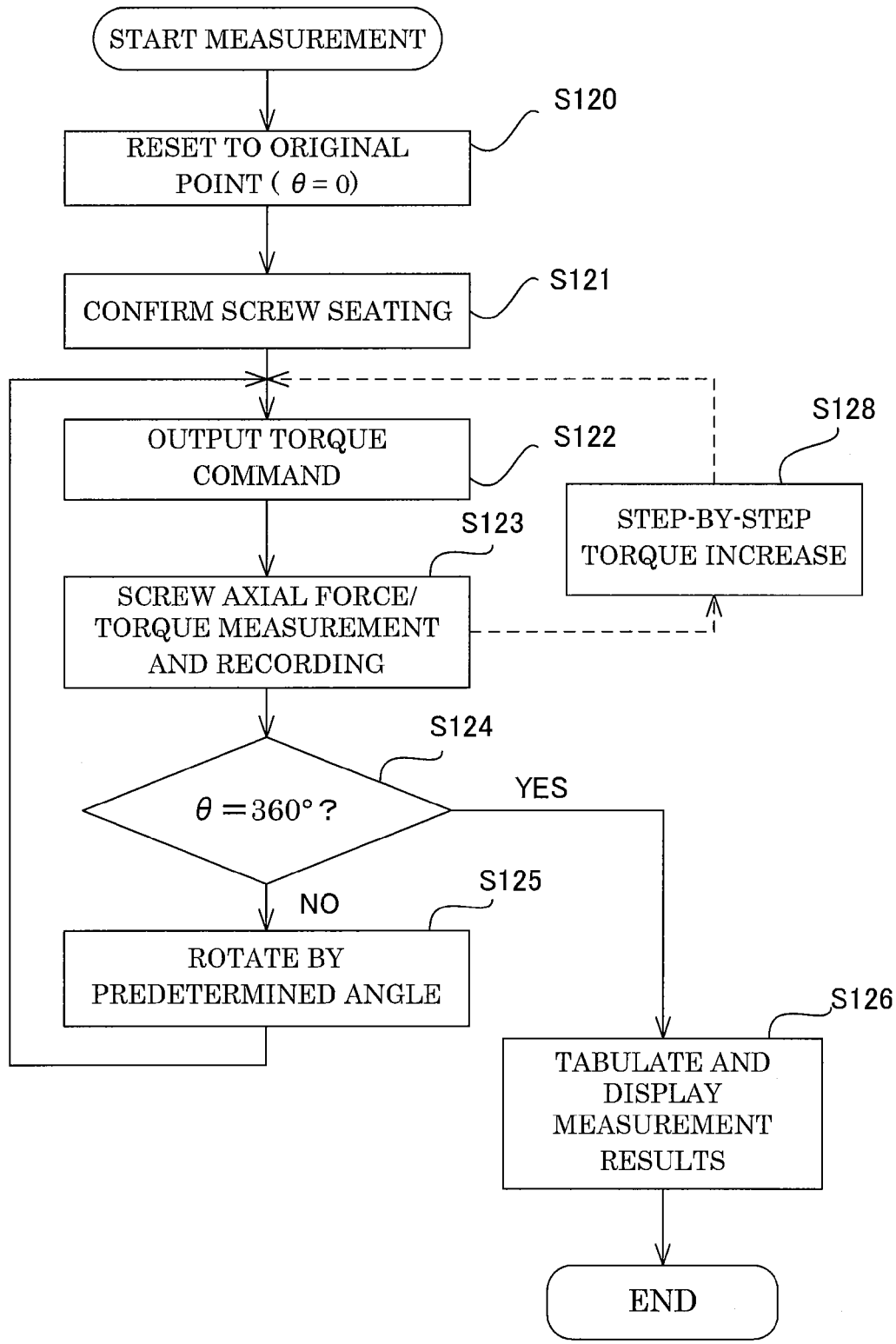
FIG. 13 is a flowchart showing the control operations of the torque measurement apparatus of Embodiment 4.

Next, description of the measurement operation by the torque measurement apparatus formed as described above will be made by using FIG. 13. FIG. 13 is an operational flowchart of the personal computer 30 that controls the torque measurement apparatus. Further, the measurement operation in a case in which the load cell 19 is provided in addition to the torque sensor 15 will be described.

When the measurement operation is started, the personal computer 30 drives the motor 11 via the motor control unit 31 first to set the rotary table 13 to a position of the original point of θ=0 at step 120. At this time, a rotational angle counter (not shown) provided inside the personal computer 30 is reset to 0.

Next, at step 121, the personal computer 30 confirms whether or not the screw SR set in advance is in a seating state on the load cell 19. The seating detection method described in Embodiment 1 may be used for this seating confirmation.

Next, at step 122, the personal computer 30 outputs a torque command to the screw tightening control board 32. The torque command can be appropriately selected within a range used for tightening the screw SR in the actual screw tightening system. For example, a torque command corresponding to the final target torque described in Embodiments 1 and 2 may be selected.

The torque command is fixed during at least one rotation (360° rotation) of the rotary table 13. The screw tightening control board 32 that received the torque command applies a voltage corresponding to the torque command to the motor M of the driver D to provide a turning force (tightening torque) to the bit B.

Next, at step 123, the personal computer 30 records a screw axial force value indicated by a detection signal from the load cell 19 and a torque value indicated by a detection signal from the torque sensor 15 together with a count value of the rotational angle counter in a memory provided in the personal computer 30.

In a case in which the measurement at the original point position is performed, the personal computer 30 records the values as, for example, "0.00°: SF, TS", where SF represents the screw axial force and TS represents the tightening torque.

Next, at step 124, the personal computer 30 determines whether or not the count value of the rotational angle counter has reached a measurement termination angle (for example, 360°). When the count value has not reach the measurement termination angle, the personal computer 30 proceeds to step 125 to output a command to the motor control unit 31 for rotating the rotary table 13 (i.e., the torque sensor 15 and the bit B coupled therewith) by a predetermined rotational angle. The predetermined rotational angle can be set to any angle in advance by a measurer.

Then, the personal computer 30 returns to step 122 to perform the measurement and recording of the screw axial force and the screw tightening torque at an angle after the rotation. In this way, the personal computer 30 repeats to rotate the rotary table 13 and to measure and record the screw axial force and the tightening torque until the count value of the rotational angle counter reaches the measurement termination angle. When the count value reaches the measurement termination angle, the personal computer 30 proceeds to step 126.

At step 126, the personal computer 30 tabulates the results of the series of measurements repeated from the original point position to display them in a graph form or the like on a monitor (not shown). Then, the personal computer 30 completes the operations for measuring fluctuations in screw axial force and tightening torque during at least one rotation of the driver D.

The description was made of the case in which the measurement of the screw axial force and the tightening torque for one torque command is performed at every rotational angle. However, as shown at step 128 in FIG. 13, the step 122 and the step 123 may be repeatedly performed while increasing the torque value step by step at every rotational angle (for example, while step by step increasing the torque value from the first target torque to the final target torque as described in Embodiment 1). With this operation, in a case in which the magnitude of the torque fluctuation in the motor M varies in accordance with the level of the torque command value (the motor applied voltage or the motor applied current), the torque fluctuation in the driver D at each command value can be measured.

Figure 14:
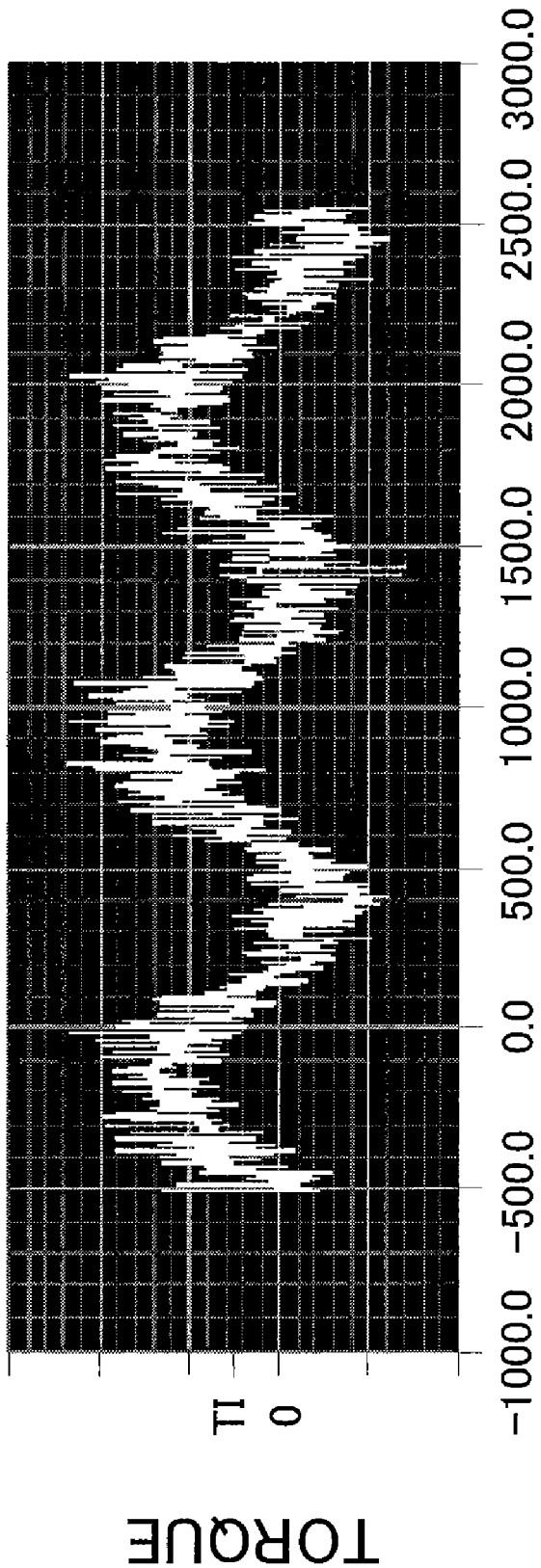
FIG. 14 illustrates an example of a torque measurement result by the torque measurement apparatus of Embodiment 4.

FIG. 14 illustrates a measurement result of a fluctuation in tightening torque in one rotation, which is obtained by the torque measurement apparatus. FIG. 14 shows the measured tightening torque in a case in which the rotary table 13 is rotated by each angle corresponding to 360°/2047 (about 0.176°). Reference symbol TI in the drawing denotes the torque command value.

According to this embodiment, even in a case in which one rotation of the driver D is divided into extremely many rotational angles, accurate measurement and recording of the tightening torque and the screw axial force at every angle are automatically performed, and the tabulation and display of the results thereof are further automatically performed. Therefore, the measurement and display of the results thereof can be performed in a shorter time with significantly finer resolution and higher accuracy as compared with a conventional measurement method in which the setting is manually performed at every rotational angle.

Further, providing the load cell 19 along with the torque sensor 15 enables the measurements of the tightening torque and the screw axial force generated by the tightening torque simultaneously. A relationship between a tightening torque applied to a screw and an axial force generated in the screw can be estimated by calculation. However, the measurement of a screw axial force actually generated can be effectively used for more precisely performing the setting and management of the tightening torque in the screw tightening system.

This embodiment described the case where the tightening torque of the screw tightening driver is measured by the torque measurement apparatus. However, the torque measurement apparatus of the present invention can be used for measuring an output torque of a motor-driven apparatus using a motor as a driving source, which is other than the screw tightening driver, and an output torque of a simple motor.

Embodiment 5

As described at the beginning of Embodiment 4, in order to prevent the inclination of the workpiece by performing the step-by-step tightening torque increase control as in Embodiments and 2, the actual screw tightening driver must precisely generate the output torque corresponding to the motor voltage command value (torque command value) regardless of its rotational angle. However, the cogging torque of the motor serving as the driving source of the screw tightening driver (torque fluctuations due to unevenness of permeability of the core, and dimension errors and fabrication errors of parts constituting the motor) appears as the tightening torque fluctuation of the screw tightening driver in many cases. Moreover, in some cases, the magnitude of the torque fluctuation in the motor M varies in accordance with the level of the torque command value (the motor applied voltage or the motor applied current) due to the winding unevenness of the motor winding or the like.

Then, this embodiment will describe a screw tightening apparatus in which the tightening torque fluctuations with respect to the torque command values at a plurality of levels are measured by using the torque measurement apparatus shown in Embodiment 4, and the tightening torque fluctuation at each torque level can be corrected at every extremely fine rotational angle.

Figure 15:
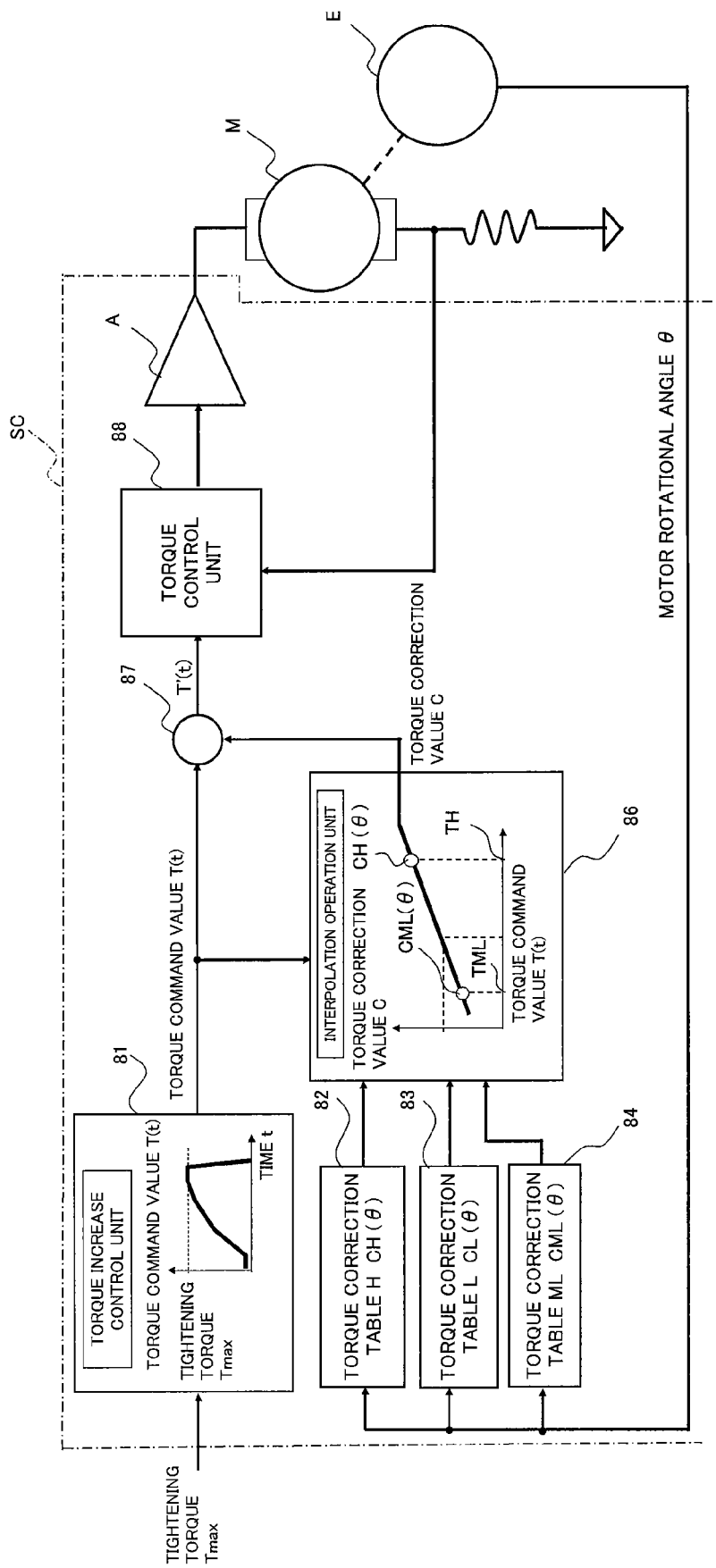
FIG. 15 is a block diagram showing the configuration of a torque fluctuation correction system that is a fifth embodiment (Embodiment 5) of the present invention.

FIG. 15 illustrates the configuration of part of the screw tightening system which is Embodiment 5 of the present invention.

Reference numeral 81 denotes a torque increase control unit provided to the servo controller SC. In the torque increase control unit 81, as described in Embodiment 1, a map of a torque command value T(t) which is command data transmitted from the main controller MC is stored in a memory thereof. FIG. 15 shows the torque command value map in which a torque value is continuously increased. However, in reality, this is a map in which a torque value is increased step-by-step while waiting the respective synchronization points described in Embodiments 1 and 2.

Correction data memories 82, 83, and 84, an interpolation calculation part 86, an adder 87, a torque control unit 88, and an amplifier A which will be described below are provided in the motor control unit C2 (refer to FIG. 2) of the servo controller SC.

Torque correction tables serving as correction data groups which will be described later are stored in the correction data memories 82, 83, and 84.

A torque correction table H stored in the memory 82 is a correction data table to correct the torque command value when a high-level torque command value TH (for example, a maximum target torque value Tmax in Embodiments 1 and 2) is input as the torque command value T(t) to the servo controller SC from the torque increase control unit 81.

A method for preparing the torque correction table H will be described by using FIG. 16A. First, a tightening torque when the torque command value TH is issued to the driver D is measured several times at every predetermined rotational angle of the driver D by using the torque measurement apparatus described in Embodiment 4 (step <which is abbreviated as S in the figure> 201). Typical torque fluctuation data is obtained by averaging the measurement results of the several times (refer to FIG. 14) or by performing polynomial approximation by a least-square method (step 202). With this operation, torque fluctuation data from which the effect of noise components other than torque fluctuation components unique to the motor M serving as the driving source of the driver D is eliminated can be obtained. The noise components include, for example, a torque fluctuation component due to a frictional fluctuation of gears when the driver D includes a reduction gear. The least-square method is a technique for determining a coefficient of a model function with which a square sum of differences between measurement values and model function values is minimized.

Then, a difference between the obtained typical torque fluctuation data and the torque command value TH is calculated for every rotational angle (step 203). When a value of the difference is a positive value, the same value with negative sign is a correction value for that rotational angle, and when a value of the difference is a negative value, the same value with positive sign is a correction value for that rotational angle. In this way, correction values for all the rotational angles are calculated, and then the torque correction table H is prepared as a table of the correction values in accordance with the rotational angles (step 204). Then, the prepared torque correction table H is stored in the correction data memory 82 (step 205).

This torque correction table may be automatically prepared by the personal computer 30 shown in Embodiment 4. Further, the torque correction table may be prepared by using a method other than the method described above. For example, the torque correction table may be prepared such that an average torque value between a maximum torque value and a minimum torque value obtained on the basis of the measurement results of the torque fluctuations is calculated, and a difference between the average torque value and a value of the fluctuation data at every rotational angle is determined, and the sign of a value of the difference is reversed.

A torque correction table L stored in the memory 83 is a correction data table to correct the torque command value when a low-level torque command value TL (for example, the first target torque value in Embodiments 1 and 2) is input as the torque command value T(t) to the servo controller SC from the torque increase control unit 81.

Moreover, a torque correction table ML stored in the memory 84 is a correction data table to correct the torque command value when a middle-level torque command value TML (for example, a torque value intermediate between the maximum target torque value Tmax and the first target torque value) is output as the torque command value T(t) from the torque increase control unit 81. A method for preparing these torque correction tables L and ML is the same as that for the torque correction table H described above.

In this embodiment, in order to prepare the torque correction tables H, L, and ML for three torque command values, it is necessary to measure the tightening torques for the three torque command values by the torque measurement apparatus described in Embodiment 4.

Figure 16A:
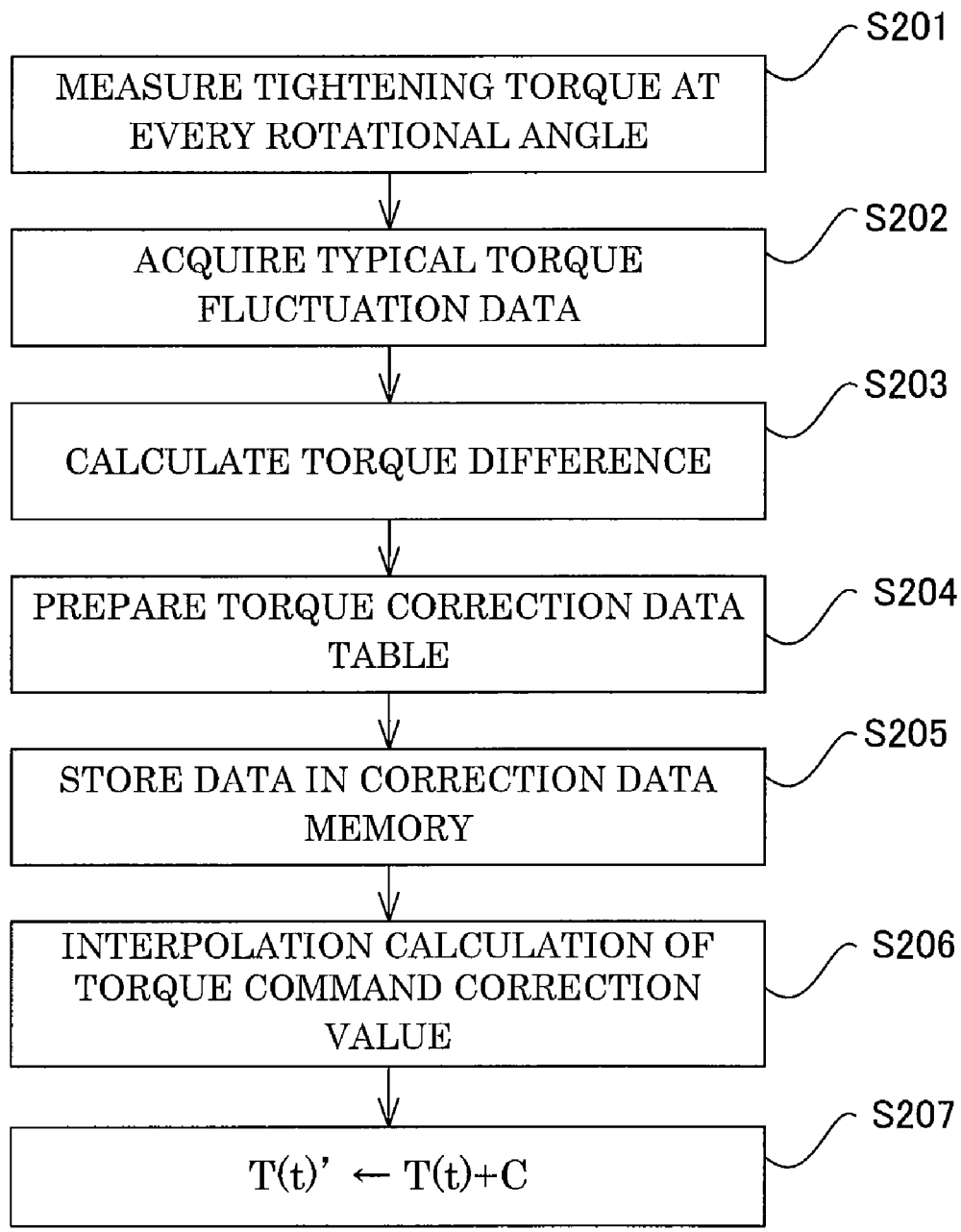
FIG. 16A is a flowchart showing a torque fluctuation correction procedure of Embodiment 5.
Figure 16B:
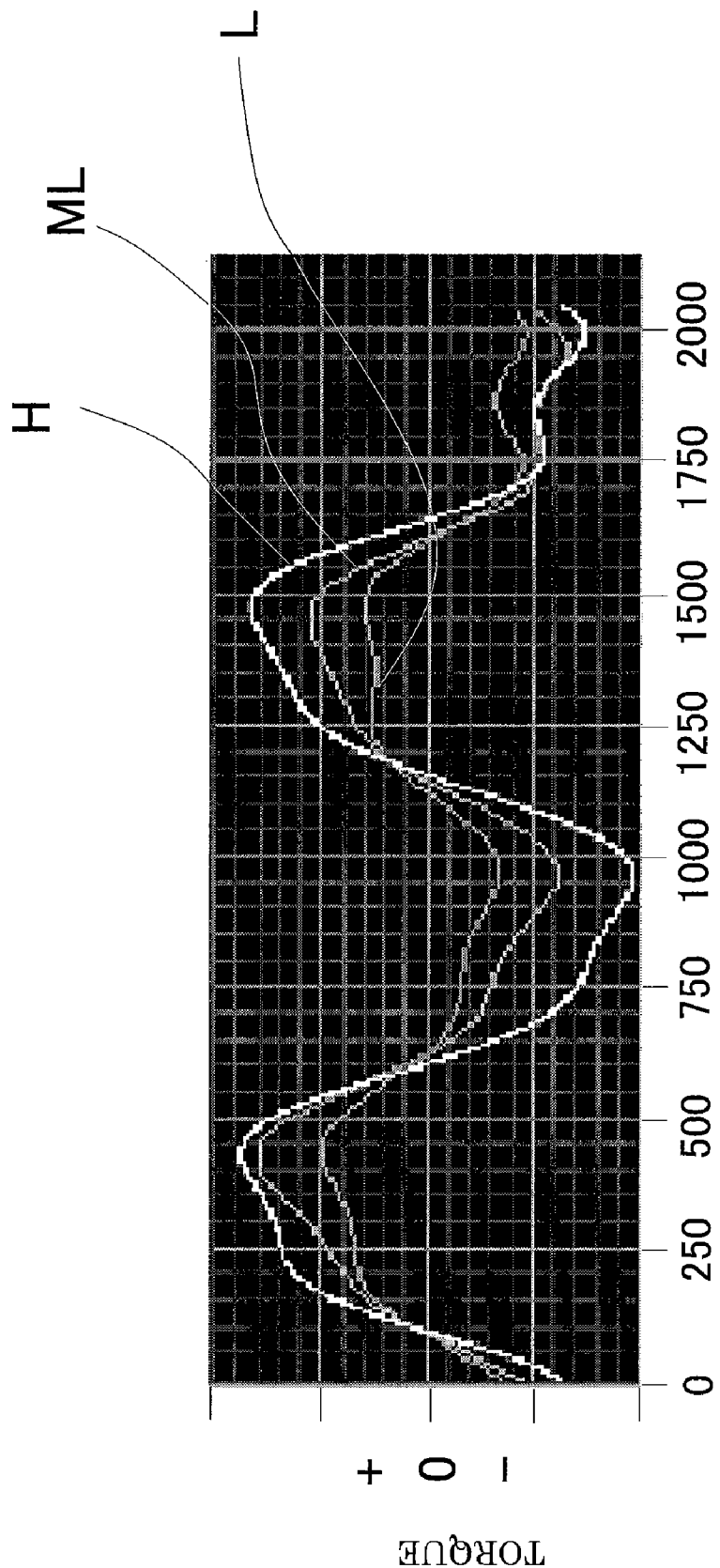
FIG. 16B illustrates an example of torque correction data used in the torque fluctuation correction system of Embodiment 5.

Examples of the torque correction tables H, L, and ML are shown in FIG. 16B. The values of the respective torque correction tables shown in this drawing vary to a positive side and a negative side from the borderline of 0 in accordance with the rotational angle of the driver D. Further, the values of the respective torque correction tables vary so as to be formed into, not line shapes and not sinusoidal waveforms, but complex shapes.

The torque command value T(t) is input from the torque increase control unit 81 to the interpolation calculation part 86, and a signal from an encoder E (which may be a tachometer generator) for detecting the rotational angle of the motor M of the driver D is input thereto.

The interpolation calculation part 86 selects from the three torque correction tables H, L, and ML a correction data table for a torque command value corresponding to the input torque command value T(t) or two correction data tables for two torque command values between which the input torque command value T(t) is present. FIG. 15 shows a case where the torque correction tables H and ML are selected because the input torque command value T(t) is present between the torque command values TH and TML.

Then, the interpolation calculation part 86 reads out a correction value corresponding to the rotational angle of the driver D detected through the encoder E from the selected torque correction table. When the selected torque correction table is a table for the torque command value corresponding to the torque command value T(t), the interpolation calculation part 86 directly outputs the read correction value. Further, when two torque correction tables are selected, and two correction values are read out of these tables, the interpolation calculation part 86 determines a correction value for the torque command value T(t) by an interpolation calculation on the basis of these two correction values (step 206 in FIG. 16A).

FIG. 15 shows an example in which a correction value C for the torque command value T(t) is calculated by linear interpolation by using two correction values CH(θ) and CML(θ) read out from the torque correction tables H and ML.

In detail, first, in a case of T(t)>TML, the torque correction tables H and ML are selected to read out CH(θ) and CML(θ).

Then, in accordance with proportional distribution of CH(θ) and CML(θ), the correction value C is calculated on the basis of:

$$C = \{CH(\theta) - CML(\theta)\}/(TH-TML) \times (T(t)-TML) + CML(\theta).$$

In a case of T(t)<TML, the torque correction tables ML and L are selected to read out CML(θ) and CL(θ).

Then, in accordance with proportional distribution of CML(θ) and CL(θ), the correction value C is calculated on the basis of:

$$C = \{CML(\theta) - CL(\theta)\}/(TML-TL) \times (T(t)-TL) + CL(\theta).$$

Even in a case in which T(t) corresponds to one of TH, TML, and TL, the correction value may be calculated by applying T(t) to the above-described linear interpolation formula.

The method for calculating the correction value C is not limited to the linear interpolation method as described above. An interpolation may be performed by using, for example, a quadratic or higher-order expression including three points (TL, CL(θ)), (TML, CML(θ)), and (TH, CH(θ)).

Further, when TH is less than the maximum torque command value in the screw tightening or greater than the minimum torque command value (the first target torque value) in the screw tightening, the correction value C may be determined by, not the interpolation method described above, but an extrapolation method.

Moreover, this embodiment described the case where the torque correction tables H, L, and ML for the three torque command values are prepared. However, in the present invention, torque correction tables for two torque command values or four or more torque command values may be prepared. In a case as well where four or more torque correction tables are prepared, the correction value C may be determined by the interpolation method or the extrapolation method using the correction tables for two torque command values between which the input torque command value T(t) is present. In this way, preparing many correction tables enables a favorable reduction of the torque fluctuations even when the nonlinearity is strong in the relationship between the torque command value (motor applied voltage) and the output torque.

The correction value C obtained in this way is output form the interpolation calculation part 86 to be added to the torque command value T(t) input from the torque increase control unit 81 by the adder 87 (step 207 in FIG. 16A). Then, a corrected torque command value T'(t) (=T(t)+C) is input to the torque control unit 88.

The torque control unit 88 outputs a voltage corresponding to the corrected torque command value T'(t) to the amplifier A, and then a voltage amplified by the amplifier A is applied to the motor M. With this voltage, the driver D can generate a tightening torque corresponding to the original torque command value T(t). Thus, the tightening torque fluctuations of the screw tightening driver due to the cogging torque of the motor M, the permeability unevenness of the core, and the dimension errors and fabrication errors of parts constituting the motor M can be favorably corrected.

Then, performing such a correction of the torque command value T(t) for every rotational angle enables reduction of the torque fluctuations associated with changes in rotational angle of the driver D, thereby making it possible to stably generate a tightening torque corresponding to the torque command value T(t).

Moreover, in this embodiment, since the correction value C is optimized in accordance with the level of the torque command value, the torque fluctuations can be reduced within a wide range of torque levels.

Figure 17:
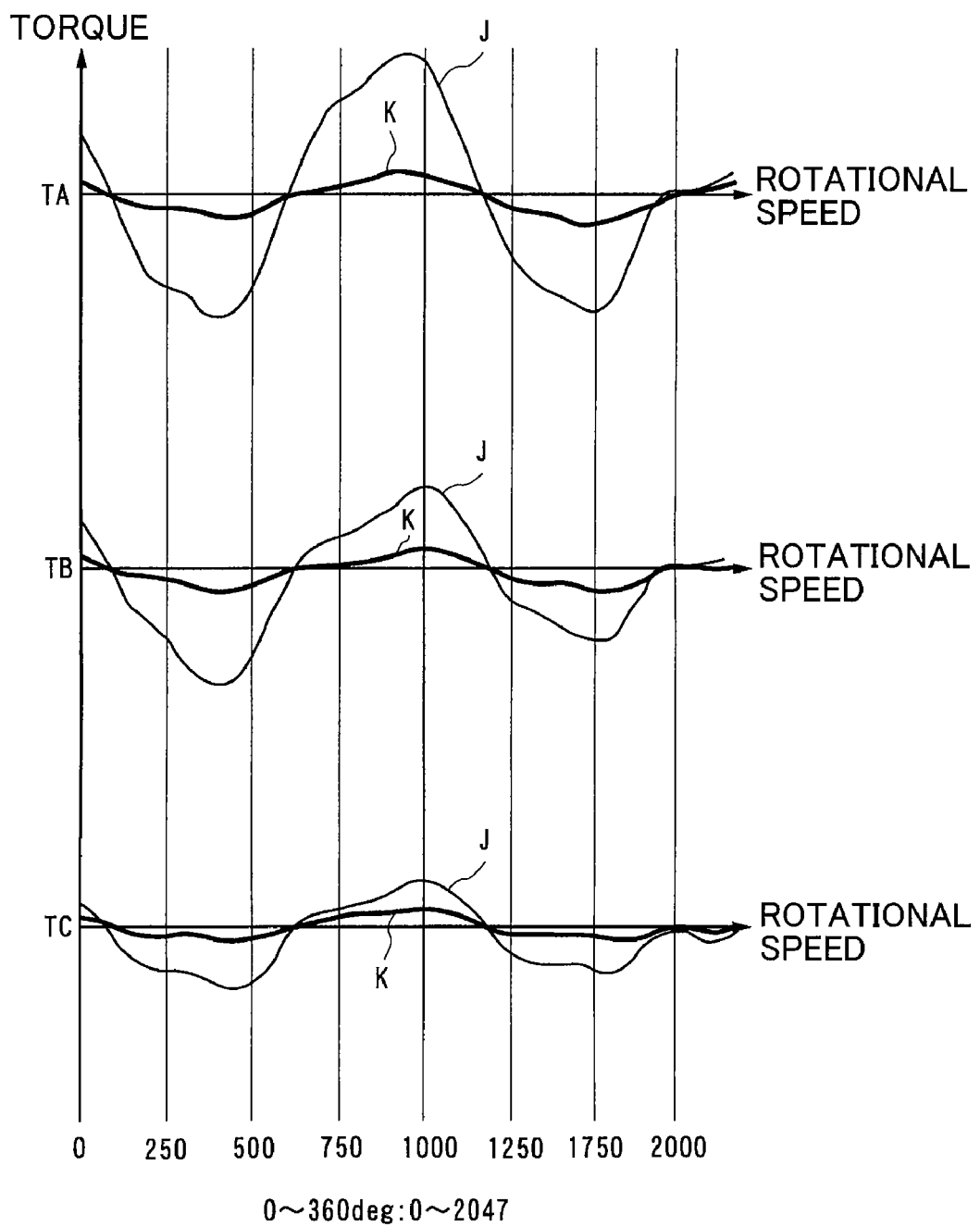
FIG. 17 illustrates an example of torque measurement results before and after correction by the torque fluctuation correction system of Embodiment 5.

FIG. 17 shows an example (an image view) in a case where the torque fluctuations of the screw tightening driver are corrected by the method described in this embodiment. In FIG. 17, reference symbols TA, TB, and TC denote arbitrary torque command values, which are in a relationship of TA>TB>TC.

Reference symbols J in the drawing denote data obtained by averaging or approximating with the least-square method the measurement data of the tightening torques generated in the actual screw tightening driver for the torque command values TA, TB, and TC. Further, reference symbols K in the drawing denote data obtained by averaging or approximating with the least-square method the measurement data of the tightening torques generated in the screw tightening driver for the torque command values corrected by the method described in this embodiment. Both measurement data are obtained by the torque measurement apparatus of Embodiment 4.

As understood from FIG. 17, a fluctuation amount of the tightening torque J before correcting the torque command value increases as the level of the torque command value increases. Further, the fluctuating manner of the tightening torque J is complex.

In contrast thereto, a fluctuation amount of the tightening torque K for the corrected torque command value is reduced at any torque level, which enables stable generation of tightening torques approximate to the torque command values TA, TB, and TC.

Accordingly, using this embodiment in the screw tightening system in Embodiments 1 and 2 enables tightening of the screw SR with screw tightening torques certainly corresponding to the torque command values (the first to final target torque values).

This embodiment described the correction of the torque fluctuations of the screw tightening driver. However, the present invention can be applied to not only the screw tightening driver, but also a motor-driven apparatus using a motor as a driving source and a simple motor which need accurate torque control.

Moreover, when not only torque control, but also speed control or position control is performed with a motor serving as a driving source, the present invention can be used for the purpose of suppressing due to a cogging torque of the motor.

Moreover, the present invention can be applied for the purpose of performing precise driving force control for, not only a rotary motor such as a brush motor or a brushless motor, but also a linear motor generating a rectilinear driving force.

In this embodiment, the correction data memories 82 to 84 in which the correction data unique to the driver D are stored are provided in the servo controller SC which is provided as a set (pair) with the driver D. With this configuration, even when it is necessary to replace the driver D and the servo controller SC in the screw tightening system, storing the correction data unique to the driver D in a driver D and a servo controller SC which are newly installed enables a prompt response.

Further, the correction data memories 82 to 83 may be provided, not in the servo controller SC, but integrally to the driver D. This enables a prompt response to a replacement of only the driver D.

Moreover, in the servo controller SC, a memory may be prepared in which a plurality of correction data tables corresponding to a plurality of drivers D identifiable by identification numbers or the like are stored. This enables, when the identification number of a driver D to be used is input to the interpolation calculation part 86, automatic selection of a correction data table for the driver D.

Embodiment 6

Figure 18:
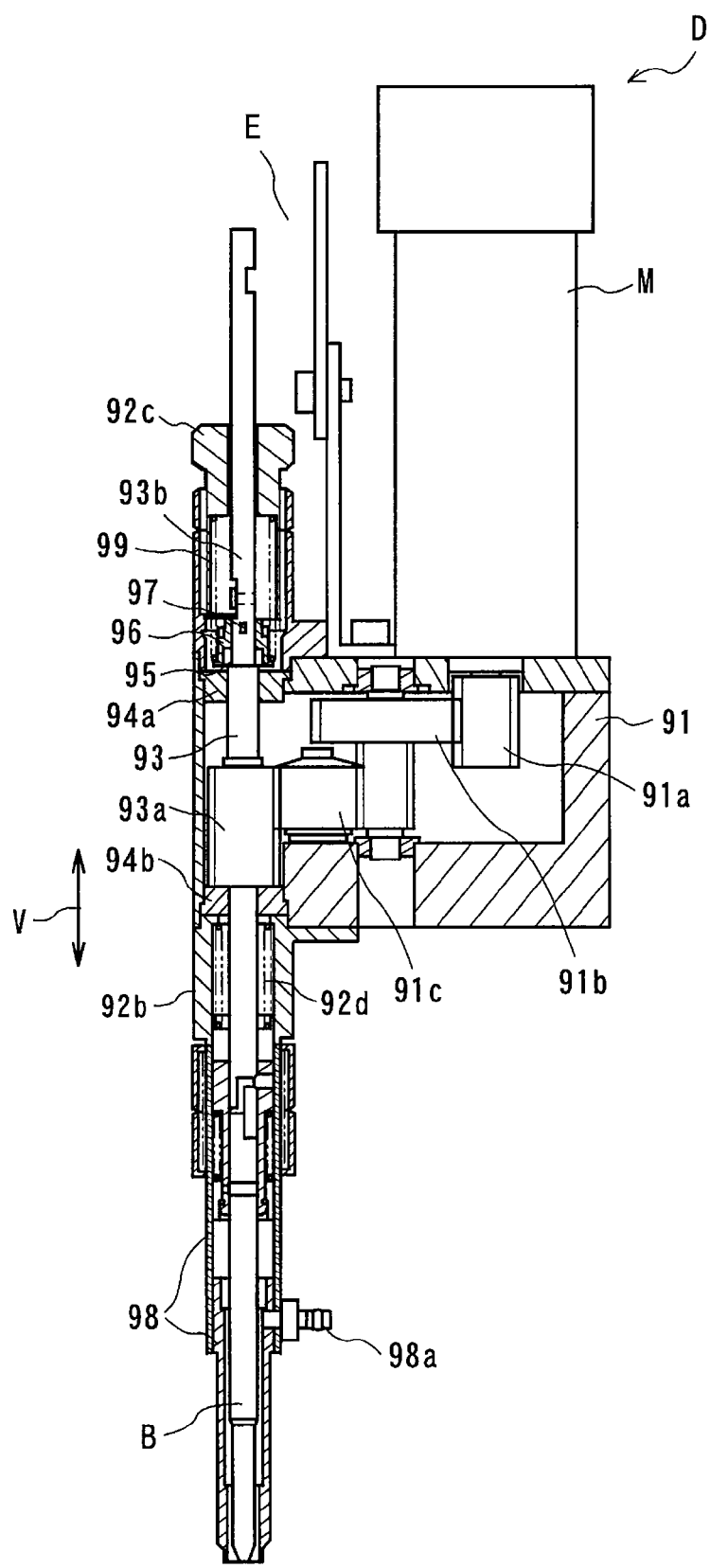
FIG. 18 is a sectional view showing the configuration of a screw tightening driver that is a sixth embodiment (Embodiment 6) of the present invention.

FIG. 18 illustrates a screw tightening driver (screw tightening apparatus) that is Embodiment 6 of the present invention. Embodiments 1, 2, 4, and 5 described the method for controlling the screw tightening driver used for the screw tightening and the method for correcting the tightening torque fluctuations at the time of assembling products such as hard disk drives.

However, in association with miniaturization of computers and their peripherals in recent years, further miniaturization of products such as hard disk drives is required. Then, the miniaturization of products further reduces the size of screws used for assembling the products.

This embodiment will describe a screw tightening driver which is not only used as the screw tightening driver described in Embodiments 1, 2, 4, and 5, but which may also have applicability to tightening of further miniaturized screws. In the following description, the upper side in FIG. 18 is referred to as an upper side of the screw tightening driver, and the lower side in FIG. 18 is referred to as a lower side of the screw tightening driver.

In FIG. 18, reference symbol D denotes a driver, and reference numeral 91 denotes a gear box. The motor M is fixed to the upper surface of the gear box 91. An output gear 91a integrally attached to the output shaft of the motor M protrudes toward the inside of the gear box 91.

A double gear 91b whose large-diameter gear portion engages with the output gear 91a, and an idler gear 91c which engages with a small-diameter gear portion of the double gear 91b are disposed inside of the gear box 91.

Reference numeral 92a denotes an external cylindrical member forming a main body portion of a bit driving unit which is also shown with reference symbol BD in FIG. 1. An output shaft 93 extending vertically is disposed inside of the external cylindrical member 92a.

The output shaft 93 includes a shaft portion 93b extending upward and downward, and a driven gear 93a formed between (at a vertically intermediate position of) the shaft portion 93b. The driven gear 93a includes gear teeth which extend vertically and engage with the idler gear 91c. This embodiment uses the output shaft 93 in which the shaft portion 93b and the driven gear 93a are integrally formed. However, the driven gear 93a and the shaft portion 93b may be separately manufactured and then the shaft portion 93b may be pressed into the driven gear 93a to be integrated therewith.

The shaft portion 93b of the output shaft 93 are rotatably supported at its upper and lower parts by two ball bearings 94a and 94b fixed to the inner circumference of the connecting portion with the external cylindrical member 92a in the gear box 91. A bit B for the screw tightening is connected so as to be integrally rotatable and detachable to the lower end of the shaft portion 93b.

A vertical length (thickness) of the driven gear 93a is set to be greater than that of the idler gear 91c. The reason for this is that, in order to maintain the engagement between the bit B and a recess of a screw at the time of screw tightening, the bit B and the output shaft 93 must be vertically movable as shown by an arrow V in the drawing with respect to the external cylindrical member 92a and the gear box 91 while maintaining the engagement between the driven gear 93a and the idler gear 91c.

Namely, the reason for this is that turning force transmission from the motor M to the output shaft 93 is made possible regardless of a vertical movement of the output shaft 93. In detail, the thickness of the driven gear 93a is set to be equal to or greater than a length of a screw to be tightened plus the thickness of the idler gear 91c.

Further, a sleeve 98 surrounding the outer circumference of the bit B is fitted to be vertically movable in the lower portion of the external cylindrical member 92a. The sleeve 98 is biased downward by a sleeve presser spring 92d disposed between an upper end of the sleeve 98 and a flange portion of the external cylindrical member 92a supporting the lower ball bearing 94b at the inner circumferential portion of the external cylindrical member 92a.

Further, a negative pressure connection member 98a is provided in a lower side wall of the sleeve 98. A hose from a vacuum pump (not shown) is connected to the negative pressure connection member 98a. Making a negative pressure state in the sleeve 98 in a state in which a head of the screw is housed in the lower end portion of the sleeve 98 enables absorption of the screw and engagement of the bit B with the recess of the screw.

As described above, in this embodiment, the driven gear 93a is integrally formed with the output shaft 93 or pressed into the output shaft 93 to be integrated therewith. This is for the following reason. In order to configure the driven gear 93a and the output shaft 93 so as to be relatively movable by spline coupling, unless the shaft portion 93b has a certain measure of diameter, it is difficult to form a key groove for the spline coupling on the shaft portion 93b. Even if the key groove can be formed, it is difficult to form it into a highly accurate shape for suppressing eccentric rotation and a torque fluctuation. Additionally, if the diameter of the shaft portion 93b is small, even when the shaft portion 93b is spline-coupled to the driven gear 93a, there is a high possibility that transmission of a sufficiently high torque from the driven gear 93a to the shaft portion 93b cannot be performed.

According to this embodiment in which the driven gear 93a is integrated with the output shaft 93 so as to cause the driven gear 93a to be slidable with respect to the idler gear 91c, even if the diameter of the shaft portion 93b is small, manufacturing and accurizing of the driver are easy, and transmission of a sufficiently high torque is possible.

Since the diameter of the bit B is small in the driver used for tightening fine screws and a pitch between the screws to be tightened are narrow, it is necessary to make the diameter of the driver D (in particular, the diameter of the external cylindrical member 92a) small by making the diameter of the output shaft 93 (shaft portion 93b) small. According to the configuration of this embodiment, upon satisfaction of such requirements, fine screws can be tightened by rotation of the bit with little eccentricity and torque fluctuation at a desired torque.

Figure 19:
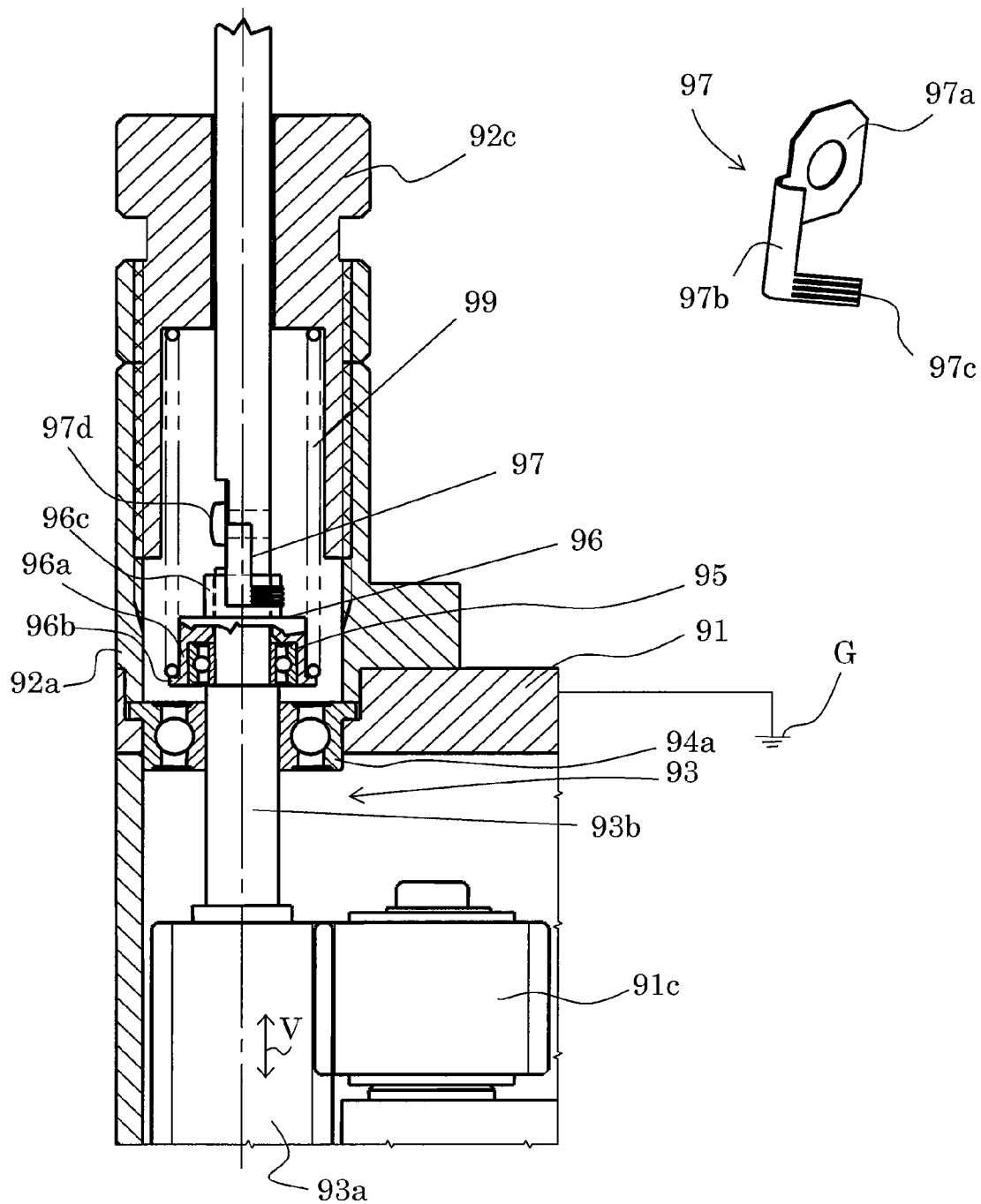
FIG. 19 is an enlarged sectional view showing a portion of the configuration of the screw tightening driver of Embodiment 6.

On the other hand, a spring receiving member 96 is attached to a part above the driven gear 93a in the shaft portion 93b via a bearing 95, as shown in detail in FIG. 19.

The spring receiving member 96 includes a large-diameter cylindrical part 96a that holds the outer circumferential portion of the bearing 95, a flange part 96b which is formed so as to extend radially outward at a lower end portion of the large-diameter cylindrical part 96a, and a small-diameter cylindrical part 96c which is formed at an upper side of the large-diameter cylindrical part 96a.

The bearing 95 is blocked to move downward with respect to the shaft portion 93b by a stage part provided in the shaft portion 93b. Therefore, the spring receiving member 96 does not move downward with respect to the shaft portion 93b.

Further, a spring pressing member 92c is attached to an upper portion of the external cylindrical member 92a. In detail, a male screw part formed on the outer circumference of the spring pressing member 92c is screwed into a female spring part formed in the inner circumference at the upper portion of the external cylindrical member 92a. A main body of the screw tightening driver D is constituted by the gear box 91, the external cylindrical member 92a, and the spring pressing member 92c.

Then, a bit presser spring 99 is disposed between the inner ceiling plane of the spring pressing member 92c and the flange part 96b of the spring receiving member 96. This bit presser spring 99 biases the output shaft 93 and the bit B downward via the spring receiving member 96, and is compressed to be deformed when the output shaft 93 moves upward along with the bit B.

Figure 20:
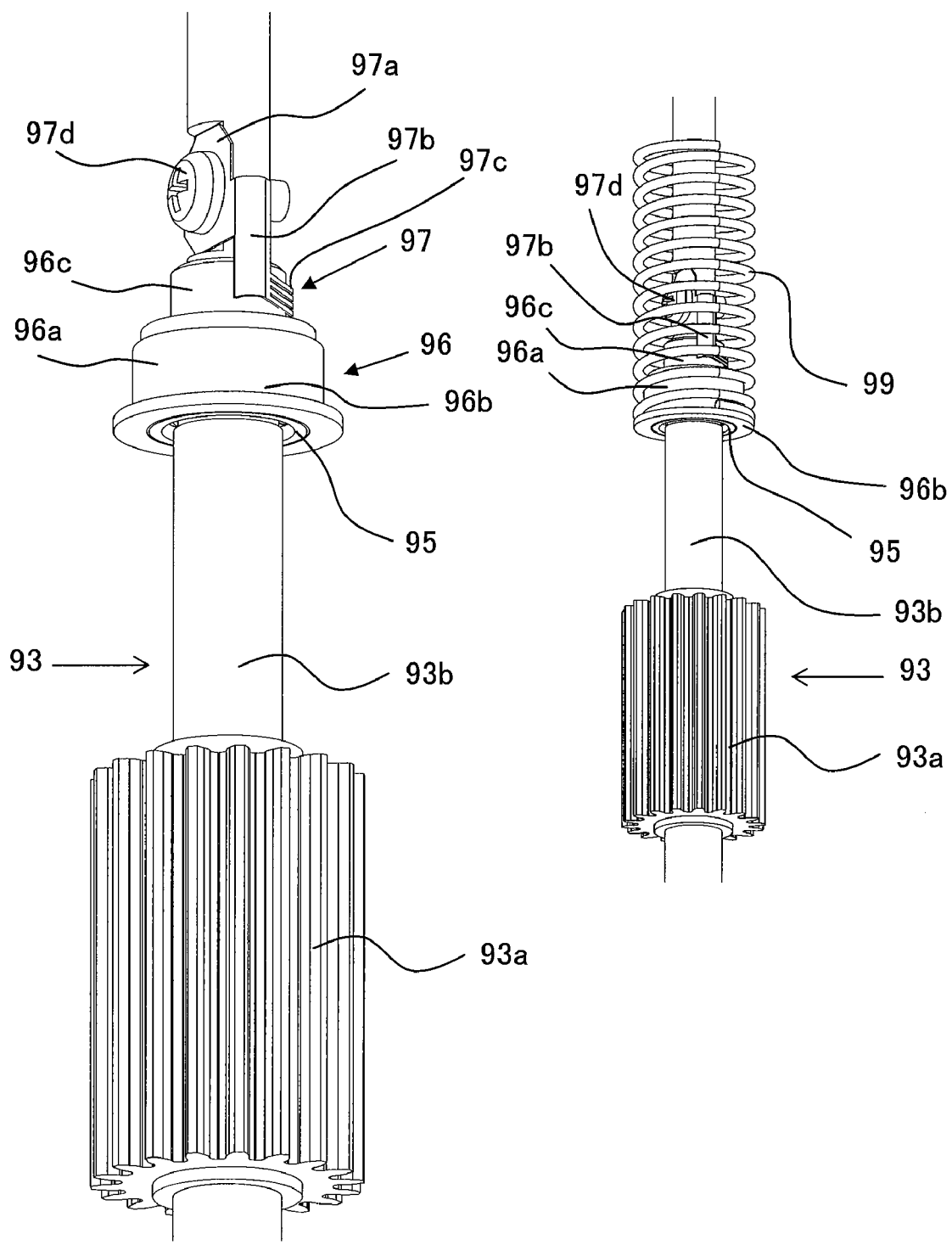
FIG. 20 is a perspective view showing a portion of the configuration of the screw tightening driver of Embodiment 6.

Moreover, a conductive brush 97 enlarged to be shown on the right side of FIG. 19 and FIG. 20 is attached to the upper part of the shaft portion 93b. The conductive brush 97 is formed of a material with high electrical conductivity such as copper, and includes a screw clamp part 97a fixed to the shaft portion 93b with a screw 97d, an extension part 97b which is formed so as to extend laterally and downward from the screw clamp part 97a, and a brush part 97c which is formed so as to extend in a rotation direction of the shaft portion 93b (in the right direction in the drawing) at a lower end of the extension part 97d.

When the screw clamp part 97a is fixed to the shaft portion 93b with the screw 97d, the brush part 97c contacts the outer circumferential surface of the small-diameter cylindrical part 96c of the spring receiving member 96. Further, while the conductive brush 97 is rotating along with the shaft portion 93b (output shaft 93), the brush part 97c slides with respect to the spring receiving member 96 (small-diameter cylindrical part 96c). Therefore, a conducting route passing from the output shaft 93 through the conductive brush 97, the spring receiving member 96, and the bit presser spring 99 to the spring pressing member 92c is formed.

The bit B is connected to the output shaft 93, and as described above, the spring pressing member 92c is screwed to engage with the external cylindrical member 92a. Moreover, the external cylindrical member 92a is attached to the gear box 91. Then, the gear box 91 is connected to the ground G as shown in FIG. 19.

In accordance therewith, static electricity charged on the bit B in the screw tightening is introduced to the ground G via the output shaft 93, the conductive brush 97, the spring receiving member 96, the bit presser spring 99, the spring pressing member 92c, the external cylindrical member 92a, and the gear box 91. Accordingly, the static electricity charged on the bit B can be certainly prevented from having harmful effects on a product such as a hard disk drive vulnerable to static electricity through a screw tightened by the bit B. Further, since an axial force is not applied to the conductive member, axial deformation and deterioration in electrical conductivity according the deformation can be certainly avoided.

In this embodiment, the conducive brush 97 is fixed to the shaft portion 93b of the output shaft 93 disposed at an inner side from the spring receiving member 96 and the bit presser spring 99 with the screw 97d. Since the spring receiving member 96 is greater in diameter than the shaft portion 93b of the output shaft 93, the conducive brush 97 can be caused to stably slide with respect to the spring receiving member 96 during the rotation of the output shaft 93. However, the conducive brush may be fixed to the spring receiving member, and the output shaft may rotate to slide with respect to the conducive brush.

Further, the disposition of the conducive brush 97 at the inner side from the bit presser spring 99 enables effective use of a space between the bit presser spring 99 and the output shaft 93 or the spring receiving member 96. Accordingly, the conducive brush 97 can be disposed without increasing the size of the screw tightening driver.

Embodiment 7

In the screw tightening driver described in the above-described Embodiments 1, 2, and 4 to 6, the motor serving as the driving source and the transmission mechanism that transmits a driving force from the motor to the bit for the screw tightening are inseparably integrated with each other.

On the other hand, usually, several types of screws are used for assembling a product such as a hard disk, and torques required for tightening those screws are mutually different. In contrast thereto, a range of the output torque (tightening torque) of the screw tightening driver requiring especially precise torque management, i.e., a range of the output torque of the motor is set to be narrow. Accordingly, when tightening the several types of screws having different required tightening torque levels is performed by using one screw tightening system, it is necessary to replace the entire screw tightening driver in accordance with a type of the screws.

Figure 21:
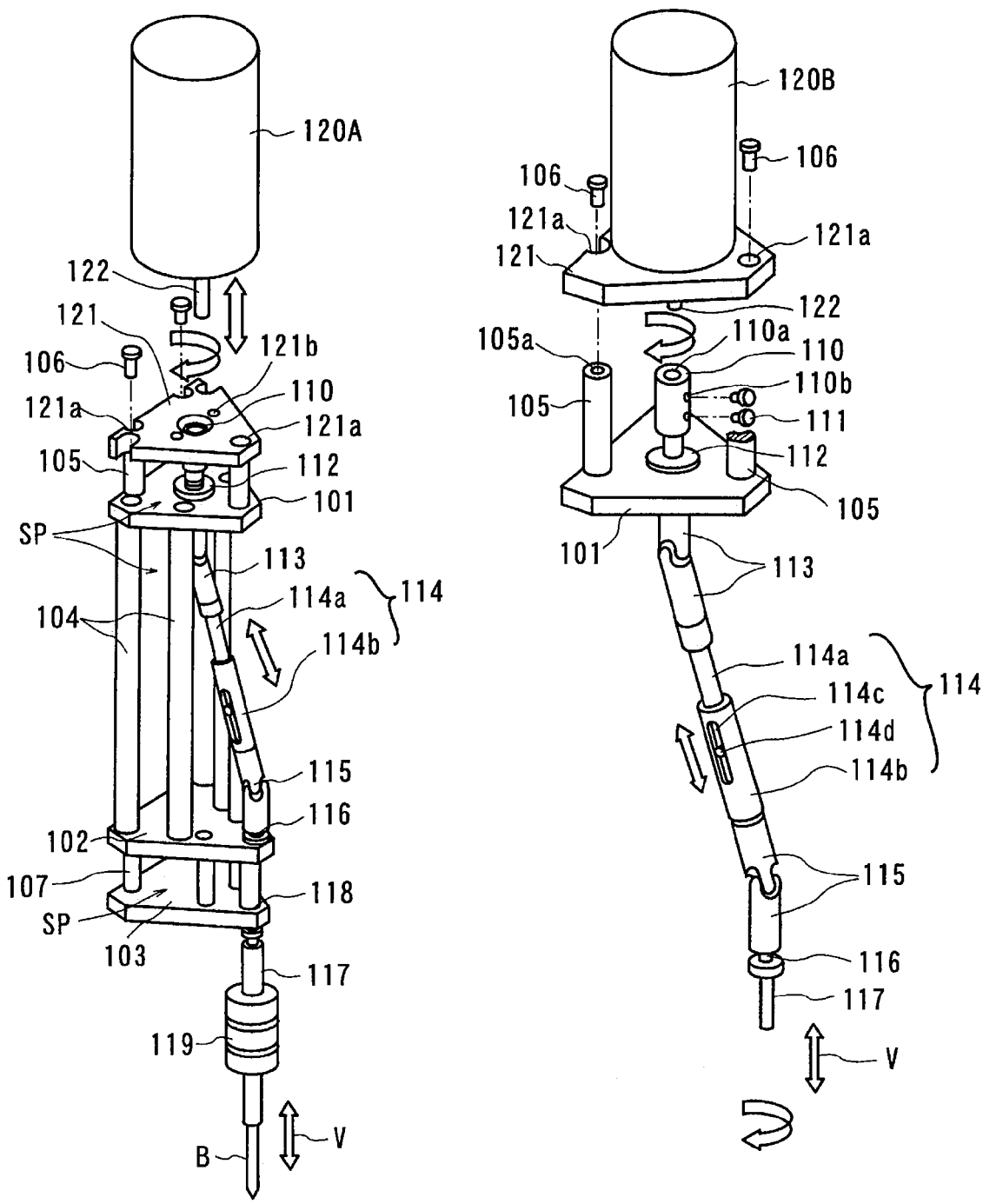
FIG. 21 is a perspective view showing the configuration of a screw tightening driver that is a seventh (Embodiment 7) of the present invention.

Then, FIG. 21 illustrates the configuration of a screw tightening driver in which a motor and a transmission mechanism can be separated, and thereby the motor can be replaced with respect to the transmission mechanism, which is Embodiment 7 of the present invention. In FIG. 21, the entire screw tightening driver is shown on the left side, and the transmission mechanism thereof is extracted to be shown on the right side. In the following description, the upper side in FIG. 21 is referred to as an upper side of the screw tightening driver, and the lower side in FIG. 21 is referred to as a lower side of the screw tightening driver.

In FIG. 21, reference numerals 101 and 102 respectively denote an upper base plate and an intermediate base plate.

Plural (four in this embodiment) shaft members 104 are disposed so as to space from one another between the upper base plate 101 and the intermediate base plate 102, and are fixed to the upper base plate 101 and the intermediate base plate 102 with screws. Moreover, a lower base plate 103 is disposed below the intermediate base plate 102 via plural (four in this embodiment) shaft members 107 which are shorter than the shaft members 104 and disposed so as to space from one another. This lower base plate 103 is fixed to, for example, the horizontal plate 4a of the support table 4 in the screw tightening system shown in FIG. 1 in Embodiment 1.

On the other hand, plural (three in this embodiment) shaft members 105 which are shorter than the shaft members 104 and disposed so as to space from one another are disposed on an upper surface of the upper base plate 101. The shaft members 105 are fixed with screws to the upper base plate 101 from a lower surface side thereof. The shaft members 104, 105, and 107 may be round bars or square bars. Further, the number of the shaft members is arbitrary.

A supporting structure to support the transmission mechanism which will be described later and the motor is constituted by the upper base plate 101, the intermediate base plate 102, the lower base plate 103, and the shaft members 104, 105, and 107.

Reference numerals 120A and 120B denote motors corresponding to the motor M described also in Embodiments 1, 2, and 4 to 6, which are motors respectively having different output torque ranges.

Reference numeral 121 denotes a mounting plate, which is attached to the motor 120A or 120B with screws or the like in advance as shown in the drawing on the right side of FIG. 21. An opening through which an output shaft 122 of the motor 120A or 120B passes through is formed at the center of the mounting plate 121. Moreover, screw clamp portions 121a to allow the shaft members 105 to be attached with screws 106 are formed in positions corresponding to the shaft members 105 fixed on the upper base plate 101 in the peripheral part of the mounting plate 121. Reference numeral 121b shown in the drawing on the left side of FIG. 21 denotes a screw hole for fixing the motor formed in the mounting plate 121.

On the other hand, as shown in the drawing on the right side of FIG. 21, a screw hole 105a for the screw 106 is formed in the upper portion of the shaft member 105.

In the mounting plate 121 for the motor 120A and the mounting plate 121 for the motor 120B, although the positions and the numbers of the screw holes 121b for fixing the motor are different in some cases, the positions and the numbers of the screw clamp portions 121a are identical to each other. Namely, both mounting plates 121 have a common attachment structure for the shaft members 105. With this attachment structure, even if the positions and the numbers of the screw holes 121b for fixing the motors to the mounting plates 121 are different from each other, the motors 120A and 120B can be easily replaced to the shaft members 105, i.e., the supporting structure.

Next, the transmission mechanism will be described. Reference numeral 110 denotes a connecting shaft which is rotatably held with respect to the upper base plate 101 by a bearing 112 attached to the center of the upper base plate 101.

As shown in the drawing on the right side of FIG. 21, a cylindrical part is formed in the upper portion of the connecting shaft 110, and a shaft hole 110a into which the output shaft 122 of the motor 120A or 120B (hereinafter referred to as the motor output shaft) is inserted is formed in the cylindrical part. Further, two screw holes 110b are formed in the upper and lower positions at the peripheral wall of the cylindrical part. When the motor output shaft 122 is inserted into the shaft hole 110a, and shaft set screws 111 screwed into the respective screw holes 110b come into contact with the motor output shaft 122, the output shaft 122 and the connecting shaft 110 can be connected so as to be integrally rotatable. Such a screw clamp structure for the motor output shaft 122 enables replacement of the motor from the transmission mechanism.

An inner shaft 114a of an extensible shaft 114 is connected to a portion protruding downward from the upper base plate 101 in the connecting shaft 110 via a first universal joint 113. Thus, the inner shaft 114a and the connecting shaft 110 are integrally rotatable. The extensible shaft 114 is disposed so as to be inclined to central axes of the motor output shaft 122 and the connecting shaft 110.

The extensible shaft 114 has a telescopic structure constituted by the inner shaft 114a and an outer shaft 114b, both shafts 114a and 114b being relatively movable axially, i.e., he the extensible shaft 114 being extensible. Engaging a protrusion member 114d formed on the inner shaft 114a with a groove portion 114c formed so as to axially extend in a side surface of the outer shaft 114b enables integral rotation of the inner shaft 114a and the outer shaft 114b.

A bit drive shaft 117 serving as an output shaft is connected to a lower end of the outer shaft 114b via a second universal joint 115. The bit drive shaft 117 is held so as to be rotatable and axially movable by bearings 116 and 118 respectively attached to the intermediate plate 102 and the lower base plate 103. The bit drive shaft 117 is held so as to extend in parallel with the central axes of the motor output shaft 122 and the connecting shaft 110 at a position offset (shifted) from those central axes in a direction perpendicular thereto.

Moreover, a coupling 119 is attached to a lower end of the bit drive shaft 117. The coupling 119 detachably holds the bit B.

In the transmission mechanism formed as described above, a turning force (output torque) from the motor output shaft 122 is transmitted to the bit B via the connecting shaft 110, the first universal joint 113, the extensible shaft 114, the second universal joint 115, the bit drive shaft 117, and the coupling 119. In the screw tightening, the bit B and the bit drive shaft 117 move axially, and this movement is absorbed by an extensible motion of the extensible shaft 114 and by changes of joint angles in the universal joints 113 and 115, and thereby the rotation of the bit B is maintained.

The first and second universal joints 113 and 115 are designed so as to eliminate eccentric rotation and inertia thereof. Further, an allowable eccentricity between the inner shaft 114a and the outer shaft 114b in the extensible shaft 114 and allowable rotary eccentricities in the bearings 112, 116, and 118 are extremely little. In accordance therewith, a torque fluctuation generated in the transmission mechanism is suppressed.

The screw tightening driver in Embodiments 1, 2, and 4 to 6 transmits a motor rotation to the output shaft and the bit via the gears. In this case, as described also in Embodiment 5, a tightening torque of the driver fluctuates due to frictional fluctuations in the gears in some cases. In contrast thereto, in this embodiment, the tightening torque fluctuation due to the frictional fluctuation of the gears is not caused because the transmission mechanism is formed without using a train of gears, and torque fluctuation components due to the extensible shaft 114 and the bearings 112, 116, and 118 are suppressed. Therefore, a torque fluctuation can be suppressed less than that in the case where the gear transmission mechanism is used.

Then, since the torque fluctuation generated in the transmission mechanism is little, using the method for correcting a torque correction value described in Embodiment 5 together therewith enables significant suppression of the torque fluctuation in the entire screw tightening driver.

In accordance with experiments by the inventors, under the same conditions including the output torque of the motor, a torque fluctuation suppressing effect of one to several percent depending on the level of the output torque was obtained as compared with that in a gear transmission type screw tightening driver.

Moreover, in this embodiment, the motor can be replaced from the supporting structure and the transmission mechanism. Thereby, only the motor (motor with the mounting plate 121) 120A or 120B can be appropriately selected and mounted to the supporting structure and the transmission mechanism fixed to the lifting mechanism (refer to FIG. 1 in Embodiment 1) of the screw tightening system to perform the screw tightening. Accordingly, even when screws are tightened at different tightening torque levels, there is no need to replace the entire screw tightening driver as in the conventional art. With this advantage, even in a case where a motor in any size is mounted, the shape and dimension of the screw tightening driver (the supporting structure and the transmission mechanism) except for the motor, and further the shape and dimension of the lifting mechanism and the like in the screw tightening system can be remained unchanged. Accordingly, a line design time when the screw tightening system is installed in a production line can be reduced, and standardization of parts required for the installation and reduction of the number of the parts can be achieved.

Further, in this embodiment, the shaft members 104, 105, and 107 constituting the supporting mechanism are disposed so as to space from one another. With this disposition, at the time of a motor replacement work and an adjustment work for the transmission mechanism associated therewith, a hand or a tool can be inserted into a space SP among the shaft members shown in the drawing on the left side of FIG. 21.

This embodiment described the screw tightening driver of a motor singularly replacement type, which has the transmission mechanism using the universal joints. However, even in a case in which the screw tightening driver has the transmission mechanism using the gear train described in Embodiment 6 or the like, a screw tightening driver of a motor singularly replacement type can be formed.

Meanwhile, a control system different from the control system descried in Embodiments 1 to 3 can be constituted by using the screw tightening driver having the replaceable motor.

Figure 22:
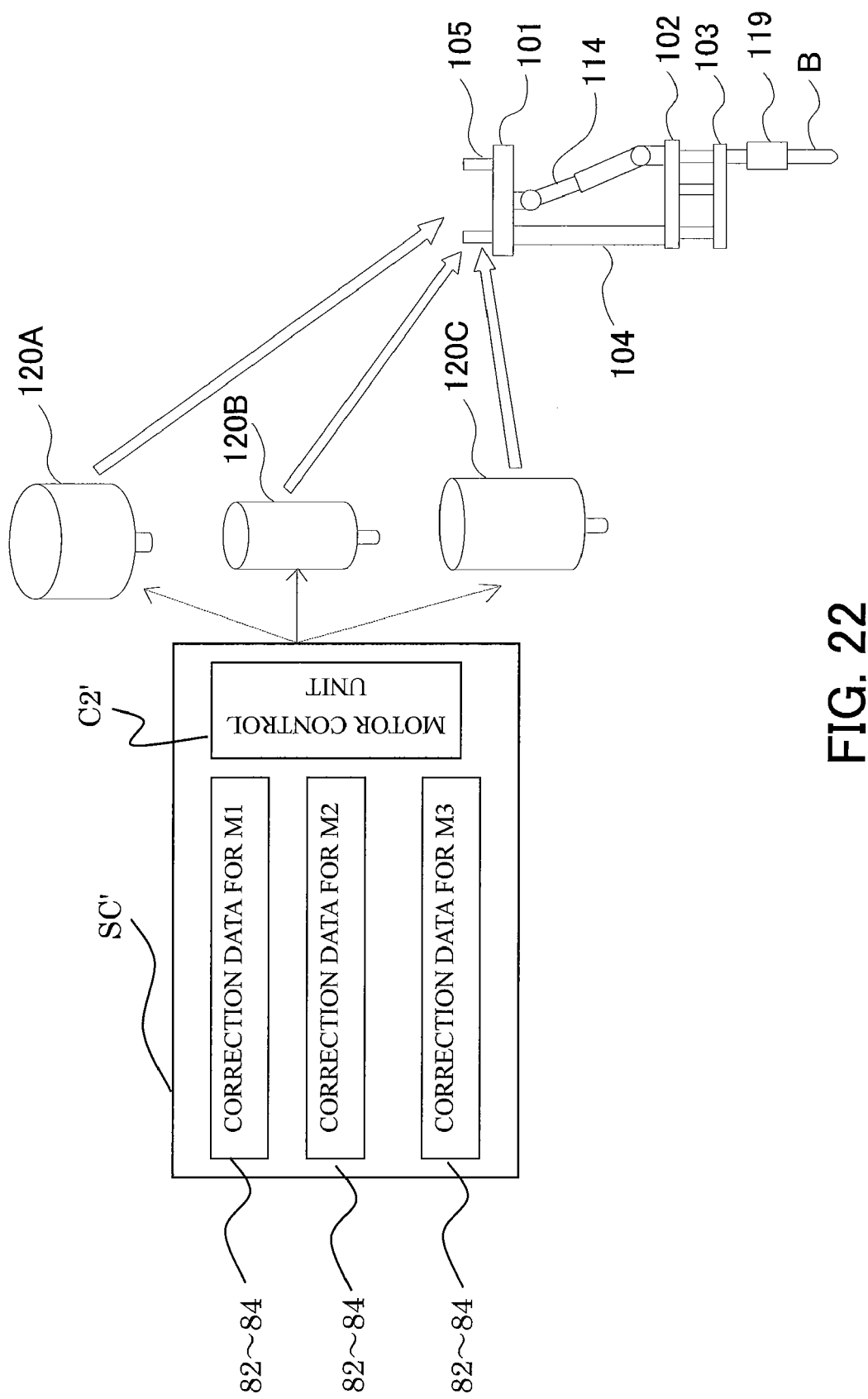
FIG. 22 is a block diagram showing configuration examples of a screw tightening system to which the screw tightening driver of Embodiment 7 is applied.

FIG. 22 illustrates the schematic configuration of the control system. In FIG. 22, the illustration of the mounting plates (reference numeral 121 in FIG. 21) attached to the motors in advance is omitted. Further, reference symbols denoted to the screw tightening driver (the supporting mechanism and the transmission mechanism) shown on the right side in the drawing are the same as the reference symbols in FIG. 21.

A dedicated servo controller belongs to the inseparable motor type screw tightening driver described in Embodiments 1, 2, and 4 to 6. Therefore, when the inseparable motor type screw tightening driver is replaced in accordance with a change of a tightening torque level, it is necessary to replace the servo controller together therewith.

In contrast thereto, in this embodiment, as shown in FIG. 22, several types of motors 120A, 120B, and 120C respectively having different output torque ranges can be replaced from and mounted to one screw tightening driver (the supporting mechanism and the transmission mechanism). In such a case, it is recommended that a servo controller SC' capable of controlling any one of the motors 120A, 120B, and 120C be used.

In the servo controller SC', a motor control unit C2' that controls a voltage or an electric current applied to the respective motors, and memories for the motors 120A, 120B, and 120C as the correction data memories 82 to 84 described in Embodiment 5 are installed. Further, although not shown, the interpolation control unit, the adder and the like described in Embodiment 5 as well are installed.

With this configuration, even when one of the motors 120A, 120B, and 120C is mounted to the screw tightening driver, the servo controller SC' can suppress a tightening torque fluctuation to perform the screw tightening. The selection of a correction data memory corresponding to the motor may be performed by utilizing an identification number or the like denoted to the motor as described in Embodiment 5.

In this way, providing the function of controlling the motors 120A, 120B, and 120C to the servo controller SC' eliminates a need to replace the servo controller even when the motor is replaced. In other words, although plural servo controllers corresponding to plural motors (screw tightening drivers) are conventionally required, this embodiment needs only one servo controller for the plural motors 120A, 120B, and 120C. With this configuration, the screw tightening system can be formed at lower cost than the conventional art.

Embodiment 8

Figure 23:
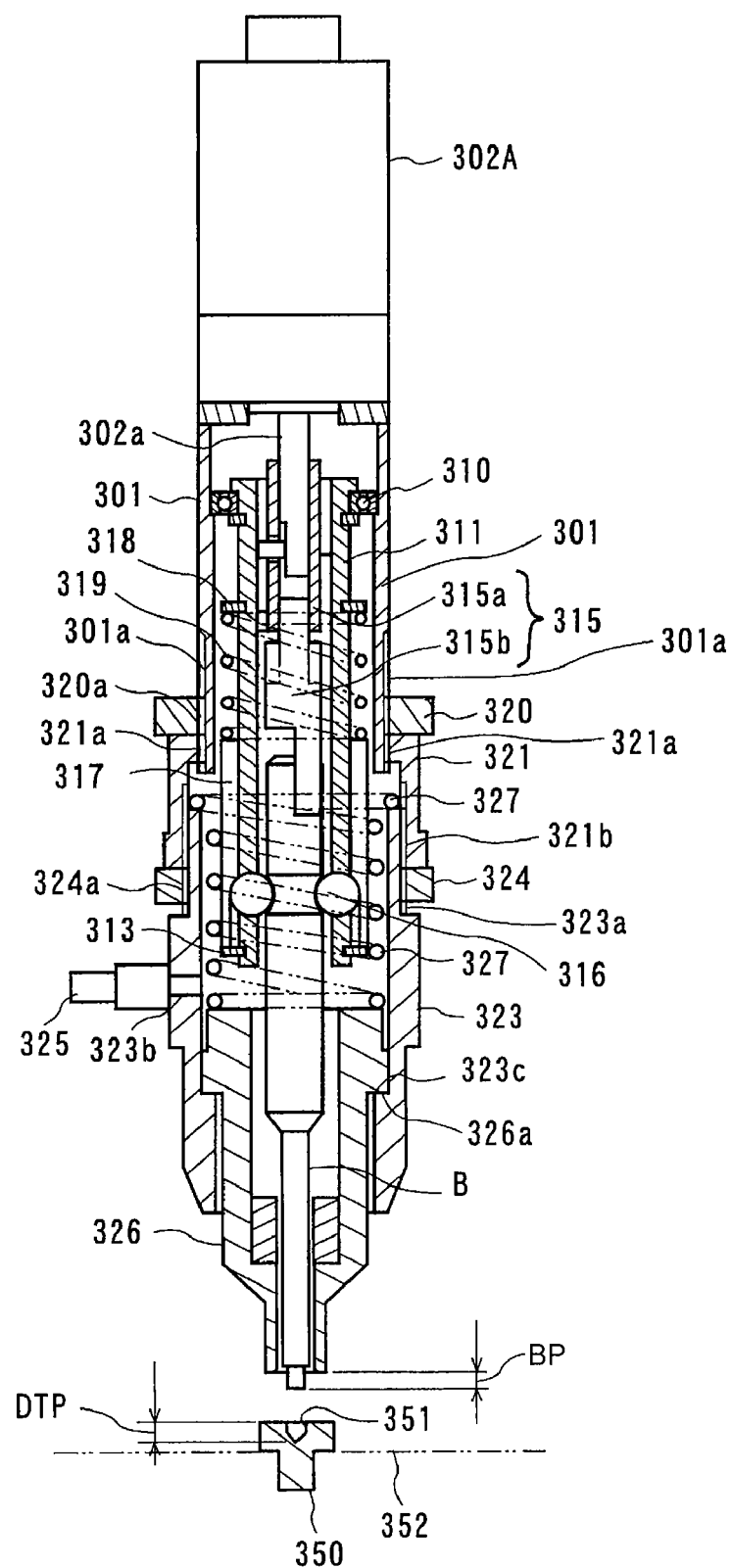
FIG. 23 is a sectional view showing the configuration of a screw tightening driver that is an eighth embodiment (Embodiment 8) of the present invention.
Figure 24:
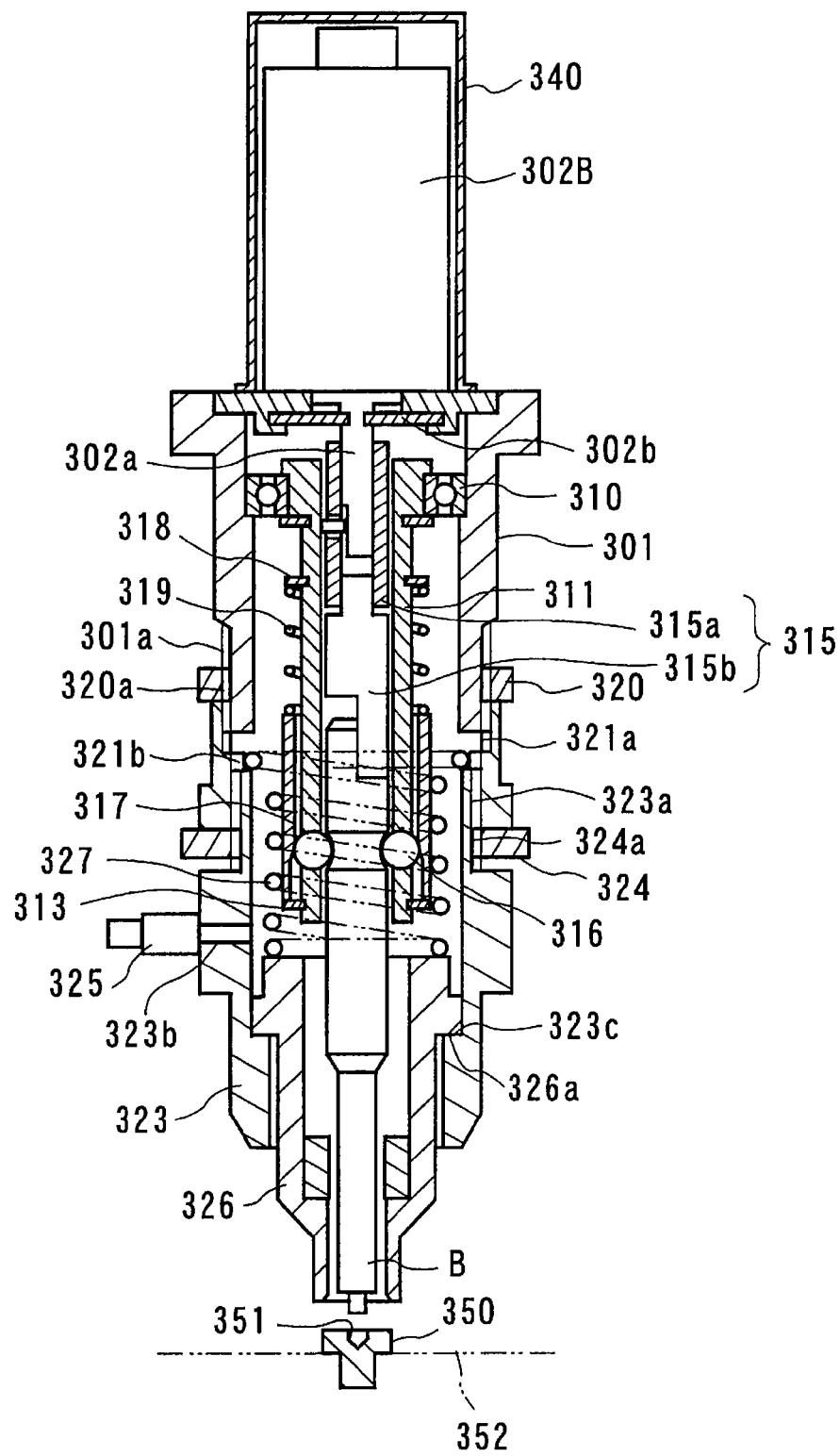
FIG. 24 is a sectional view showing a modified example of the screw tightening driver of Embodiment 8.

FIGS. 23 and 24 respectively illustrate the configuration of a screw tightening driver that is Embodiment 8 of the present invention. The screw tightening driver described in the above-described Embodiments 1, 2, and 4 to 7 is a so-called offset-type screw tightening driver in which the output shaft of the motor and the bit are offset to each other in a direction perpendicular to their central axes. However, the screw tightening driver in this embodiment is a so-called straight-type screw tightening driver in which the output shaft of the motor and the bit are disposed on a straight line. This straight-type screw tightening driver as well can be used as the screw tightening driver described in Embodiments 1, 2, 4, and 5.

Further, in the driver shown in FIG. 24, a brush motor 302B is used which has a brush sliding with respect to a rotating commutator. On the other hand, in the driver shown in FIG. 23, a brushless motor 302A is used. Since the basic configurations other than the motors in both drawings are the same, constituent components in the drivers shown in FIGS. 23 and 24 identical to one another are denoted with the same reference numerals. Further, in the following description, the upper side in FIGS. 23 and 24 is referred to as an upper side of the screw tightening driver, and the lower side in the same drawings is referred to as a lower side of the screw tightening driver.

In FIGS. 23 and 24, reference numeral 301 denotes an external cylindrical member forming a main body of the screw tightening driver. The brushless motor 302A or the brush motor 302B is fixed to an upper end portion of the external cylindrical member 301. An output shaft (hereinafter referred to as a motor output shaft) 302a of the motor 302A or 302B passes through an opening formed in an upper surface of the external cylindrical member 301 to protrude toward an inner side of the external cylindrical member 301.

Reference numeral 311 denotes a first inner cylindrical member disposed at the inner side of the external cylindrical member 301. The first inner cylindrical member 311 is held so as to be rotatable with respect to the external cylindrical member 301 by a bearing 310 attached to the inner circumferential portion of the external cylindrical member 301. Axial movement of the first inner cylindrical member 311 with respect to the external cylindrical member 301 is blocked by the engagement of the first inner cylindrical member 311 with the bearing 310.

A rotation transmission mechanism 315 which is integrally rotatable with the motor output shaft 302a is disposed inside of the first inner cylindrical member 311. The rotation transmission mechanism 315 includes an upper member 315a connected to the motor output shaft 302a and a lower member 315b connected so as to be integrally rotatable and vertically movable with respect to the upper member 315a. The lower member 315b engages with a D-cut shaped portion formed in an upper end of the bit B in their rotation direction. With this engagement, rotation of the motor output shaft 302a is transmitted to the bit B via the rotation transmission mechanism 315.

A ring-shaped U-groove is formed in an upper outer circumference of the bit B. Engagement of balls 316 held at a lower portion of the first inner cylindrical member 311 with the U-groove holds the bit B so as to be rotatable and so as not to drop off with respect to the rotational transmission mechanism 315.

A second inner cylindrical member 317 is disposed at an outer side of the first inner cylindrical member 311. A lower end surface of the second inner cylindrical member 317 contacts a snap ring 313 attached to an outer circumference of a lower end of the first inner cylindrical member 311. The second inner cylindrical member 317 is biased downward by a coil spring 319 disposed between an upper end surface of the second inner cylindrical member 317 and a snap ring 318 attached to an upper outer circumference of the first inner cylindrical member 311. The second inner cylindrical member 317 contacts, when the driver is used, the balls 316 at an inner circumferential surface of an intermediate portion of the second inner cylindrical member 317 to inhibit the balls 316 holding the bit B so as to pinch it from moving toward the outside.

On the other hand, when the second inner cylindrical member 317 is moved upward with respect to the first inner cylindrical member 311 against the biasing force of the coil spring 319, a lower portion with a larger inner diameter in the second inner cylindrical member 317 allows the balls 316 to escape toward the outside. With this structure, the bit B can be detached from or attached to the driver.

A coarse adjustment male screw 301a serving as a main body screw part is formed in a lower outer circumference of the outer cylindrical member 301. With the coarse adjustment male screw 301a, in order from the upper side, a female screw 320a formed in an inner circumference of a first lock ring 320 and a first female screw 321a formed in an upper inner circumference of a coarse adjustment ring 321 serving as a first adjustment member are respectively engaged. A coarse adjustment scale (not shown) used at the time of positioning between a lower tip end of the bit B and a lower tip end of a sleeve 326 which will be described later is provided on an outer circumference of the coarse adjustment ring 321.

A cylindrical fine adjustment case 323 serving as a second adjustment member is disposed outside the second cylindrical member 317 and the coil spring 319. A fine adjustment male screw 323a with a screw pitch less than that of the coarse adjustment male screw 301a is formed in an upper outer circumference of the fine adjustment case 323. With the fine adjustment male screw 323a, a second female screw 321b formed in a lower inner circumference of the coarse adjustment ring 321 and a female screw 324a formed in an inner circumference of a second lock ring 324 are respectively engaged in order from the upper side.

A fine adjustment scale (not shown) used at the time of adjusting a protruding amount of the lower tip end of the bit B from the lower tip end of the sleeve 326 which will be described later is provided on an outer circumference of the fine adjustment case 323.

The sleeve 326 which covers the circumference of the lower tip end (leading end) of the bit B is disposed at a lower inner side of the fine adjustment case 323. The sleeve 326 allows the leading end of the bit B to be exposed through its lower end opening. A flange part 326a formed in an upper outer circumference of the sleeve 326 contacts a stage portion 323c formed in a lower inner circumference of the fine adjustment case 323 to prevent the sleeve 326 from dropping off downward from the fine adjustment case 323.

Further, the sleeve 326 is biased downward by a sleeve presser coil spring 327 engaging with an upper end surface of the sleeve 326 and an upper end portion of the fine adjustment case 323. Therefore, the sleeve 326 moves up and down along with the fine adjustment case 323 at the time of adjusting the protruding amount of the leading end of the bit B from the lower tip end of the sleeve 326, the adjustment thereof being described later.

A through-hole 323b is formed in a vertically intermediate portion on a peripheral wall portion of the fine adjustment case 323. Then, a negative pressure connection member 325 having a hole connected to the through-hole 323b is attached to the outer circumference of the fine adjustment case 323.

In FIG. 24, reference numeral 302b denotes a brush of the brush motor 302B. The brush 302b contacts the motor output shaft 302a serving as a commutator. Reference numeral 340 denotes a cover that covers the brush motor 302B which prevents dirt such as carbon discharged from the brush motor 302B from going out to the outside.

An outer diameter of the screw tightening driver using the brushless motor 302A shown in FIG. 23 can be smaller than that of the screw tightening driver using the brush motor 302B shown in FIG. 24 because the brushless motor 302A does not have the cover 340. In detail, in FIG. 23, the outer diameter of the brushless motor 302A and the outer diameter of the outer cylindrical member 301 are substantially the same. Although a difference between the outer diameters of the screw tightening driver using the brushless motor 302A and the screw tightening driver using the brush motor 302B is not so large, the difference significantly increases the volume of the entire screw tightening driver using the brush motor 302B. Accordingly, the driver using the brushless motor 302A is advantageous to a case where plural screws disposed with a finer pitch are collectively tightened by plural drivers.

When the screw 350 is tightened by the screw tightening driver formed as described above, the leading end of the bit B slightly protruded from the lower tip end of the sleeve 326a is caused to engage with a recess 351 of the screw 350 first, and then the lower tip end of the sleeve 326 is caused to contact the upper surface of the screw 350. Then, air in the driver is absorbed by a vacuum pump via the negative pressure connection member 325. With this operation, the inside of the driver comes into a negative pressure state, and the screw 350 is absorbed onto the lower tip end of the sleeve 326. Setting the screw 350 into the screw hole of a workpiece 352 in this state and then rotating the motor 302A or 302B can tighten the screw 350.

However, since a depth DPT of the recess 351 is made shallower as the screw 350 is miniaturized, unless the protruding amount BP of the leading end of the bit B from the lower tip end of the sleeve 326 (hereinafter simply referred to as the bit protruding amount) is accurately (strictly) adjusted, the bit protruding amount BP is too large, resulting in a gap between the upper surface of the screw 350 and the lower tip end of the sleeve 326 and thereby making it impossible to absorb the screw 350. Therefore, in the driver in this embodiment, the bit protruding amount can be accurately adjusted by the following procedure.

First, on the coarse adjustment male screw 301a formed in the external cylindrical member 301, the first lock ring 320 is loosened (moved upward) with respect to the coarse adjustment ring 321. Further, on the fine adjustment male screw 323a formed in the fine adjustment case 323, the second lock ring 324 is loosened (moved downward) with respect to the coarse adjustment ring 321. With these operations, the coarse adjustment ring 321 is made rotatable on the coarse adjustment male screw 301a.

When the coarse adjustment ring 321 is operated to be rotated in this state, the coarse adjustment ring 321 moves up and down with respect to the external cylindrical member 301 by an effect of the first female screw 321a of the coarse adjustment ring 321 and the coarse adjustment male screw 301a of the external cylindrical member 301. At this time, the fine adjustment case 323 in which the fine adjustment male screw 323a engages with the second female screw 321b of the coarse adjustment ring 321 and the second lock ring 324 engaging with the fine adjustment male screw 323a of the fine adjustment case 323 also vertically move with their rotation together with the coarse adjustment ring 321. Then, the sleeve 326 as well moves up and down together with the fine adjustment case 323. With this operation, the lower tip end of the sleeve 326 and the leading end of the bit B are coincided with each other. The degree of coincidence can be secured by operating them while viewing the scale on the coarse adjustment ring 321.

After the coincidence of the lower tip end of the sleeve 326 and the leading end of the bit B, the first lock ring 320 is tightened with respect to the coarse adjustment ring 321. With this operation, rotation of the coarse adjustment ring 321 is prevented on the coarse adjustment male screw 301a.

Next, when the fine adjustment case 323 is operated to be rotated, the fine adjustment case 323 moves up and down by an effect of the fine adjustment male screw 323a and the second female screw 321b of the coarse adjustment ring 321 whose movement is locked. Then, the sleeve 326 as well moves up and down together with the fine adjustment case 323. As described above, since a screw pitch (i.e., a lead) of the fine adjustment male screw 323a is less than that of the coarse adjustment male screw 301a of the external cylindrical member 301, in a case where the rotational operating amounts are the same, a vertical movement amount of the sleeve 326 by an operation of the fine adjustment case 323 is less than a vertical movement amount of the sleeve 326 by an operation of the coarse adjustment ring 321. Accordingly, a rotational operation of the fine adjustment case 323 while checking the fine adjustment scale on the fine adjustment case 323 enables an extremely precise adjustment of the bit protruding amount BP in accordance with the depth DPT of the recess 351 of the screw 350.

Then, at the last, the second lock ring 324 is tightened with respect to the coarse adjustment ring 321. With this operation, rotation of the fine adjustment case 323 as well is prevented, and thereby the position of the sleeve 326 with respect to the bit B is fixed. Namely, the bit protruding amount BP is set.

In the conventional driver, a protruding amount of the leading end of the bit from the lower tip end of the sleeve is adjusted by only a member corresponding to the coarse adjustment ring 321. However, since a variation in protruding amount according to a rotational amount of the member corresponding to the coarse adjustment ring 321 is large, a fine adjustment is difficult or takes a long time. Further, there is a possibility that, when a member corresponding to the first lock ring 324 is tightened, the member corresponding to the coarse adjustment ring 321 as well slightly rotates by friction with the end surface of the member corresponding to the first lock ring 324, which changes an adjusted protruding amount. According to this embodiment, a fine adjustment for the bit protruding amount can be easily performed in a short time. Additionally, the final locking of the fine adjustment case 323 is performed by causing the second lock ring 324 to contact the end surface of the coarse adjustment ring 321 which is a separate member therefrom, thereby mostly eliminating the possibility that the bit protruding amount is changed after the fine adjustment is completed.

The adjustment mechanism for the bit protruding amount described in this embodiment can be employed for not only a straight-type screw tightening driver, but also the offset-type screw tightening driver described in Embodiments 1, 2, and 4 to 7. Further, the mechanism enabling a coarse adjustment and a fine adjustment for a bit protruding amount is not limited to that having the above-described configuration.

Furthermore, the present invention is not limited to these embodiments and various variations and modifications may be made without departing from the scope of the present invention.

What is claimed is:

1. A motor control apparatus comprising:
a memory configured to store a plurality of correction data tables, each storing a correction value corresponding to a rotational angle of a motor; and
a calculating unit configured to select two correction tables based on a torque command value for the motor, to acquire two correction values corresponding to the rotational angle of the motor from the two correction tables that have been selected, and to calculate a correction value of the torque command value for the motor based on the two correction values that have been acquired.

2. The motor control apparatus according to claim 1, wherein the calculating unit linearly approximates the two correction values that have been acquired in calculating the correction value of the torque command value.

3. A screw tightening system comprising:
the motor control apparatus according to claim 1; and
a screw tightening apparatus driven by a motor.

4. A system comprising:
the motor control apparatus according to claim 1; and
a motor-driven apparatus that is operated by a motor serving as a driving source.

5. A motor control method executed by a calculating unit, said motor control method comprising:
selecting two correction tables based on a torque command value for a motor from a plurality of correction data tables stored in a memory, each correction data table storing a correction value corresponding to a rotational angle of the motor;
acquiring two correction values corresponding to the rotational angle of the motor from the two correction tables that have been selected; and
calculating a correction value of the torque command value for the motor based on the two correction values that have been acquired.

6. A motor control apparatus comprising:
a memory configured to store three or more correction data tables, each storing a correction value corresponding to a rotational angle; and
a calculating unit configured to acquire three or more correction values corresponding to a rotational angle of a motor from the three or more correction tables, and to calculate a correction value of a torque command value for the motor through a linear interpolation based on the three or more correction values that have been acquired.

7. A screw tightening system comprising:

the motor control apparatus according to claim 6; and a screw tightening apparatus driven by a motor.

8. A system comprising:

the motor control apparatus according to claim 6; and a motor-driven apparatus that is operated by a motor serving as a driving source.

9. A motor control method executed by a calculating unit, said motor control method comprising:

acquiring three or more correction values corresponding to a rotational angle of a motor from three or more correction tables stored in a memory, each correction table storing a correction value corresponding to a rotational angle; and calculating a correction value of a torque command value for the motor through a linear interpolation based on the three or more correction values that have been acquired.

* * * * *